US012614430B2

(12) United States Patent
Walton

(10) Patent No.: US 12,614,430 B2
(45) Date of Patent: Apr. 28, 2026

(54) METHOD AND COMPUTING SYSTEM FOR SIMULATING SYMBOL REPLACEMENT BASED ON HIERARCHY OF SYMBOLS

(71) Applicant: Games Global Operations Limited, Douglas (IM)

(72) Inventor: Brendan Clyde Walton, Boca Raton, FL (US)

(73) Assignee: Games Global Operations Limited, Douglas (IM)

( * ) Notice: Subject to any disclaimer, the term of this patent is extended or adjusted under 35 U.S.C. 154(b) by 132 days.

(21) Appl. No.: 18/336,334

(22) Filed: Jun. 16, 2023

(65) Prior Publication Data

US 2024/0038027 A1 Feb. 1, 2024

(30) Foreign Application Priority Data

Jul. 29, 2022 (GB) ..................................... 2211104

(51) Int. Cl.
*G07F 17/32* (2006.01)

(52) U.S. Cl.
CPC ...... *G07F 17/3267* (2013.01); *G07F 17/3213* (2013.01)

(58) Field of Classification Search
CPC ... G07F 17/3213; G07F 17/3267; G07F 17/34
See application file for complete search history.

(56) References Cited

U.S. PATENT DOCUMENTS

| | | | | |
|---|---|---|---|---|
| 6,186,894 | B1 * | 2/2001 | Mayeroff | G07F 17/34 463/16 |
| 7,357,713 | B2 * | 4/2008 | Marks | G07F 17/3211 463/16 |
| 10,262,500 | B2 | 4/2019 | Wortmann | |
| 10,607,448 | B2 * | 3/2020 | Nicely | G07F 17/3267 |
| 10,636,242 | B2 | 4/2020 | Wortmann | |
| 10,685,530 | B2 | 6/2020 | Wortmann | |

(Continued)

OTHER PUBLICATIONS

United Kingdom Intellectual Property Office; Examination Report under Section 18(3) for United Kingdom application No. GB2211104.1 and cover letter; dated Sep. 3, 2024; 4 pages.

(Continued)

*Primary Examiner* — Justin L Myhr
(74) *Attorney, Agent, or Firm* — McDonnell Boehnen Hulbert & Berghoff LLP

(57) ABSTRACT

A method includes providing a GUI comprising rows and columns of symbol positions, and patterns across the columns. The method includes outputting a first outcome including an initial symbol for each symbol position, and determining whether the symbols on each pattern form, for the first outcome, a winning pattern comprising a first symbol in two or more symbol positions of the pattern. The method includes replacing, in each winning pattern for the first outcome, the first symbol with a second symbol to form a second outcome, outputting the second outcome, and determining whether the symbols form a winning pattern for the second outcome. The winning pattern for the second outcome comprises the second symbol being in two or more symbol positions of the pattern. The second symbol in a particular symbol position of the wining pattern for the second outcome is an initial symbol selected for the particular symbol position.

14 Claims, 31 Drawing Sheets

(56) References Cited

U.S. PATENT DOCUMENTS

| | | | | |
|---|---|---|---|---|
| 10,755,518 | B2 | 8/2020 | Wright | |
| 11,132,867 | B2 | 9/2021 | Wortmann | |
| 2008/0032784 | A1* | 2/2008 | Englman | G07F 17/34 463/21 |
| 2012/0172107 | A1* | 7/2012 | Acres | G07F 17/34 463/16 |
| 2013/0184045 | A1 | 7/2013 | Vermaak et al. | |
| 2013/0184046 | A1 | 7/2013 | Vermaak et al. | |
| 2013/0331173 | A1* | 12/2013 | Jaffe | G07F 17/3267 463/20 |
| 2014/0066198 | A1* | 3/2014 | Robbins | G07F 17/3211 463/31 |
| 2019/0371126 | A1* | 12/2019 | Bolling, Jr. | G07F 17/3244 |
| 2020/0312085 | A1 | 10/2020 | Rottcher et al. | |

OTHER PUBLICATIONS

United Kingdom Intellectual Property Office; Examination Report under Section 18(3) for United Kingdom application No. GB2211104.1 and cover letter; dated Dec. 23, 2024; 10 pages.

United Kingdom Intellectual Property Office; Combined Search Report under Section 17(5)(b) and Abbreviated Examination Report under Section 18(3) and cover letter for United Kingdom application No. GB2211104.1; dated Nov. 30, 2023; 9 pages.

Casino Grounds; YouTube video "Slot Mechanics: Rolling Reels" with explanation by David Labowsky, screen shots and transcript obtained from World Wide Web at https://www.youtube.com/watch?v=ZW126UKfBhM; dated Nov. 21, 2016.

* cited by examiner

METHOD AND COMPUTING SYSTEM FOR SIMULATING SYMBOL REPLACEMENT BASED ON HIERARCHY OF SYMBOLS

PRIORITY

This application claims priority under 35 U.S.C. § 119 to United Kingdom Patent Application No. 2211104.1 filed Jul. 29, 2022. United Kingdom Patent Application No. 2211104.1 is hereby incorporated by reference in its entirety.

FIELD

This disclosure relates to simulating spinnable, mechanical reels on a graphical user interface.

BACKGROUND

Slot machines come in a variety of forms, including for example a mechanical slot machine. A mechanical slot machine can include one or more reels, each of which includes multiple symbols distributed around the circumference of the reel. When a slot machine with reel(s) is used, a user is allowed to spin the reels. Each reel then comes to rest, typically with either one of the symbols, or a space in between symbols, in alignment with a payline. A predefined winning symbol or a predefined combination of winning symbols that are aligned with the payline can result in the user receiving an award. In one example, the slot machine can include three reels, and the payline can be an imaginary, horizontal line disposed across a central portion of a window through which a portion of each of the three reels is visible.

As another example, a mechanical slot machine can present symbols in a matrix arrangement, with each symbol changing during a use of the mechanical slot machine. For example, the mechanical slot machine can have five columns and three rows of symbols, for a total of fifteen symbols. Such mechanical slot machines often have multiple pay lines, each being defined by a collection of positions within the matrix. For example, the mechanical slot machine can have three pay lines, each corresponding to one row of the matrix.

While slot machines were traditionally mechanical, modern slot machines often take the form of a computing system (e.g., a dedicated computing system located in a casino) that includes a graphical user interface (GUI), and that can emulate a mechanical slot machine. Despite such advances, there is a continuing need to improve how a computing system simulates a mechanical slot machine spinning its reels.

BRIEF SUMMARY OF THE INVENTION

The present application discloses embodiments including and/or related to systems, methods, and apparatus that provide improvements in computer-implemented technology by increasing the number and variety of possible outcomes based on a random selection of symbols, such as symbols that can be found on a mechanical slot machine. The present embodiments can employ a GUI, where the symbols are simulated and changing the symbols on the GUI includes replacing one simulated symbol with another through an entertaining and exciting method. The present embodiments can enable upgrading or replacing symbols that are part of a winning pattern (e.g., a payline of a line-type event, or a payway of a ways-type event), where the symbols can be upgraded or replaced, without carrying out another spin of the reels. In some embodiments, the upgraded symbols (i.e., the upgrade symbols) take a different value (e.g., an increased value) than originally selected such that a winning pattern based on the upgraded symbols versus the same winning pattern using the original symbols provides for a different award (e.g., an increased value).

In another respect, the systems, methods, and apparatus of the present application can enable the evaluation of patterns to determine winning combinations or outcomes of symbols before the upgrade or change and to determine winning combinations after the upgrade or change. By creating a cross-dependency between the symbols for each of the reels in a play or spin where symbols are upgraded or changed depending on the outcome of a pattern, the present embodiments can increase the number of possible outcomes with the same number of symbols on a reel. With this approach, the user experience can be improved for users as they are given multiple chances to win an outcome for multiple outcome events resulting from a single spin of the reels.

In a first aspect, a computing system is provided. The computing system comprises a memory containing multiple different symbols, the multiple different symbols including at least a first symbol and a second symbol, and a processor coupled to the memory. The processor is configured to provide a graphical user interface comprising multiple symbol positions arranged in multiple rows and multiple columns, each column of the multiple columns representing a spinnable reel. The graphical user interface comprises multiple particular patterns. Each particular pattern comprises multiple symbol positions across the multiple columns. The processor is also configured to output, in response to an input, a first outcome that includes for each of the multiple symbol positions an initial symbol selected from the multiple different symbols. The processor is further configured to determine, for each particular pattern, whether symbols in the symbol positions of the particular pattern form a winning pattern for the first outcome. The winning pattern for the first outcome comprises a first symbol being in two or more symbol positions of the particular pattern. Additionally, the processor is configured to output a corresponding award for each winning pattern for the first outcome. The processor is also configured to determine whether to replace the first symbol in each winning pattern for the first outcome. The processor is further configured to, based on the determination to replace the first symbols, replace, in each winning pattern for the first outcome, the first symbol with the second symbol to form a second outcome. Moreover, the processor is configured to output the second outcome. Furthermore, the processor is configured to determine, for each particular pattern, whether the symbols in the symbol positions of the particular pattern form a winning pattern for the second outcome. The winning pattern for the second outcome comprises the second symbol being in two or more symbol positions of the particular pattern. The second symbol in at least one particular symbol position of the winning pattern for the second outcome is an initial symbol selected for the at least one particular symbol position. Furthermore still, the processor is configured to output a corresponding award for each winning pattern for the second outcome.

In a second aspect, a method is provided. The method comprises providing a graphical user interface comprising multiple symbol positions arranged in multiple rows and multiple columns, each column of the multiple columns representing a spinnable reel. The graphical user interface comprises multiple particular patterns, each particular pattern comprises multiple symbol positions across the multiple columns. The method also includes outputting, in response to an input, a first outcome that includes for each of the multiple symbol positions an initial symbol selected from the multiple different symbols. The method further includes determining, for each particular pattern, whether symbols in the symbol positions of the particular pattern form a winning pattern for the first outcome. The winning pattern for the first outcome comprises a first symbol being in two or more symbol positions of the particular pattern. The method further includes outputting a corresponding award for each winning pattern for the first outcome. The method also includes determining whether to replace the first symbol in each winning pattern for the first outcome. Moreover, based on the determination to replace the first symbols, the method includes replacing, in each winning pattern for the first outcome, the first symbol with the second symbol to form a second outcome. Additionally, the method includes outputting the second outcome. Furthermore, the method includes determining, for each particular pattern, whether the symbols in the symbol positions of the particular pattern form a winning pattern for the second outcome. The winning pattern for the second outcome comprises the second symbol being in two or more symbol positions of the particular pattern. The second symbol in at least one particular symbol position of the winning pattern for the second outcome is an initial symbol selected for the at least one particular symbol position. Furthermore still, the method includes outputting a corresponding award for each winning pattern for the second outcome.

In a third aspect, a computer-readable medium is provided. The computer readable medium has stored therein instructions executable by one or more processors to cause a computing system to perform functions. The functions include providing a graphical user interface comprising multiple symbol positions arranged in multiple rows and multiple columns, each column of the multiple columns representing a spinnable reel. The graphical user interface comprises multiple particular patterns, each particular pattern comprises multiple symbol positions across the multiple columns. The functions also include outputting, in response to an input, a first outcome that includes for each of the multiple symbol positions an initial symbol selected from the multiple different symbols. The functions further include determining, for each particular pattern, whether symbols in the symbol positions of the particular pattern form a winning pattern for the first outcome. The winning pattern for the first outcome comprises a first symbol being in two or more symbol positions of the particular pattern. The functions further include outputting a corresponding award for each winning pattern for the first outcome. The functions also include determining whether to replace the first symbol in each winning pattern for the first outcome. Moreover, based on the determination to replace the first symbols, the functions include replacing, in each winning pattern for the first outcome, the first symbol with the second symbol to form a second outcome. Additionally, the functions include outputting the second outcome. Furthermore, the functions include determining, for each particular pattern, whether the symbols in the symbol positions of the particular pattern form a winning pattern for the second outcome. The winning pattern for the second outcome comprises the second symbol being in two or more symbol positions of the particular pattern. The second symbol in at least one particular symbol position of the winning pattern for the second outcome is an initial symbol selected for the at least one particular symbol position. Furthermore still, the functions include outputting a corresponding award for each winning pattern for the second outcome.

In a fourth aspect, a method is provided. The method comprises providing, by a processor, a graphical user interface comprising multiple symbol positions arranged in multiple rows and multiple columns, each column of the multiple columns representing a spinnable reel. The graphical user interface comprises multiple particular patterns, each particular pattern comprises multiple symbol positions across the multiple columns. The method also includes outputting, in response to an input, a first outcome that includes for each of the multiple symbol positions an initial symbol selected from multiple different symbols. The method further includes determining, for each particular pattern, whether the symbols in the symbol positions of the particular pattern form a winning pattern for the first outcome. The winning pattern for the first outcome comprises a first symbol being in two or more symbol positions of the particular pattern. Additionally, the method includes causing, for each winning pattern for the first outcome, a corresponding award to be awarded. Moreover, the method includes determining whether to replace the first symbol in each winning pattern for the first outcome. The method also includes based on the determination to replace the first symbols, replacing, in each winning pattern for the first outcome, the first symbol with a second symbol to form a second outcome. Additionally, the method includes outputting the second outcome. Furthermore, the method includes determining, for each particular pattern, whether the symbols in the symbol positions of the particular pattern form a winning pattern for the second outcome. The winning pattern for the second outcome comprises the second symbol being in two or more symbol positions of the particular pattern. The second symbol in at least one particular symbol position of the winning pattern for the second outcome is an initial symbol selected for the at least one particular symbol position. Furthermore still, the method includes causing, for each winning pattern for the second outcome, a corresponding award to be awarded.

In a fifth aspect, a computing system is provided. The computing system includes one or more processors and computer readable memory storing executable instructions. Execution of the executable instructions by the one or more processors causes the computing system to perform functions. The functions include providing, by the one or more processors, a graphical user interface comprising multiple symbol positions arranged in multiple rows and multiple columns, each column of the multiple columns representing a spinnable reel. The graphical user interface comprises multiple particular patterns, each particular pattern comprises multiple symbol positions across the multiple columns. The functions also include outputting, in response to an input, a first outcome that includes for each of the multiple symbol positions an initial symbol selected from multiple different symbols. The functions further include determining, for each particular pattern, whether the symbols in the symbol positions of the particular pattern form a winning pattern for the first outcome. The winning pattern for the first outcome comprises a first symbol being in two or more symbol positions of the particular pattern. The functions also include causing, for each winning pattern for the first outcome, a corresponding award to be awarded. Additionally, the functions include determining whether to replace the first symbol in each winning pattern for the first outcome. Moreover, based on the determination to replace the first symbols, the functions include replacing, in each winning pattern for the first outcome, the first symbol with a second symbol to form a second outcome. Additionally, the functions include outputting the second outcome. Furthermore, the functions include determining, for each particular pattern, whether the symbols in the symbol positions of the particular pattern form a winning pattern for the second outcome. The winning pattern for the second outcome comprises the second symbol being in two or more symbol positions of the particular pattern. The second symbol in at least one particular symbol position of the winning pattern for the second outcome is an initial symbol selected for the at least one particular symbol position. Furthermore still, the functions include causing, for each winning pattern for the second outcome, a corresponding award to be awarded.

In a sixth aspect, a computer-readable memory is provided. The computer readable memory has stored therein instructions executable by one or more processors to cause a computing system to perform functions. The functions include providing, by the one or more processors, a graphical user interface comprising multiple symbol positions arranged in multiple rows and multiple columns, each column of the multiple columns representing a spinnable reel. The graphical user interface comprises multiple particular patterns, each particular pattern comprises multiple symbol positions across the multiple columns. The functions also include outputting, in response to an input, a first outcome that includes for each of the multiple symbol positions an initial symbol selected from multiple different symbols. The functions further include determining, for each particular pattern, whether the symbols in the symbol positions of the particular pattern form a winning pattern for the first outcome. The winning pattern for the first outcome comprises a first symbol being in two or more symbol positions of the particular pattern. The functions also include causing, for each winning pattern for the first outcome, a corresponding award to be awarded. Additionally, the functions include determining whether to replace the first symbol in each winning pattern for the first outcome. Moreover, based on the determination to replace the first symbols, the functions include replacing, in each winning pattern for the first outcome, the first symbol with a second symbol to form a second outcome. Additionally, the functions include outputting the second outcome. Furthermore, the functions include determining, for each particular pattern, whether the symbols in the symbol positions of the particular pattern form a winning pattern for the second outcome. The winning pattern for the second outcome comprises the second symbol being in two or more symbol positions of the particular pattern. The second symbol in at least one particular symbol position of the winning pattern for the second outcome is an initial symbol selected for the at least one particular symbol position. Furthermore still, the functions include causing, for each winning pattern for the second outcome, a corresponding award to be awarded.

In a seventh aspect, a computer implemented method is provided. The computer-implemented method involves a software application executed by a server computing system on behalf of a client computing system with a display screen. The software application involves graphically displaying, on vertical symbol display segments of the display screen, animations that simulate spinning a plurality of reels. A memory of the server computing system stores, a global symbol group including a plurality of symbols, subsets of which are displayable in a respective vertical symbol display segment of the display screen. A hierarchy of symbols for the software application defines an order of at least a first symbol and a second symbol of the global symbol group arranged from a lowest priority to a highest priority. The display screen includes multiple particular patterns, each particular pattern comprises one symbol position from each reel across the plurality of reels. The computer-implemented method comprises selecting, by a processor of the server computing system executing the software application, a set of symbols from the global symbol group for displaying on the display screen in a first arrangement. The first arrangement defines respective symbol positions for each symbol of the set of symbols such that the set of symbols is displayed on the vertical symbol display segments. The method also includes causing the display screen to display a first animation that simulates spinning and stopping the reels. Stopping the reels results in the vertical symbol display segments displaying the set of symbols according to the first arrangement. The method further includes determining, by the processor based on the set of symbols according to the first arrangement, whether the symbols in each particular pattern form a winning pattern for a first outcome. The winning pattern for the first outcome comprises the first symbol being in two or more symbol positions of the particular pattern. Additionally, the method includes determining, by the processor, whether to replace the first symbol in each winning pattern for the first outcome. Furthermore, the method includes based on the determination, causing the display screen to display a second animation that simulates transformation of the first symbol to the second symbol in each winning pattern for the first outcome to form a second outcome. Furthermore still, the method includes determining, by the processor, whether the symbols in the symbol positions of the particular pattern form a winning pattern for the second outcome. The winning pattern for the second outcome comprises the second symbol being in two or more symbol positions of the particular pattern. The second symbol in at least one particular symbol position of the winning pattern for the second outcome is an initial symbol selected for the at least one particular symbol position in the first arrangement. Finally, the method also includes causing the client computing system to output a corresponding award for each winning pattern for the first outcome and the second outcome.

In an eighth aspect, a server computing system is provided. The server computing system includes one or more processors and computer readable memory storing a software application executable by the one or more processors to cause the server computing system to perform functions on behalf of a client computing system with a display screen. The software application involves graphically displaying, on vertical symbol display segments of the display screen, animations that simulate spinning a plurality of reels. The computer-readable memory stores, a global symbol group including a plurality of symbols, subsets of which are displayable in a respective vertical symbol display segment of the display screen. A hierarchy of symbols for the software application defines an order of at least a first symbol and a second symbol of the global symbol group arranged from a lowest priority to a highest priority. The display screen includes multiple particular patterns, each particular pattern comprises one symbol position from each reel across the plurality of reels. The functions include selecting, by a processor of the server computing system executing the software application, a set of symbols from the global symbol group for displaying on the display screen in a first arrangement. The first arrangement defines respective symbol positions for each symbol of the set of symbols such that the set of symbols is displayed on the vertical symbol display segments. The functions also include causing the display screen to display a first animation that simulates spinning and stopping the reels. Stopping the reels results in the vertical symbol display segments displaying the set of symbols according to the first arrangement. The functions further include determining, by the processor based on the set of symbols according to the first arrangement, whether the symbols in each particular pattern form a winning pattern for a first outcome. The winning pattern for the first outcome comprises the first symbol being in two or more symbol positions of the particular pattern. Additionally, the functions include determining, by the processor, whether to replace the first symbol in each winning pattern for the first outcome. Moreover, based on the determination, the functions include causing the display screen to display a second animation that simulates transformation of the first symbol to the second symbol in each winning pattern for the first outcome to form a second outcome. Furthermore, the functions include determining, by the processor, whether the symbols in the symbol positions of the particular pattern form a winning pattern for the second outcome. The winning pattern for the second outcome comprises the second symbol being in two or more symbol positions of the particular pattern. The second symbol in at least one particular symbol position of the winning pattern for the second outcome is an initial symbol selected for the at least one particular symbol position in the first arrangement. Furthermore still, the functions include causing the client computing system to output a corresponding award for each winning pattern for the first outcome and the second outcome.

In a ninth aspect, a computer-readable memory is provided. The computer readable memory has stored therein a software application executable by one or more processors to cause a server computing system to perform functions on behalf of a client computing system with a display screen. The software application involves graphically displaying, on vertical symbol display segments of the display screen, animations that simulate spinning a plurality of reels. The computer-readable memory stores, a global symbol group including a plurality of symbols, subsets of which are displayable in a respective vertical symbol display segment of the display screen. A hierarchy of symbols for the software application defines an order of at least a first symbol and a second symbol of the global symbol group arranged from a lowest priority to a highest priority. The display screen includes multiple particular patterns, each particular pattern comprises one symbol position from each reel across the plurality of reels. The functions include selecting, by a processor of the server computing system executing the software application, a set of symbols from the global symbol group for displaying on the display screen in a first arrangement. The first arrangement defines respective symbol positions for each symbol of the set of symbols such that the set of symbols is displayed on the vertical symbol display segments. The functions also include causing the display screen to display a first animation that simulates spinning and stopping the reels. Stopping the reels results in the vertical symbol display segments displaying the set of symbols according to the first arrangement. The functions further include determining, by the processor based on the set of symbols according to the first arrangement, whether the symbols in each particular pattern form a winning pattern for a first outcome. The winning pattern for the first outcome comprises the first symbol being in two or more symbol positions of the particular pattern. Additionally, the functions include determining, by the processor, whether to replace the first symbol in each winning pattern for the first outcome. Moreover, based on the determination, the functions include causing the display screen to display a second animation that simulates transformation of the first symbol to the second symbol in each winning pattern for the first outcome to form a second outcome. Furthermore, the functions include determining, by the processor, whether the symbols in the symbol positions of the particular pattern form a winning pattern for the second outcome. The winning pattern for the second outcome comprises the second symbol being in two or more symbol positions of the particular pattern. The second symbol in at least one particular symbol position of the winning pattern for the second outcome is an initial symbol selected for the at least one particular symbol position in the first arrangement. Furthermore still, the functions include causing the client computing system to output a corresponding award for each winning pattern for the first outcome and the second outcome.

In accordance with the first aspect through the ninth aspect, a pattern can include a payline of a line-type output event, or a payway of a ways-type output event.

In embodiments of the disclosure in which a computer program is used, the product can be non-transitory and store instructions on physical media such as a DVD, a solid state drive, or a hard drive. Alternatively, the product can be transitory and in the form of instructions provided over a connection such as a network connection which is linked to a network such as the Internet.

These aspects, as well as other embodiments, aspects, advantages, and alternatives will become apparent to those of ordinary skill in the art by reading the following detailed description, with reference where appropriate to the accompanying drawings. Further, this overview and other descriptions and figures provided herein are intended to illustrate embodiments using examples only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

The above, as well as additional, features will be better understood through the following illustrative and non-limiting detailed description of example embodiments, with reference to the appended drawings.

Figure 1A:
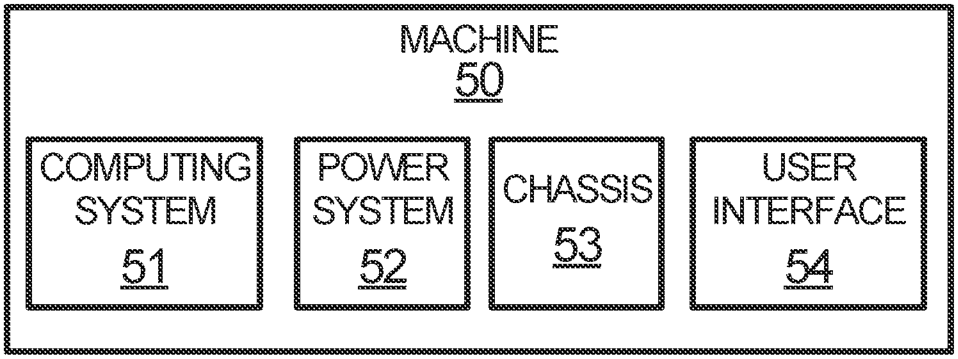
FIG. 1A is a block diagram of a machine, in accordance with the example embodiments.

All the figures are schematic, not necessarily to scale, and generally only show parts which are necessary to elucidate example embodiments, wherein other parts can be omitted or merely suggested.

DETAILED DESCRIPTION

I. Introduction

In this detailed description, several example embodiments are disclosed including, but not limited to, embodiments pertaining to performing aspects of an outcome event using a computing system (e.g., a server and/or a client computing system), a user device and/or a machine. The user device and/or the machine can be configured as and/or include a computing system. For purposes of this description, unless the context dictates otherwise, a user device or machine can include and/or be embodied as a computing system.

A computing system and/or a display screen of the computing system can display a variety of symbols during performance of an outcome event. A symbol displayed within a symbol-display-portion of the display screen during an outcome event can be replaced (upgraded) by another symbol. The replacement symbols can be used to determine an award for a winning outcome. A winning outcome can be based on symbols being displayed according to a pattern of symbols (e.g., a predefined pattern of symbols). The pattern can be defined as a payline of a line-type outcome event, or a payway of a ways-type outcome event. Unless the context of the specification dictates otherwise, an embodiment in which outcomes are based on paylines and/or a line-type outcome event, can instead be based on payways and/or a ways-type outcome event, and vice versa.

In a line-type outcome event, each payline is a pattern on reels or a matrix. The payline typically starts from a left-most reel and passes through adjacent reels until the payline reaches the right-most reel. The quantity of paylines active for a line-type outcome event can depend upon a payment and/or a selection made to perform the line-type outcome event.

In a ways-type outcome event, each payway includes a combination of matching symbols located on adjacent reels. The symbols can be in any position on one of the adjacent reels. As an example, for outcome events performed on a computing system having a display screen, the outcome events can be arranged with five reels and three rows such that there are 243 payways with three or more symbols possible. The quantity of payways active for a ways-type outcome event can depend upon a payment and/or selection made to perform the ways-type outcome event.

In accordance with the example embodiments, a pattern that results in an award can include a particular pattern that starts at either side of a symbol-display portion of a display (e.g., a left side or a right side). For example, in an embodiment in which the symbol-display portion includes a respective reel in five columns referred to as C1, C2, C3, C4, C5 as those columns are arranged from a left side of the symbol-display portion to a right side of the symbol portion, the particular pattern (e.g., a payline or payway) can include a pattern with a sufficient quantity and kind of symbols starting at column C1, or a pattern with a sufficient quantity and kind of symbols starting at column C5. For instance, if the sufficient quantity and kind of symbols equals three "K" symbols, then a pattern of "K" symbols in columns C1, C2, C3 or in columns C5, C4, C3 results in an award. Moreover, in some embodiments, a special symbol, such as a "Wild" symbol can take the place of the kind of symbol defined for the particular pattern. Other examples of the sufficient quantity and kind of symbols are possible.

Some of the described embodiments refer to multiple patterns (e.g., multiple particular patterns). In one respect, the multiple particular patterns can be multiple particular paylines. In another respect, the multiple particular patterns can be multiple particular payways. Moreover, a particular pattern can be a particular payline or a particular payway. Furthermore, a winning pattern can be a winning payline or a winning payway. Furthermore still, a horizontally extending pattern can be a horizontally extending payline or a horizontally extending payway. Similarly, a diagonally extending pattern can be a diagonally extending payline or a diagonally extending payway.

Moreover, displaying the symbols can include displaying an image of one or more reels or a matrix, together with animation effects to simulate a spin of the one or more reels, or a spin of the columns or rows of the matrix. A computer software program, which can reside in the computing system, can randomly select one or more symbols in response to a spin, and can display the selected one or more symbols on the display.

Additionally, an outcome event can be played over a computer-network, such as by a user using a client computing system that is connected to a server computing system over the computer-network. In this instance, the server computing system can cause the reels to spin and can send the resulting symbols to the client computing system for display.

Throughout this description, the articles "a" or "an" are used to introduce elements of the example embodiments. Any reference to "a" or "an" refers to "at least one" or "one or more," and any reference to "the" refers to "the at least one" or "the one or more," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures can be used in combination with one another. Thus, the figures should be generally viewed as component aspects of one or more overall embodiments, with the understanding that not all illustrated features are necessary for each embodiment.

The systems, methods, and apparatus described in this description can carry out aspects of an outcome event that includes displaying symbols. These aspects can be incorporated into outcome events, in particular, outcome events performed in response to a payment. In one aspect, the systems, methods, and apparatus provide features that can enhance traditional outcome events (e.g., slot machines or other reel-type outcome events) by providing a user with additional opportunities to win the outcome event, thereby increasing the user's interest, anticipation, and excitement in connection with the outcome event. This can in turn benefit a casino or another entity that provides an outcome event with this feature. Indeed, outcome events are typically configured to have odds that favor the casino (sometimes referred to as the "house"). Accordingly, based on the law of averages, casinos often increase their profits simply by getting more users to use its computing system to perform more outcome events. Due to the provided features, users can be drawn in (e.g., from competing casinos that lack outcome events with such features) and they can play the outcome event often. The features can include data communications between a server computing system and a client computing system within a server-client based configuration.

II. Example Architecture

FIG. 1A is a block diagram of a machine 50 in accordance with the example embodiments. The machine 50 includes a computing system 51, a power system 52, a chassis 53, and/or a user interface 54. The machine 50 can be configured to perform a method or at least some functions of a method according to the example embodiments. In at least some embodiments, the computing system 51 can include at least a portion of one or more from among: the power system 52, the chassis 53, or the user interface 54.

The computing system 51 can include a processor and a memory storing program instructions executable by the processor to perform a method or at least some functions of a method according to the example embodiments. As an example, the computing system 51 can be arranged as and/or include components of any computing system described in this description and/or shown in the drawings. In particular, the computing system 51 can be arranged as and/or include components of a computing system 100 shown in FIG. 1B, a computing system 100*a* shown in FIG. 2, or a computing system 100*b* also shown in FIG. 2.

The power system 52 includes means for powering some portion of the machine 50, such as the computing system 51 and/or the user interface 54. The power system 52 can include a power supply, such as a battery, a generator, a fuel cell, or a solar cell, or some other type of power supply instead or in addition. The power system 52 can include a power circuit for distributing electrical power throughout the machine 50 where needed. The power system 52 can include a connector and/or connection for connecting to another power system, such as a power system within a building and/or a power system of an electrical utility company.

The chassis 53 includes means for supporting and/or protecting other aspects of the machine 50. As an example, the chassis 53 can include a rack for supporting at least portions of the computing system 51, the power system 52, and/or the user interface 54. As another example, the chassis 53 can include a housing in which at least portions of the computing system 51, the power system 52, and/or the user interface 54 reside.

The user interface 54 can include one or more user interface input components configured to receive and/or produce content (e.g., a signal, data, and/or information) based on some action of a user. That content can be provided to the computing system 51. The user interface 54 can include one or more user interface output components for outputting content. That content can be provided by the computing system 51. The user action can occur by use of the user interface 54.

In at least some embodiments, the user interface 54 includes a mechanical user interface input component, such as an arm, handle or lever located on a side of the chassis 53 similar to an arm, handle, or lever located on a mechanical slot machine. As an example, the mechanical user interface input component can be configured to input a spin request to the computing system 51.

In at least some embodiments, the user interface 54 includes an acceptor, such as a paper money acceptor, a coin acceptor, a token acceptor, a validator, and/or a card reader.

In at least some embodiments, the computing system 51 includes at least a portion of the user interface 54. As an example, in embodiments in which the computing system 51 is arranged like the computing system 100, the computing system 100*a*, or the computing system 100*b*, the user interface 54 can be arranged like the user interface 104, the user interface 104*a*, or the user interface 104*b*, respectively.

Figure 1B:
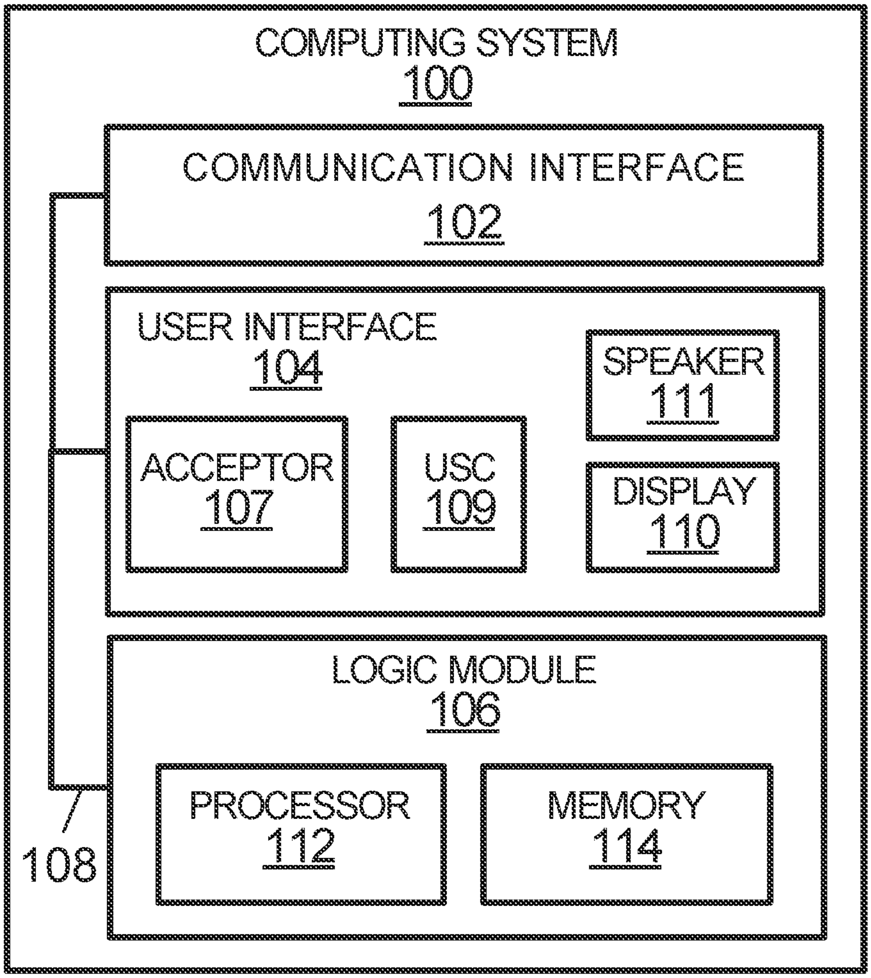
FIG. 1B is a block diagram of a computing system, in accordance with the example embodiments.

Next, FIG. 1B is a block diagram of a computing system 100 in accordance with the example embodiments. The computing system 100 can be arranged as and/or include a stand-alone computing system, a distributed computing system, a personal computer, a server computing system, a client computing system, a portable computing system, a mobile phone, a smartphone, a tablet device, or some other computing device. The computing system 100 can be referred to as a user device.

The computing system 100 can include a communication interface 102, a user interface 104, and a logic module 106, two or more which can be coupled together by a system bus, network, or other connection mechanism 108. The communication interface 102 can include a wired or wireless network communication interface. For purposes of this description, any data described as being provided, sent, or transmitted by the computing system 100 can be data sent by the communication interface 102 over a communication network. In addition, for purposes of this description, any data described as being received by the computing system 100 can be data sent to communication interface 102 over a communication network.

The user interface 104 includes components that can facilitate interaction with a user of the computing system 100. For example, the user interface 104 can include user interface output components, such as a display 110 and/or a speaker 111. As another example, the user interface can include user interface input components, such as an acceptor 107, a user-selectable control 109 (e.g., a keypad, a keyboard, or a mouse), or a touch-sensitive screen. The touch-sensitive screen can be part of the display 110, such that the display 110 is operable as both a user interface input component and a user interface output component. The user-selectable control 109 can include one or more user-selectable controls, one or more of which can be implemented on the touch sensitive screen (which can also be referred to as a touch pad).

The display 110 is configured to display (i.e., visually present and/or show) content. As an example, the content can correspond to an outcome event, such as a set of symbols selected for the outcome event, a matrix, a reel, a payline, a payway, an award, an instruction, or a user-selectable control (e.g., a button). As another example, the content can include text, a graphic, a GUI, an animation, a video, or some other content as well or instead. As yet another example, the content can include content shown in and/or described with respect to any of FIG. 4, FIG. 5, FIG. 7A to FIG. 7E, FIG. 8A to FIG. 8E, FIG. 9A to FIG. 9C, FIG. 10A to FIG. 10C, FIG. 11A to FIG. 11C, or FIG. 12A to FIG. 12L. The display 110 can include a display screen (e.g., a display panel or a graphical display unit) including a quantity of pixels (e.g., 786,432 pixels in an array of pixels that is 1,024 pixels by 768 pixels). Other examples of an array of pixels are possible.

Additionally, the display 110 and/or the display screen can include and/or be arranged as a liquid crystal display (LCD), a light emitting diode (LED) display, an organic LED (OLED) display, a plasma display or some other type of display. Furthermore, the display 110 can embody the touch sensitive screen noted above such that the display 110 and/or display screen includes and/or is arranged as a touch screen display.

The logic module 106 can include and/or be arranged as a processor 112 and/or a memory 114. The processor 112 can include a general-purpose processor (e.g., a microprocessor) or a special-purpose processor (e.g., a graphics process, a digital signal processor or an application specific integrated circuit) and can be integrated in whole or in part with the communication interface 102 or the user interface 104. Any memory discussed in this description or shown in the drawings can be referred to as a computer-readable memory, data storage, computer-readable data storage, among other names.

The memory 114 can include volatile or non-volatile storage components and can be integrated in whole or in part with the processor 112. The memory 114 can take the form of a non-transitory computer-readable medium and can include software program instructions, that when executed by the processor 112, cause the computing system 100 to perform one or more of the functions described herein. Any software program instructions discussed in this description or shown in the drawings can be referred to as computer-readable program instructions, or more simply, program instructions, or a software application.

Figure 6A:
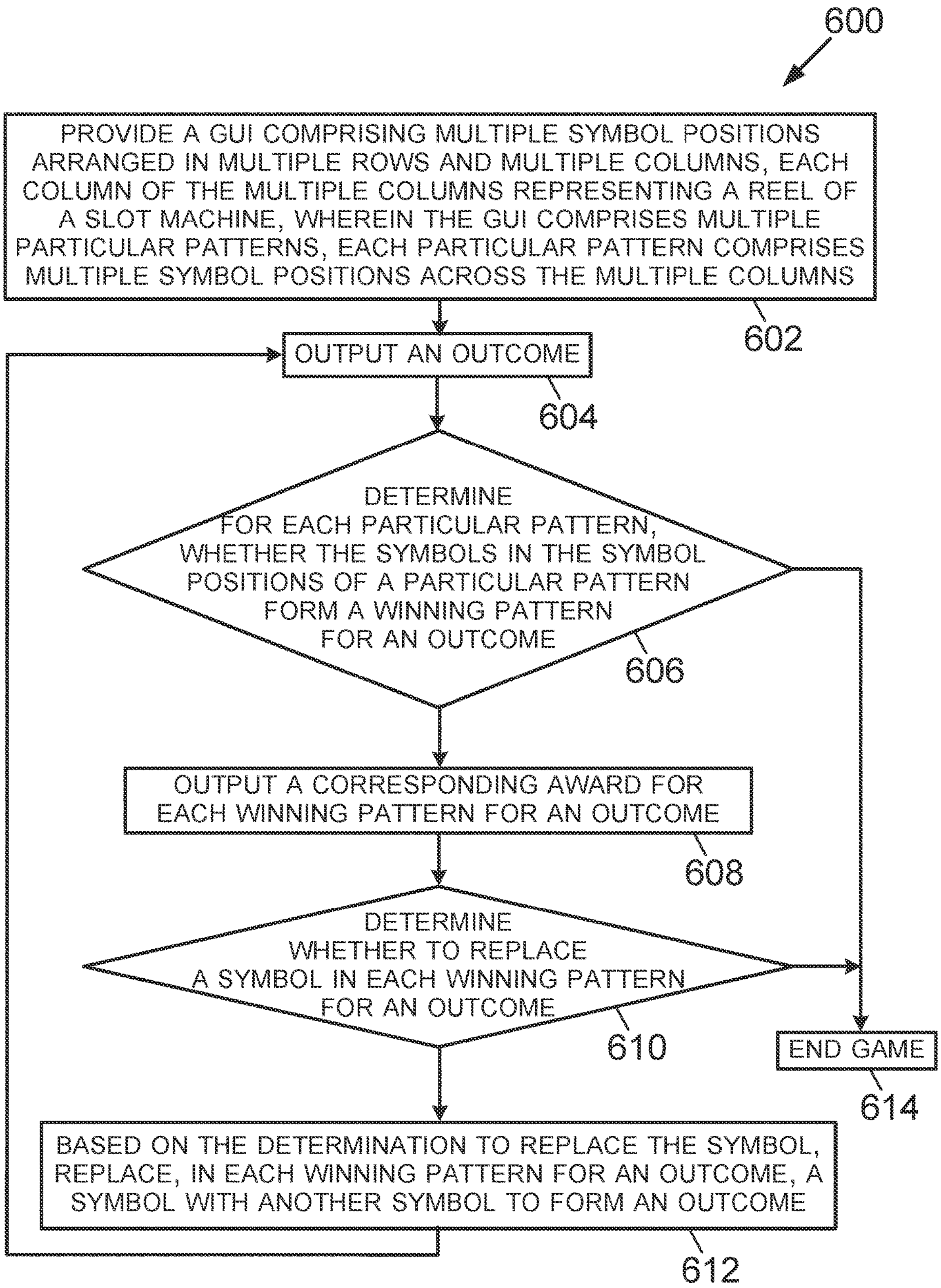
FIG. 6A and FIG. 6B are flow charts showing functions of a method in accordance with the example embodiments.
Figure 6B:
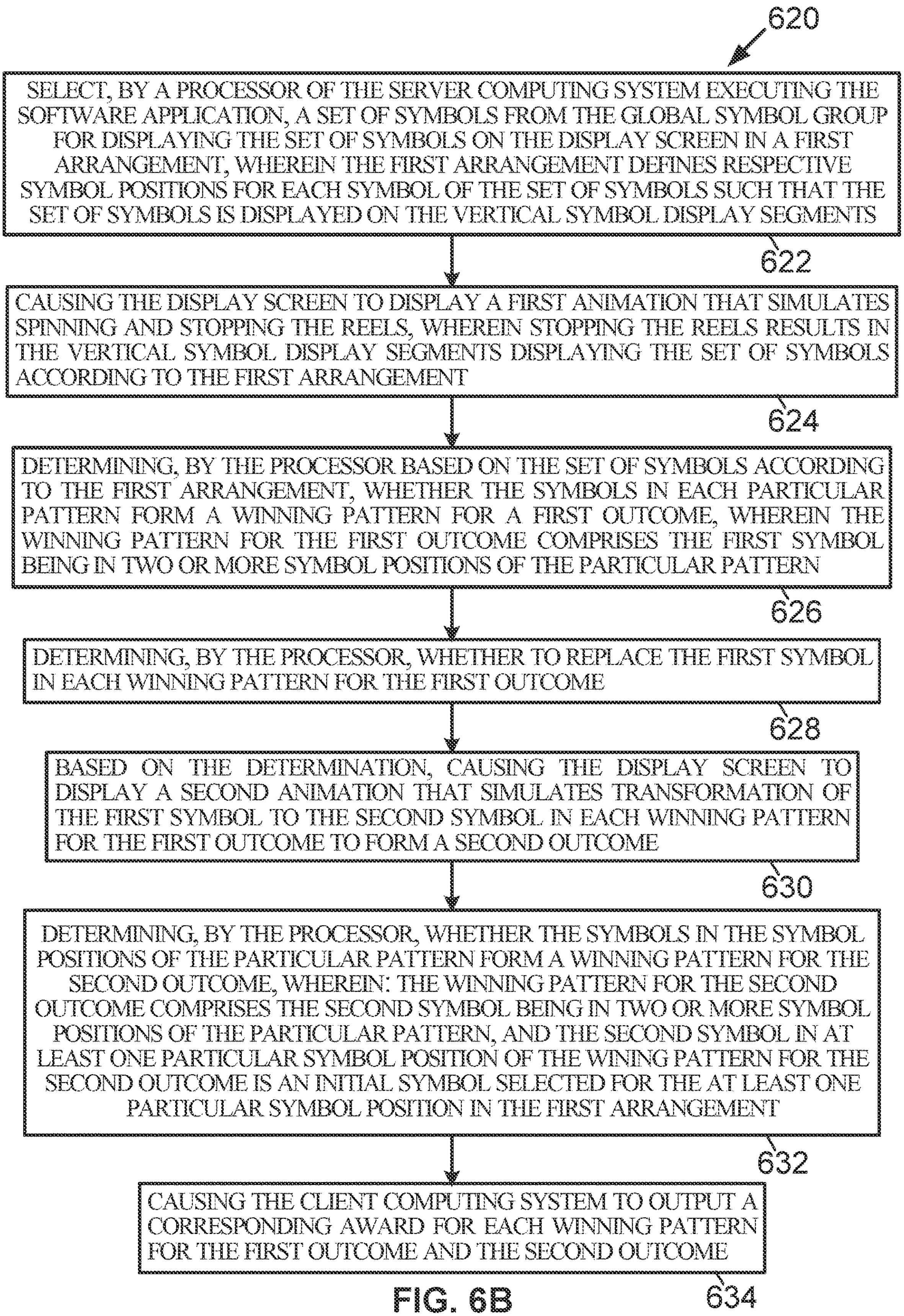

As an example, the program instructions can be executable by the processor 112 to perform a method, such as a method including one or more of the functions shown in FIG. 6A and/or one or more functions shown in FIG. 6B.

As another example, the program instructions can be executable by the processor 112 to determine a payment has been received by the user interface 104 (e.g., by the acceptor 107) and thereafter allow an outcome to be output in response to an input entered via the user interface 104.

The memory 114 can also include operating system software on which the computing system 100 can operate. For example, the computing system 100 can operate on a Windows®-based operating system available from the Microsoft® Corporation of Redmond, Wash. Other examples of an operating system are possible.

The memory 114 can include a database. As an example, the memory 114 can include a credit account database containing data related to performing an outcome event by a computing system, as well as adjusting account balances (e.g., quantities of credits) associated with client computing systems. The processor 112 can write data into the database and read data within the database.

Figure 2:
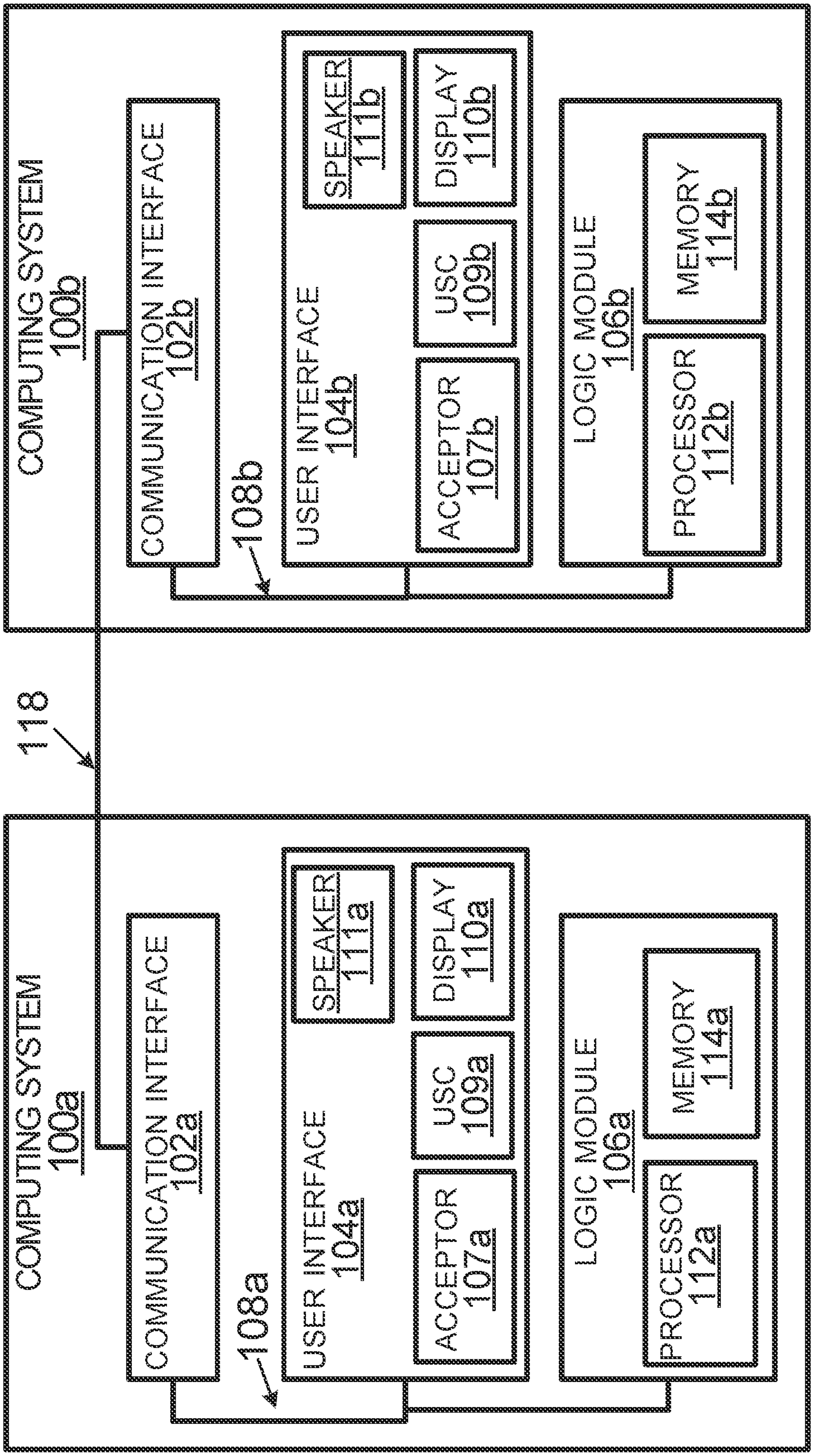
FIG. 2 is a block diagram of two computing systems connected to one another via a computer network, in accordance with the example embodiments.

FIG. 2 is a block diagram of a computing system 100*a* connected to a computing system 100*b* over a communication network 118. A configuration of elements including the computing system 100*a* and the computing system 100*b* can be referred to as a server-client based configuration.

The components of the computing system 100*a* and the computing system 100*b* are shown with corresponding "a" and "b" reference numerals (i.e., based on the computing system 100). For example, the computing system 100*a* includes a communication interface 102*a*, a user interface 104*a* (which includes an acceptor 107*a*, a user-selectable control 109*a*, a display 110*a*, and/or a speaker 111*a*), a logic module 106*a* (which includes a processor 112*a* and/or a memory 114*a*), and a communication bus 108*a*. Likewise, the computing system 100*b* includes a communication interface 102*b*, a user interface 104*b* (which includes an acceptor 107*b*, a user-selectable control 109*b*, a display 110*b*, and/or a speaker 111*b*), a logic module 106*b* (which includes a processor 112*b* and/or a memory 114*b*), and a communication bus 108*b*. In at least some embodiments, the acceptor 107*a* includes a validator, and the acceptor 107*b* includes a paper money acceptor, a coin acceptor, a validator, and/or a card reader.

The computing system 100*a* is configured to communicate with the computing system 100*b* over the communication network 118 (via the communication interface 102*a* and the communication interface 102*b*). Likewise, the computing system 100*b* is configured to communicate with the computing system 100*a* over the communication network 118. For purposes of this description, any data described as being sent or transmitted by the computing system 100*a* can include data sent by the communication interface 102*a* over the communication network 118. Similarly, any data described as being sent or transmitted by the computing system 100*b* can include data sent by the communication interface 102*b* over the communication network 118. Furthermore, for purposes of this description, any data described as being received by the computing system 100*a* can include data the computing system 100*a* receives from the communication network 118 using communication interface 102*a*. Similarly, any data described as being received by the computing system 100*b* can include data the computing system 100*b* receives from the communication network 118 using the communication interface 102*b*.

In at least some embodiments, the communication network 118 includes a local area network (LAN), such as a LAN located at least partially within a casino. In accordance with those embodiments, multiple instances of the computing system 100*b* dispersed throughout the casino can communicate with the computing system 100*a*. In some cases, the computing system 100*a* can be located within the casino. In some other cases, the computing system 100*a* can be located away from the casino.

In another example, the communication network 118 can include a wide-area network (WAN), such as an Internet network or a network of the World Wide Web. In such a configuration, the computing system 100*b* can communicate with the computing system 100*a* via a website portal (for a virtual casino) hosted on the computing system 100*a*. The data described herein as being transmitted by the computing system 100*a* to the computing system 100*b* or by the computing system 100*b* to the computing system 100*a* can be transmitted as datagrams according to the user datagram protocol (UDP), the transmission control protocol (TCP), or another protocol, and/or a file (e.g., a hypertext transfer protocol file) or some other type of file or communication.

The communication network 118 can include any of a variety of network topologies and network devices. The communication network 118 can include a wireless and/or wired network topology and network devices operable on one or both of those network topologies. As an example, the communication network 118 can include a public switched telephone network, a cable network, a cellular wireless network, a wide area network (WAN), a local area network, an IEEE® 802.11 standard for wireless local area networks (wireless LAN) (which is sometimes referred to as a WI-FI® standard) (e.g., 802.11a, 802.11b, 802.11g, 802.11n, or 802.11p), and/or a network operating according to a BLUETOOTH® standard (e.g., the BLUETOOTH® standard 5.3) developed by the Bluetooth Special Interest Group (SIG) of Kirkland, Washington.

As noted, the computing system 100 can include the acceptor 107. In at least some embodiments, the acceptor 107 includes an acceptor of a physical item associated with a monetary value, such as a paper money acceptor, a coin acceptor, or a card reader. The acceptor 107 can include a validator configured to identify the physical item, and determine whether the physical item is suitable as payment to the computing system 100. A coin acceptor can be configured to accept and identify a coin distributed by a geo-political body or a token generated for an organization other than a geo-political body, such as a casino. A card reader can be configured to read a bank card (e.g., a credit or debit card) or a customer card (e.g., a casino loyalty card).

In at least some embodiments, the computing system 100 can also physically dispense a corresponding award or payout (e.g., cash), or otherwise facilitate the payout (by adding funds to an electronic account associated with a customer card). Such an activity can be triggered by a cash out button either on the display 110 or elsewhere on the computing system 100. Additionally or alternatively to determining the payout amount, the computing system 100 can perform other actions to award the user. For instance, the computing system 100 can display an indication of a tangible prize. Other types of awards can be used as well.

For purposes of this description, a function that can be performed by the computing system 100, the computing system 100*a*, or the computing system 100*b* can be performed, at least in part, by a processor of that computing system executing program instructions and/or a software application. Those program instructions and/or software application can be stored within the memory 114, 114*a*, or 114*b*, respectively.

The memory 114, 114*a*, and 114*b* can also store data. The memory 114, 114*a*, 114*b* can include a global symbol group for an outcome event that includes multiple symbols, such as a reel-based outcome event. As an example, the multiple symbols can include a wild symbol, an ace symbol, a king symbol, a queen symbol, a jack symbol, a ten symbol and/or a nine symbol. The ace, king, queen, jack, ten and nine symbols can represent symbols found on a standard deck of playing cards. The wild symbol can have special properties that allow it to form winning combinations with other symbols. In at least some embodiments, an "A" symbol represents the ace symbol, a "K" symbol represents the king symbol, a "Q" symbol represents the queen symbol, a "J" symbol represents the jack symbol, a "10" symbol represents the ten symbol, and a "9" symbol represents the nine symbol. Other examples of symbols within the global symbol group are possible.

In at least some embodiments, the symbol group generally has a "hierarchy", which can define different values for at least some of the symbols. For example, a winning pattern including three lower-value symbols (e.g., a "9" symbol) will have a lower value than a winning pattern with three higher-value symbols (e.g., a "10" symbol).

However, such a global symbol group can be customized with particular symbols as desired. As some possible examples, the symbols can include images of people, animals, dinosaurs, fanciful creatures, cartoon characters, inanimate objects, or other things in addition to or instead of wild, ace, king, queen, jack, ten or nine symbols. Furthermore, wild symbols can vary in design. The global symbol group can be represented as a table (or other data structure) stored in the memory 114.

A memory can include one or more memories. For example, a memory can include the memory 114. As another example, a memory can include the memory 114*a* and the memory 114*b*. In accordance with this latter example, a memory can be arranged as a distributed memory. One or more processors can be operatively coupled to a memory. For example, the processor 112 is operatively coupled to the memory 114. As another example, the processor 112*a* is operatively coupled to the memory 114*a*, and the processor 112*b* is operatively coupled to the memory 114*b*. In accordance with this latter example, a processor can be arranged as a distributed processor.

Figure 3A:
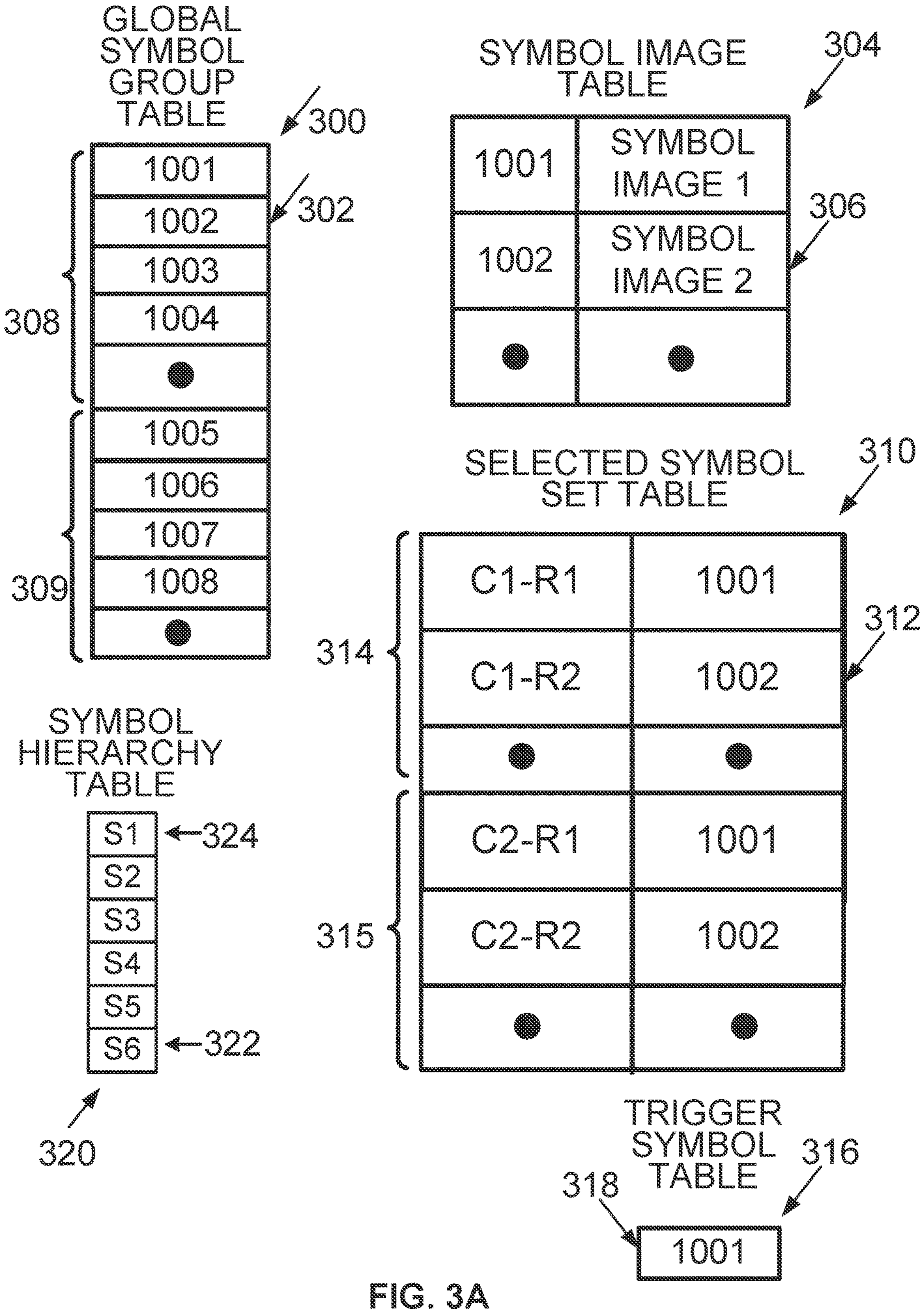
FIG. 3A and FIG. 3B show data that can be stored in a memory in accordance with the example embodiments.

Next, FIG. 3A data that can be stored in a memory (e.g., the memory 114, 114*a*, 114*b*) in accordance with the example embodiments. In particular, FIG. 3A shows a global symbol group table 300 in accordance with the example embodiments. The global symbol group table 300 includes multiple records 302, each including an identifier (e.g., 1001, 1002, 1003, 1004, etc.) that represents a particular symbol. In one example, the global symbol group, and therefore the global symbol group table 300, can be divided into multiple sub-groups (e.g., a sub-group 308, 309).

The global symbol group table 300 can be used in connection with a symbol image table 304. The symbol image table 304 includes multiple records 306 (shown as distinct rows of the symbol image table 304), each including an identifier that represents a particular symbol, and a corresponding displayable image. As such, the symbol image table 304 can be used to map an identifier in the global symbol group table 300 to a displayable image. Such an image can be arranged according to the Joint Photographic Experts Group (JPEG), Graphics Interchange Format (GIF), or Portable Network Graphics (PNG) encodings, for example.

During the course of an event, various symbol sets can be selected for display. Each selected symbol set can be stored in a table such as a selected symbol set table 310. The selected symbol set table 310 includes multiple records 312 (shown as distinct rows in selected symbol set table 310), each record including a symbol position of the symbol, and an identifier that represents the symbol. As such, each symbol in the selected symbol set can correspond to a respective symbol position in a display arrangement (e.g., both a column number and a row number in a column-and-row arrangement). As an example, C1-R1, shown in the selected symbol set table 310, represents a symbol position at column 1 (e.g., a left-most column of multiple columns in a symbol-display-portion of display 110) and row 1 (e.g., a top row of multiple rows in a symbol-display-portion of the display 110). The column identifiers in the selected symbol set table 310 (e.g., C1 and C2) can refer to columns in a symbol matrix or reels of multiple reels that can be spun.

Portions of the multiple records 312 can be grouped into a respective subset of symbol records. As an example, a subset of symbol records can include all of the symbol records for a particular column or reel in a matrix. For instance, a subset 314 of symbol records can include all of the symbol records for column C1 and/or a corresponding reel, and a subset 315 of symbol records can include all of the symbol records for column C2 and/or a corresponding reel. A person having ordinary skill in the art will understand that the global symbol group table 300 can include more than two subsets of symbol records, and the subsets of symbol records can correspond to an aspect other than a particular column (e.g., a particular row).

In accordance with the example embodiments, the computing system 100 can select a symbol set for outputting on the user interface 104 by iterating through each record 312 in the selected symbol set table 310. As an example, for each symbol position in the selected symbol set table 310 (i.e., each symbol position in the left-most column of the selected symbol set table 310), the processor 112 can determine a symbol identifier from among the symbol identifiers in the global symbol group table 300. In at least some embodiments, the symbol identifiers are numbers and the processor 112 uses a random number generator to determine numbers in the global symbol group table 300 to associate with each symbol position in the selected symbol set table 310. Other examples of how the computing system 100 and/or the processor 112 randomly determine symbols for the selected symbol set table 310 are also possible.

In at least some embodiments, the computing system 100 determines each symbol of the selected symbol set table 310 by randomly selecting any symbol from within the selected symbol set table 310.

In at least some other embodiments, the computing system 100 determines each symbol of the selected symbol set table 310 by randomly selecting each symbol for each subset of symbol records (e.g., the subset 314, 315 of symbol records) from a corresponding sub-group within the global symbol group table 300. For example, the computing system 100 can determine the symbols for the subset 314 of symbol records by randomly selecting symbols from the sub-group 308 and determine the symbols for the subset 315 of symbol records by randomly selecting symbols from the sub-group 309.

In at least some embodiments, the computing system 100 can first determine the symbols within the selected symbol set table 310 from the global symbol group table 300 and then determine a symbol position for each of those symbols. Determining the symbol position for a symbol can include the computing system 100 randomly selecting a symbol position from among multiple remaining, unassigned symbol positions and assigning the selected symbol position to one of the predetermined symbols. As an example, selecting the symbol position for an embodiment in which the display arrangement is a column-and-row arrangement can include the computing system 100 randomly determining a column identifier and a row identifier (from a set of remaining, unassigned column and row identifier combinations) for each of the predetermined symbols until there is only one remaining, unassigned column and row identifier. A last predetermined symbol would then be assigned to correspond to the one remaining, unassigned column and row identifier. As another example, selecting the symbol position for an embodiment in which the display arrangement is specified using symbol position identifiers (e.g., whole number 1 through 15, inclusive) can include the computing system 100 randomly determining a symbol position identifier (from a set of remaining, unassigned symbol position identifiers) for each of the predetermined symbols until there is only one remaining, unassigned symbol position identifier. A last predetermined symbol would then be assigned to correspond to the one remaining, unassigned symbol position identifier.

In accordance with embodiment in which a column and row arrangement is used to simulate reels, the computing system 100 can display each subset of selected symbols in a corresponding column. As an example, the computing system 100 can superimpose each subset of selected symbols over a virtual reel in a corresponding column. Thus, a sub-group 308, 309 can represent an ordering of symbols on a particular reel.

As another example, the memory can contain a symbol hierarchy table 320. The symbol hierarchy table 320 can include an ordered list of symbols. The ordered list of symbols can include at least a portion of the symbols within global symbol group table 300. As shown in FIG. 3A, the symbol hierarchy table 320 includes a symbol S1, S2, S3, S4, S5, S6 arranged in an order from a first symbol 322 (i.e., symbol S6) to a final symbol 324 (i.e., symbol S1). A person having ordinary skill in the art will understand that the symbol hierarchy table 320 includes a different quantity of symbols. In accordance with at least some implementations, symbol S6 can be a "9" symbol, symbol S5 can be a "10" symbol, symbol S4 can be a "J" symbol, symbol S3 can be a "Q" symbol, symbol S2 can be a "K" symbol, and symbol S1 can be an "A" symbol.

Figure 3B:
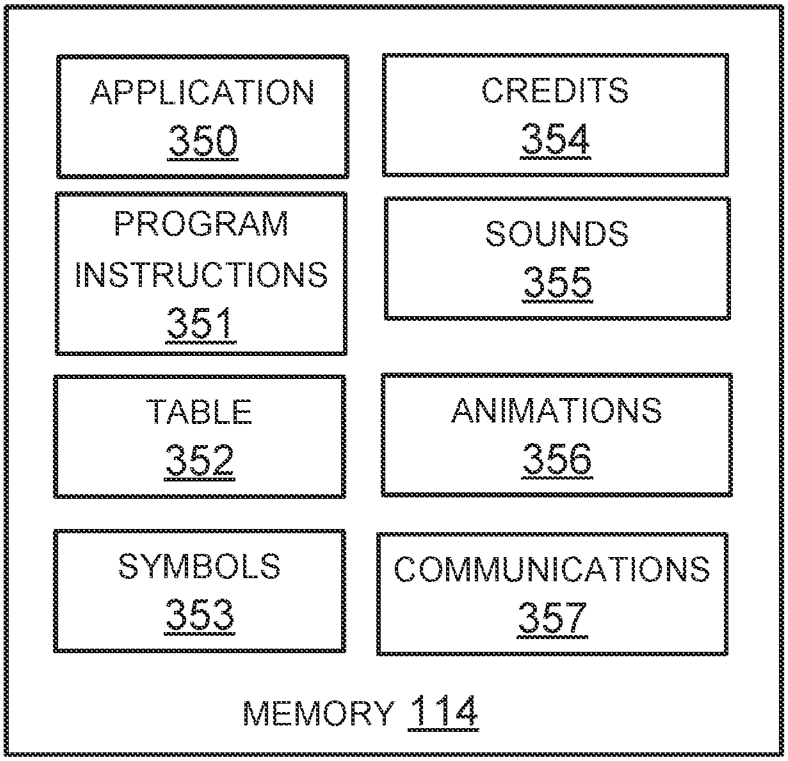

Next, FIG. 3B shows the memory 114 and data that can be stored in the memory in accordance with the example embodiments. The memory 114*a* can contain at least some of the data stored in the memory 114. Likewise, the memory 114*b* can contain at least some of the data stored in the memory 114.

As shown in FIG. 3B, the memory 114 can include one or more from among: an application 350, program instructions 351, a table 352, symbols 353, credits 354, sounds 355, animations 356, or communications 357.

The application 350 can include any software application discussed in this description. The application 350 can also include an operating system, such as any operating system described in this description.

The program instructions 351 are computer-readable program instructions executable by one or more processors. The program instructions 351 can be executable to cause a computing system or a component of the computing system to perform any function described in this description. The program instructions can include the application 350.

The table 352 can include one or more tables, such as one or more tables shown in FIG. 3A. In at least some embodiments, the memory 114 can contain any data described as being stored in a table in some manner other than a table. As an example, the memory 114 can store program instructions that include data described as being contained in a table.

The symbols 353 can include computer-readable data a processor can read to generate a symbol on a display screen, graphical display unit, graphical display interface, or GUI. As an example, the symbols 353 can include a respective computer-readable file (e.g., a bitmap file) for each symbol. As another example, the symbols 353 can include a computer-readable file a processor can read to generate any symbol discussed in this description and/or shown in the drawings, such as a "9" symbol, a "10" symbol, a "J" symbol, a "Q" symbol, a "K" symbol, or an "A" symbol. A table, such as the symbol image table 304, can include an index value (e.g., a numerical identifier or a file name) corresponding to a symbol in the symbols 353.

The credits 354 can include a number of credits available for a user of a computing system. If the credits 354 are stored in the memory 114*b*, the credits can include a number of credits available for a user of the computing system 100*b*. If the credits 354 are stored in the memory 114*a*, the credits can include a respective number of credits available for a user of a respective computing system arranged like the computing system 100*b*. A processor can update the credits available for each user based on payments entered at a computing system by that user, awards earned by use of the computing system by that user, and/or by use of an acceptor and/or validator.

The sounds 355 include audio files (e.g., an audio clip) that the processor 112 can output to a speaker. Outputting an audio file can include outputting a signal that produces a particular sound when the signal passes through a speaker. As an example, the particular sound can include a first particular sound to play when reels are spinning on the display 110*b* or a second particular sound to play when symbols are being upgraded between outcome events. As another example, the particular sound can include a particular sound played for first, second, third, or fourth operating states discussed below with respect to FIG. 13. As another example, the sounds 355 can include an audio file, such as an audio file with one of the following file name extensions: WAV, MP3, MP4, WMA, or some other file name extension.

Each sound in the sounds 355 can correspond to an index value such that the processor 112*a* can provide the processor 112*b* with an instruction including a particular index value so that the processor 112*b* outputs via the speaker 111*b* an audio file corresponding to the particular index value. Accordingly, the processor 112*a* does not have to transmit the audio file to the processor 112*b* each time the audio file is to be output via the speaker 111*b*.

The animations 356 can include computer-readable files containing animations on a display, such as the display 110, 110*a*, 110*b*. As an example, the animations 356 can include animation files, such as an animation file with one of the following file name extensions: GIF, PNG, JPEG, SVG, or some other file name extension. Each animation in the animation 356 can correspond to an index value such that the processor 112*a* can provide the processor 112*b* with an instruction including a particular index value so that the processor 112*b* outputs via the display 110*b* an animation file corresponding to the particular index value. Accordingly, the processor 112*a* does not have to transmit the animation file to the processor 112*b* each time the animation file is to be output via the display 110*b*.

The communications 357 include one or more communications, such as one or more from among: a communication sent by the processor 112 coupled to the memory 114, a communication generated for transmitting by the processor 112 coupled to the memory 114, or a communication received by the computing system 100. As an example, the communications 357 can include a communication shown in FIG. 13 or in FIG. 14. As another example, for embodiment in which the communications 357 are stored in the memory 114*a*, the communications 357 can include a communication sent by the processor 112*a* to the computing system 100*b*, a communication generated for transmitting by the processor 112*a* coupled to the computing system 100*b*, or a communication received by the computing system 100*a*. As yet another example, for embodiment in which the communications 357 are stored in the memory 114*b*, the communications 357 can include a communication sent by the processor 112*b* to the computing system 100*a*, a communication generated for transmitting by the processor 112*b* coupled to the computing system 100*b*, or a communication received by the computing system 100*b*.

Figure 3C:
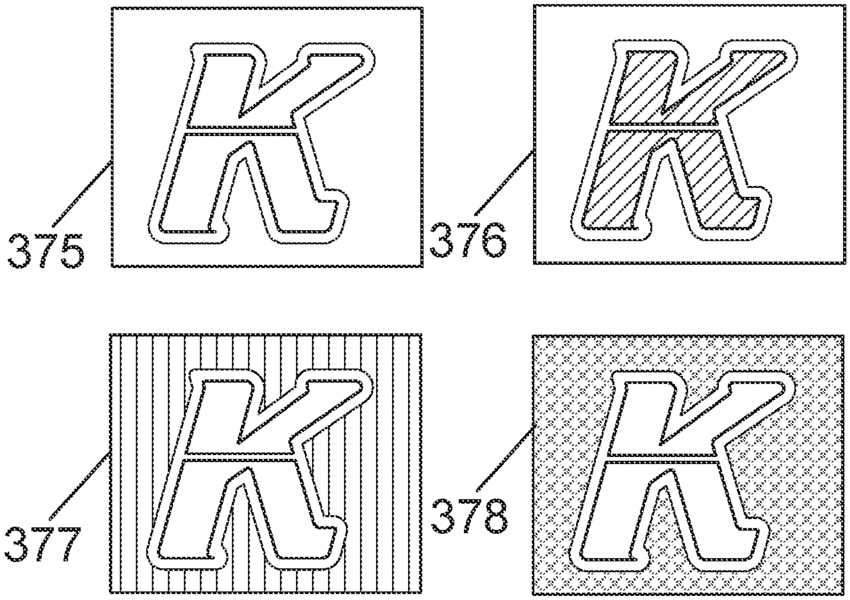
FIG. 3C shows different versions of a symbol having a common hierarchical value in accordance with the example embodiments.

Next, FIG. 3C shows different versions of a symbol having a common hierarchical value in accordance with the example embodiments. In particular, FIG. 3C shows a symbol 375, 376, 377, 378 having a common hierarchical value of a "K" symbol. The symbol 375, 376, 377, 378 can be displayed for different circumstances of an outcome event. For example, the symbol 375 can be displayed after a spin of the reels on a display screen, such as a display screen 1200 shown in FIG. 12A, at a particular symbol position such as a symbol position at C4, R2. As another example, the symbol 376 can be displayed if the symbol 375 is to be upgraded to a different symbol in a hierarchical structure of symbols. For example, if the symbol 375 is to be upgrade to an "A" symbol, the display screen 1200 can show the symbol 376 at the symbol position C4, R2 to indicate that the symbol 375 is be upgraded.

Figure 11A:
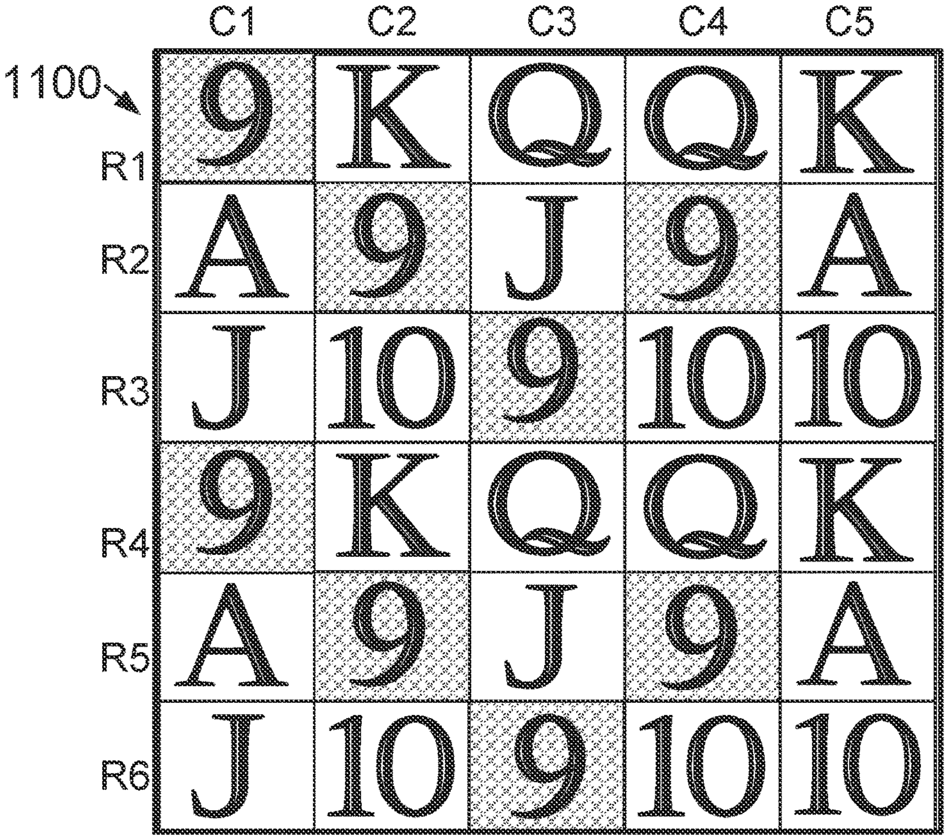
FIG. 11A, FIG. 11B, and FIG. 11C show a display screen in accordance with the example embodiments.

As another example in which an outcome event is a ways-type event, the symbol 375 can be displayed after a spin of the reels on a display screen, such as a display screen 1100 shown in FIG. 11A, at a particular symbol position such as a symbol position at C5, R1. The symbol 377 can be displayed on the display screen 1100 at the symbol position at C5, R1 while the display screen 1100 is showing which symbols are to be upgraded. The symbol 378 can be displayed on the display screen 1100 at the symbol position at C5, R1 to indicate that symbol 378 is part of payway that is being evaluated for being a winning outcome or that is part of a payway that is a winning outcome. Accordingly, a display screen can display different symbols having a common hierarchical value at a particular symbol position depending on a state of a symbol at that symbol position being upgraded during an outcome event.

Figure 4:
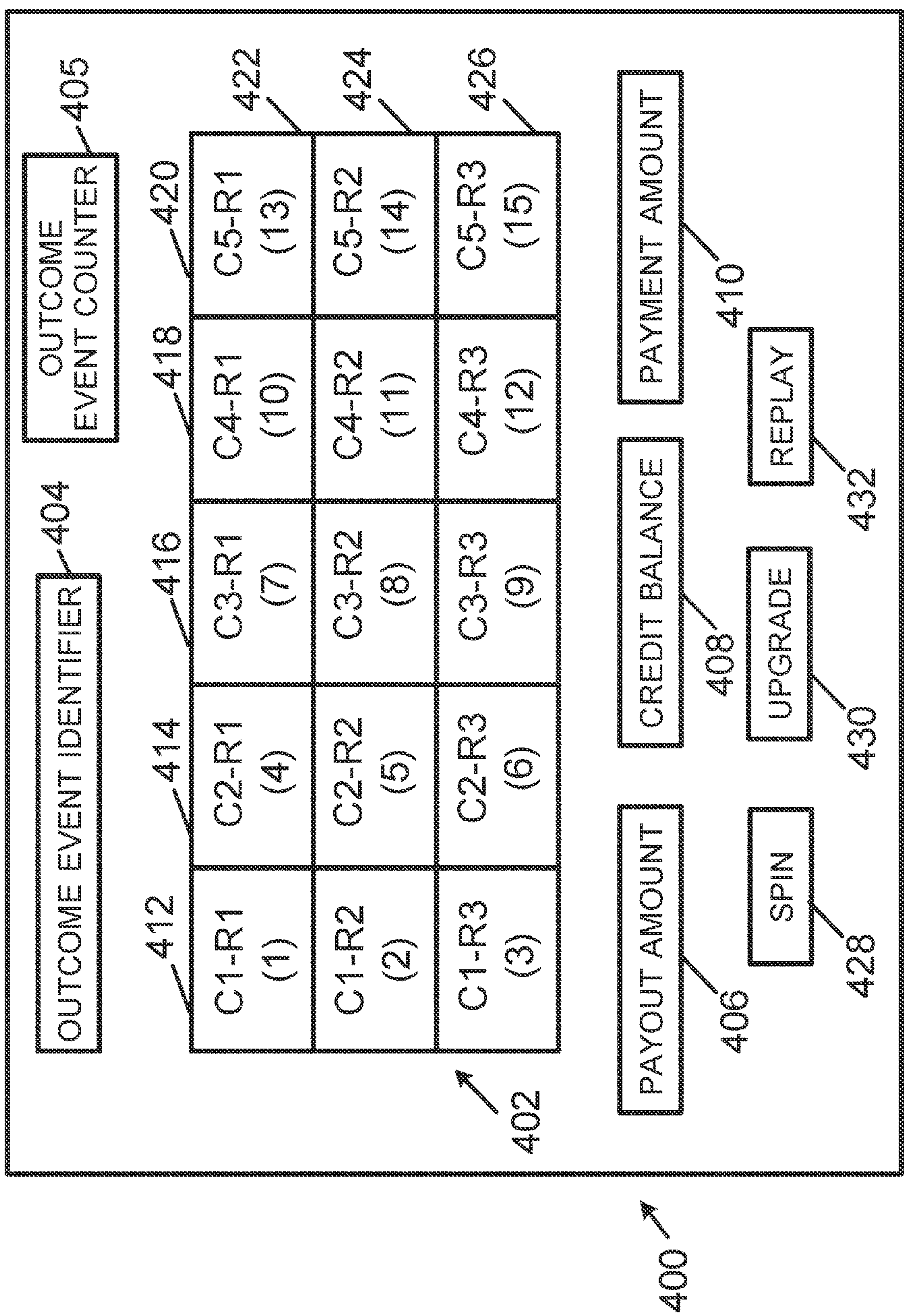
FIG. 4 shows a graphical user interface in accordance with the example embodiments.

Next, FIG. 4 depicts a GUI 400 that the computing system 100, the computing system 100*a*, or the computing system 100*b* can output on the display 110, 110*a*, and 110*b*, respectively. For purposes of this description, each element of the GUI 400 can be a displayable element of the GUI 400. The GUI 400 includes a symbol-display-portion 402, an outcome event identifier 404, an outcome event counter 405, a payout amount indicator 406, a credit balance indicator 408, and a payment amount indicator 410.

The symbol-display-portion 402 can include multiple symbol-display-segments and multiple symbol positions. As an example, the symbol-display-segments can include a vertical symbol-display-segment (SDS) 412, 414, 416, 418, 420. As another example, the symbol-display-segments can include a horizontal symbol-display-segments 422, 424, 426. Each symbol-display-segment can include multiple symbol positions. The vertical SDS 412 to the vertical SDS 420 are shown as having three symbol positions. The horizontal SDS 422, 424, 426 are shown as having five symbol positions. A person skilled in the art will understand that those symbol-display-segments can be configured with a different number of symbol positions.

In at least some embodiments, the vertical SDS 412, 414, 416, 418, 420 is configured as a spinnable reel. The GUI 400 can display the spinnable reels spinning by displaying an animation of the reels spinning and the displaying reels coming to a stop. For vertical SDS 412, 414, 416, 418, 420, the spinnable reels can spin in a vertical direction (e.g., top to bottom or bottom to top, with respect to the symbol-display-portion 402).

In at least some other embodiments, the horizontal SDS 422, 424, 426 is configured as a spinnable reel. The GUI 400 can display the spinnable reels spinning and stopped after spinning. For the horizontal SDS 422, 424, 426, the spinnable reels can spin in a horizontal direction (e.g., left to right or right to left, with respect to the symbol-display-portion 402).

The computing system 100 can cause a symbol-display-segment to spin, and to cause a spinning symbol-display-segment to stop spinning. The spinning and stopping of the spinning symbol-display-segment can be carried out for each outcome event. In accordance with the embodiments in which the symbol-display-portion 402 includes columns or reels that spin from top to bottom or bottom to top, spinning the reels can include starting the spinning from a left-most column or reel to a right-most column or reel. Stopping the reels can occur using a similar sequence. Other sequences of spinning and stopping the spinning can be used. Moreover, the spinning or stopping of spinning of two or more columns or reels can occur simultaneously.

The multiple symbol positions in the symbol-display-portion 402 are identified by column and row designators, in which C1=column 1, C2=column 2, C3=column 3, C4=column 4, C5=column 5, R1=row 1, R2=row 2, and R3=row 3. The multiple symbol positions in the symbol-display-portion 402 are also identified by distinct numerical identifiers shown within parenthesis. C1 can be a first SDS. C2 can be a second SDS. C3 can be a third SDS. C4 can be a fourth SDS. C5 can be a fifth SDS. As shown in FIG. 4, C2 is between C1 and C3, C3 is between C2 and C4, and C4 is between C3 and C5.

For a matrix arrangement with 15 symbol positions as shown in FIG. 4, the numerical identifiers can be whole numbers 1 through 15, inclusive. The processors or computing systems described herein can be configured to select a symbol position of the symbol-display-portion 402 using a random number generator that is configured to generate a number within the range 1 through N, inclusive, where N equals the number of symbol positions in the symbol-display-portion 402. For the matrix arrangement, each symbol-display-segment can be a distinct column of the multiple columns within the matrix. Alternatively, for the matrix arrangement, each symbol-display-segment can be a distinct row of the multiple rows within the matrix.

The processor of a computing system described herein can determine an operating state of the computing system and/or an outcome event that can occur during the determined operating state. In response to making those determination(s), the processor can cause the outcome event identifier 404 to display an identifier of the outcome event that can occur during the determined state. For example, the outcome event identifier can identify a base outcome event, a bonus outcome event or another type of outcome event. The bonus outcome event can be a "free spins" outcome event or some other outcome event.

The processor of a computing system described herein can determine a payment amount placed on an outcome event, an award or payout amount after or during occurrence of an outcome event resulting in a win, a credit balance after or while decreasing a number of credits based on a payment or after or while increasing a number of credits based on a determined award or payout amount, and/or a number of awarded remaining outcome events that can occur. The processor can cause the determined payment amount to be displayed by the payment amount indicator 410, the determined payout amount to be displayed by the payout amount indicator 406, the determined credit balance to be displayed by the credit balance indicator 408, and the number of awarded remaining outcome events to be displayed by the outcome event counter 405.

In at least some embodiments, a memory (e.g., the memory 114, 114*a*, 114*b*) can include a payout table. Moreover, in at least some of those embodiments, a processor (e.g., the processor 112, 112*a*, 112*b*) can read at least a portion of the payout table within the memory, In at least some embodiments, the processor can output at least a portion of the table on a user interface (e.g., the user interface 104, 104*a*, 104*b*). The payout table can indicate various sets or combinations of symbols that are defined as a winning outcome and an award or payout corresponding to each winning outcome. A symbol in those sets or combinations can include a regular symbol or a wild symbol. A regular symbol represents only a single symbol. In contrast, a wild symbol can represent one or more regular symbols depending on what regular symbol is needed for a particular payline or payway including the wild symbol to result in a winning outcome and how many paylines or payways are evaluated by the processor.

As an example, a winning outcome can include three instances of the same regular symbol (or a combination of the same regular symbol and one or more wild symbols in three symbol positions) along a given payline or payway. As another example, a winning outcome can include four instances of the same regular symbol (or a combination of the same regular symbol and one or more wild symbols in four symbol positions) along a given payline or payway As yet another example, a winning outcome can include five instances of the same regular symbol (or a combination of the same regular symbol and one or more wild symbols in five symbol positions) on a given payline or payway. As yet another example, an award corresponding to one or more of the aforementioned winning outcomes can include an award of one or more credits added to a credit meter balance contained in a memory for a user using the computing system 100*b*. Other examples of a winning combination and a corresponding award within the payout table are possible.

The GUI 400 can include one or more user-selectable controls (USCs). As shown in FIG. 4, the GUI 400 can include a USC 428, 430, 432. Selection of the USC 428, 430, 432 can cause the processor 112*b* and/or another component of the computing system 100*b* to perform one or more functions. As an example, selection of the USC 428 can cause the processor 112*b* to transmit a spin request and/or a communication including a spin request (e.g., a communication Com-3 shown in Table A below). As another example, selection of the USC 430 can cause the processor 112*b* to upgrade a symbol shown on the display and/or to transmit a communication including an upgrade request (e.g., a communication Com-4 shown in Table A below). As yet another example, selection of the USC 432 can cause the processor 112*b* to replay an outcome event via the user interface 104*b*.

In at least some embodiments, a USC on a GUI can be reconfigured depending on an operating state of the computing system 100, the computing system 100*a*, or the computing system 100*b*. As an example, a single USC on the GUI 400 can be configured as the USC 428 when the computing system 100*b* is operating in an operating state in which the computing system 100*b* is not performing an outcome event for the computing system 100*b*, and as the USC 430 when the computing system 100*b* is operating in an operating state in which the computing system 100*b* is performing an outcome event for the computing system 100*b*. In at least some of those embodiments, the single USC may be unelectable while the computing system 100*b* is performing an outcome event for the computing system 100*b* until the processor determines the outcome event includes a winning combination on a payline or payway.

Figure 5:
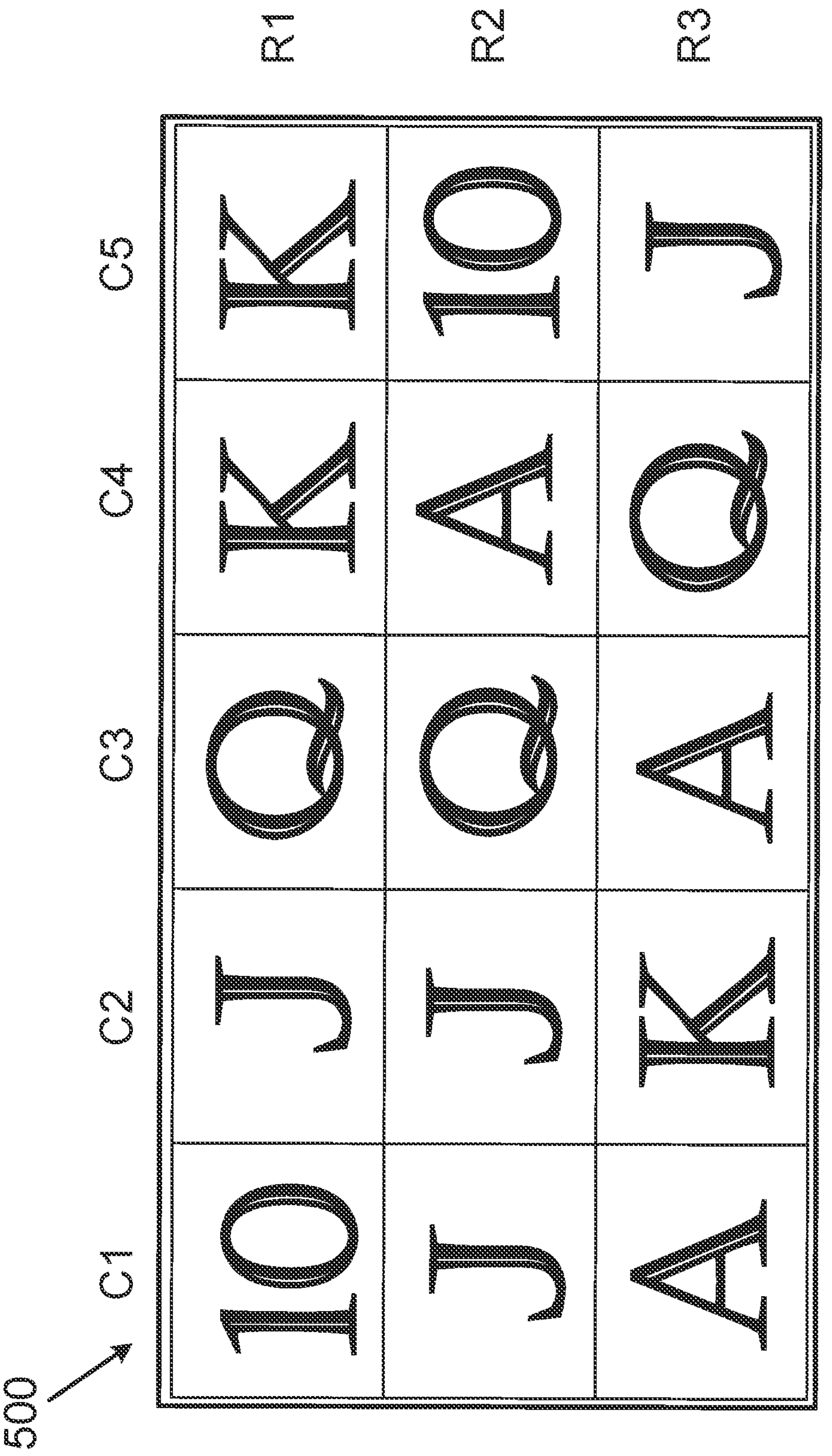
FIG. 5 depicts a selected symbol set in a display, in accordance with the example embodiments.

Next, FIG. 5 shows a selected symbol set 500 in accordance with the example embodiments. The selected symbol set 500 can include symbols selected from the global symbol group table 300 for display during an outcome event. The symbols shown in FIG. 5 are arranged according to the symbol-display-portion 402. In particular, the selected symbol set 500 includes: (i) a "10" symbol at a symbol position C1-R1 and a symbol position C5-R2, (ii) a "J" symbol at a symbol position C2-R1, a symbol position C1-R2, a symbol position C2-R2, and a symbol position C5-R3, (iii) a "Q" symbol at a symbol position C3-R1, a symbol position C3-R2, and a symbol position C4-R3, (iv) a "K" symbol at a symbol position C4-R1, a symbol position C5-R1, and a symbol position C2-R3, and (v) an "A" symbol at a symbol position C4-R2, a symbol position C1-R3, and a symbol position C3-R3. Other arrangements of symbols, in terms of the number of columns, number of rows, or the layout of symbols, are possible.

III. Example Operation

A. Introductory Functions

The example embodiments can include machines and/or computing systems that perform functions and methods that include different combinations of the functions. Before turning to FIG. 6A, functions that can be performed as part of a method and/or that relate to method of the example embodiments are now described.

First, one or more other functions described as being performed by the computing system 100, the computing system 100*a*, and/or the computing system 100*b* can be performed prior to, while, or after performing one or more of the functions of a method including one or more functions shown in FIG. 6A, unless context clearly dictates otherwise. Those other functions can be performed in combination with or separately from any one or more of the functions shown in FIG. 6A. A function described in this description can be performed, at least in part, by a processor, such as processor 112, 112*a*, 112*b* executing software program instructions.

In at least some embodiments, the computing system 100 can receive a payment. For example, the processor 112 can receive an input from a keypad of the user interface 104. The input can correspond to a particular payment selected via the user interface 104. The payment can pertain to an outcome event, such as, but not limited to, an outcome event configured as a base outcome event, a bonus output event, or a combination thereof. As another example, the computing system 100 can receive a payment via the acceptor 107 to allow performance of the outcome event.

In at least some embodiments, the payment provides a user of the computing system with an opportunity to earn (e.g., win) a payout. The computing system 100 can be configured such that additional or bonus outcome events can be carried out without receiving an additional payment after receiving an initial payment to carry out an outcome event that results in an award of a predetermined number of additional or bonus outcome events.

In at least some of the embodiments, the computing system 100 can enable a user to make a payment corresponding to one or more of the patterns. A predefined combination of winning symbols that are aligned with a pattern (e.g., a payline or payway) can result in the user winning an outcome event and receiving a payout.

For embodiments using a payline, a payline indicator can be displayed on the display 110 prior to, during, or after an outcome event. The payline indicator can include one or more line segments passing through a central portion each symbol-display-portion that forms part of a payline. For example, when the computing system 100 outputs a GUI having multiple reels, the payline indicator can include a horizontal line disposed across the central portion each symbol-display-portion that forms part of a horizontal payline. The payline indicator for a different payline can be horizontal, vertical, circular, diagonal, angled or any combination thereof (e.g., a zigzag).

For embodiments using a payway (i.e., a ways-type outcome event), the symbols on a payway can be highlighted while displayed on the display 110 prior to, during, or after an outcome event. The active payways in a ways-type outcome event can be horizontal, vertical, circular, diagonal, angled or any combination thereof.

The computing system 100 can include a particular number of patterns for a particular outcome event up to a maximum number of patterns defined for a particular outcome event. The maximum number of patterns can be based on an arrangement of a symbol-display-portion (e.g., the symbol-display-portion 402) within a GUI. A number of patterns can be activated for the particular outcome event. As an example, the number of activated patterns can be based on a payment received at the computing system 100 and/or a selection of the patterns to activate. In at least some other embodiments, activation of patterns for the particular outcome event can be based on a payment made for a primary outcome event that precedes the particular outcome event, a status of a user determined through a user tracking system, an occurrence of one or more symbols in the primary outcome event, a random selection, a default selection, a selection of a user, determined randomly or on a predetermined basis, determined from input of a user, among some other factor.

As noted, the computing system 100 can track a credit balance from which a number of credits can be deducted in response to the computing system 100 receiving a payment and/or a spin request from the user interface 104. The credit balance can be maintained in the memory 114. The processor can output the credit balance indicator 408 based on an amount of credits indicated by the credit balance stored in the memory 114. For example, a credit balance having a particular number of credits can be reduced upon the computing system 100 receiving a payment and/or a play request from the user interface 104. Additionally, or alternatively, the payment can be received by entry of a token, coin, or paper bill into the user interface 104 (e.g., into the acceptor 107) or by sliding or inserting a payment card, such as a credit or debit card, into the user interface 104 (e.g., into the acceptor 107). The computing system 100 can output on the display 110 payment information such as, but not limited to, a credit balance on the credit balance indicator 408, possible payment amounts in the payment amount indicator 410, and a received payment amount in the payment amount indicator 410.

In at least some of the embodiments, the computing system 100 can receive a play request (e.g., a "spin" request). Receiving the play request can involve or allow a user to pull a lever of the user interface 104 or push a button of the user interface to initiate an occurrence of an outcome event. In at least some embodiments, the play request can provide the user with one or more spins of the outcome event. The number of spins can be randomly determined, predetermined, or determined in any suitable manner. The spin request can activate or spin one or more reels of the outcome event. Further, receiving the play request can result in the user's credit balance being reduced by an amount of the user's payment to carry out the outcome event.

Further, the computing system 100 can determine a symbol set. Determining the symbol set can include the processor 112 carrying out a random selection, such as a random selection of a symbol set from a global symbol group table 300. FIG. 5 shows an example of a display of symbols of a symbol set selected from a global symbol group. As shown in FIG. 5, the symbol set can include the "9" symbol, the "10" symbol, the "J" symbol, the "Q" symbol, the "K"

symbol, and the A symbol, which can be the ascending order of the value of the symbols based on a symbol hierarchy. For example, each symbol can have a value, with a "9" symbol having the lowest value and an A symbol having the highest value. Thus, a "10" symbol has a lower value than a "J" symbol. In a winning pattern or outcome, a set of three "9" symbols can offer the lowest win to a user, while a set of all A symbols can offer the highest win to a user. Further, a win consisting of three lower value symbols (e.g., "10" symbols) will have a lower value than a win consisting of three higher value symbols (e.g., "J" symbols).

B. First Flowchart

Next, FIG. 6A is a flow chart showing a set of functions of a method 600 that can, for example, be carried out using the computing system 100 of FIG. 1A. Nonetheless, some or all of the functions of the method 600 can be carried out on the computing system 100*a* and/or the computing system 100*b*. The functions of the method 600 are shown within blocks labeled with even integers between 602 and 614, inclusive.

The method 600 can relate to performing one or more outcome events, such as one or more outcome events carried out in response to a payment. For example, as described below, the method 600 can relate to a reel-based outcome event. Even so, the method 600 and other embodiments described herein are not limited to such an implementation.

Block 602 includes providing a graphical user interface comprising multiple symbol positions arranged in multiple rows and multiple columns. Each column of the multiple columns represents a reel of a slot machine. The graphical user interface comprises multiple particular patterns. Each particular pattern comprises multiple symbol positions across the multiple columns.

As an example, the processor 112 can include a graphics processor to output the GUI on a display. As another example, the processor 112*a* can provide the GUI to the processor 112*b* via the communication network 118.

As yet another example, the graphical user interface can be arranged like and/or include aspects of a graphical user interface shown in the drawings (e.g., the GUI 400) or a graphical interface shown on a display screen (e.g., the display screen 700) shown in the drawings. Accordingly, the GUI can include symbol-display-portions for displaying symbols of a selected symbols set. The processor 112 can execute program instructions to determine the selected symbols set. For example, after the processor 112 receives an input from the user interface 104 (e.g., an input indicating a play request or a spin of the reels, the processor 112 can provide the GUI comprising, for each of the multiple symbol-display portions of the display, a symbol selected from a symbol set (e.g., the global symbol group table 300).

Figure 7A:
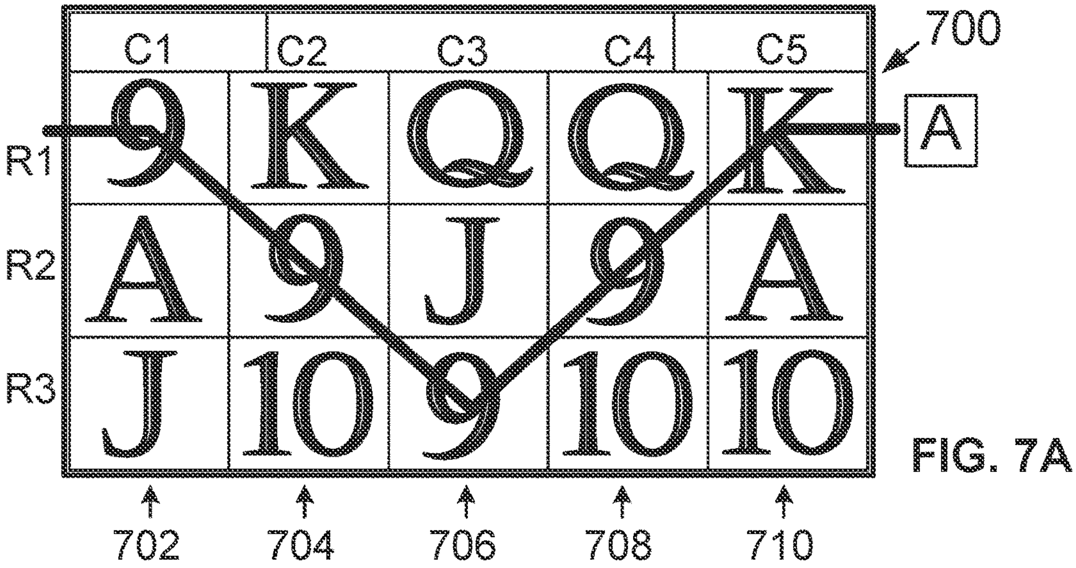
FIG. 7A, FIG. 7B, FIG. 7C, FIG. 7D, and FIG. 7E show a display screen in accordance with the example embodiments.

FIG. 7A illustrates a display screen 700 showing a reel-based outcome event output after the reels have stopped spinning in accordance with the example embodiments. The display screen 700 includes multiple symbol-display-portions or positions arranged in multiple rows R1 to R3 and multiple columns C1 to C5. Each column of the multiple columns represents a separate reel considered for an outcome event. Those columns and rows are applicable to FIG. 7B to FIG. 7E.

As shown in FIG. 7A, the display screen 700 consists of five vertical reels (e.g., a reel 702 in a first column (e.g., column C1), a reel 704 in a second column (e.g., column C2), a reel 706 in a third column (e.g., column C3), a reel 708 in a fourth column (e.g., column C4), and a reel 710 in a fifth column (e.g., column C5)). Each of those reels has three symbol-display-portions or positions output on the display (e.g., the display 110). As such, the display screen 700 can represent a 3×5 symbol matrix (3 rows and 5 columns (reels)). Of course, any number of reels and/or any number of symbol positions on each reel can be utilized and the embodiments described herein are not dependent on any particular number or configuration of reels or symbol-display-portions in a symbol matrix.

Each symbol-display-portion of each reel can display or include a symbol of the selected set of symbols. In FIG. 7A to FIG. 7E, the display screen 700 includes a "9" symbol, a "10" symbol, a "J" symbol, a "Q" symbol, a "K" symbol, and an A symbol. A set of symbols from which the selected set of symbols was selected can include one or more other symbols besides those shown in FIG. 7A to FIG. 7E. In this description, the symbols including a numeral are listed within quote marks to indicate that the numeral corresponds to a symbol rather than numeric value of a term that follows the numeral.

Returning to FIG. 6A, block 604 include outputting an outcome. For example, the computing system 100 can output, in response to an input, a first outcome that includes for each of the multiple symbol positions an initial symbol selected from the multiple different symbols. The computing system 100 can also output a second outcome. The processor 112 can execute program instructions to display symbols of the selected symbols set within the symbol-display-portions of the display 110. For example, after a play request (e.g., a spin) or after one or more symbols have been upgraded or replaced at block 612 as further described below, the processor 112 can output an outcome that includes, for each of the multiple symbol-display portions of the display, a symbol selected from the symbol set. As an example, outputting the outcome can include displaying an animation such as an animation in which reel(s) on the display 110 spin and come to a stop with the selected symbols positioned in a respective symbol-display-portion. An another example, outputting the outcome can include displaying an animation in which the symbol(s) to be upgraded are indicated as a symbol to be upgraded and resulting in a replacement symbol being displayed at the symbol-display-portion of the symbol that was to be upgraded.

Next, block 606 includes determining, for each particular pattern, whether the symbols in the symbol positions of the particular pattern form a winning pattern for an outcome. For example, the computing system 100 can determine, for each particular pattern, whether the symbols in the symbol positions of the particular pattern form a winning pattern for a first outcome, wherein the winning pattern for the first outcome comprises a first symbol being in two or more symbol positions of the particular pattern. The computing system 100 can also determine, for each particular pattern, whether the symbols in the symbol positions of the particular pattern form a winning pattern for a second outcome, wherein the winning pattern for the second outcome comprises a second symbol being in two or more symbol positions of the particular pattern.

The processor 112 can execute program instructions to determine whether an award is earned (e.g., won) as a result of a pattern or an outcome occurring at the computing system 100. If a payout is not earned, the payout amount can be zero. If a payout is earned, the payout amount can be determined by the computing system 100 using a stored payout table (not shown) as a function of the received payment and one or more winning patterns. The occurrence of a winning pattern can include the presence of a combination of winning symbols aligned with a selected pattern. For example, the processor 112 can evaluate a pattern to determine whether a combination of symbols aligned or associated with the pattern forms or achieves a winning pattern. Therefore, for a user to obtain an award or prize for an outcome event, a winning combination of symbols must align with the pattern to form a winning pattern.

In at least some embodiments, a winning pattern can include three or more of a first symbol aligned with the pattern. For example, an award can be provided to a user upon the occurrence of three or more of the same symbol in a pattern. In at least some embodiments, a combination of symbols aligned with a pattern can form multiple wins for a pattern based on symbols from different levels in the symbol hierarchy. For example, a pattern can include three of the lowest level or value symbols to form a first winning pattern and can include three of the highest level or value symbols to form a second winning pattern.

In at least some embodiments, wild symbols can be used in an outcome event. Wild symbols can be substitutable for any symbol aligned with a pattern. A user can cause a wild symbol on a pattern to be replaced with a particular symbol to form a winning pattern. In at least some embodiments, if a wild symbol is part of a combination of symbols in a pattern, the wild symbol can remain a wild symbol or can change to match at least one of the winning symbols to form a winning pattern. For example, if a wild symbol on a pattern can be substituted for a "9" symbol to form a winning pattern based on other "9" symbols, the wild symbol can change to a "9" symbol to match the other "9" symbols. Thus, a wild symbol can be used to replace symbols and/or can be used with any other symbols to form or achieve a winning pattern. In other embodiments, the wild symbol can remain a wild symbol, but can also represent a multiplier, which can increase in value based on each winning pattern and which can be applied to a winning pattern.

In at least some embodiments, "jumbo symbols" can be used. For example, a jumbo symbol can be a symbol that extends across more than one column, more than one reel, or both at the same time. The evaluation of a pattern can consider all positions occupied by a jumbo symbol in order to determine a winning pattern. Additional symbol combinations to form a winning pattern not explicitly enumerated herein are possible. Further, the example embodiments described herein can operate regardless of the pattern or configuration of the pattern (e.g., a horizontal pattern, a v-shaped pattern, etc.).

Further, the processor 112 can execute program instructions to determine whether a payout is earned (e.g., won) after one or more symbols have been upgraded or replaced in each outcome at block 612. The payout can be earned based on a winning pattern. The occurrence of a winning pattern can include the presence of one or more winning symbol combinations aligned with a selected pattern. For example, after one or more symbols of a pattern have been upgraded or changed for an outcome, the computing system 100 can evaluate the new symbols aligned with the previous pattern to determine whether the combination of symbols form a winning pattern and whether new or additional winning patterns can be formed in the outcome. New or additional winning patterns can be determined based on the combinations of symbols aligned with the new pattern. The new or additional patterns can be formed across one or more reels on the display screen.

The new patterns can begin at a left-most symbol position of the display that is part of a pattern in a previous outcome. For example, a winning pattern can be formed starting on the same symbol position as a pattern in a previous outcome. In at least some embodiments, the new patterns can start on another left-most symbol position of the display. Further, a symbol that was part of a previous outcome can be used to form any new winning pattern. Otherwise, if this was not required, a set of three "9" symbols on a winning pattern would be upgraded to three 10s in a subsequent outcome to form another winning pattern with the three "10" symbols. Similarly, the set of 10s of the winning pattern would then be upgraded to three "J" symbols in a subsequent outcome, leading to another winning pattern with the three "J" symbols, etc.

When a winning pattern is determined or formed after one or more symbols have been upgraded or replaced in an outcome, a payout or other prize can be output by the computing system 100. After several consecutive winning patterns are determined or formed, a subsequent outcome can eventually be filled with the same symbol. This situation can be considered a "trigger" event. A trigger event can cause the computing system 100 to perform a particular event, for example, a jackpot win, a bonus round, re-spin, or the like. The trigger event can occur based on a particular symbol (e.g., the highest value symbol), but could be implemented with any symbol.

After completing the evaluation of each pattern to determine winning patterns for each outcome, the method can proceed to block 608.

FIG. 7A, FIG. 7B, FIG. 7C, FIG. 7D and FIG. 7E depict the display screen 700 after a processor (e.g., the processor 112) has determined whether one or more patterns on the display screen 700 is a winning pattern. In particular, the patterns in FIG. 7A to FIG. 7E are paylines. A person having ordinary skill in the art will understand that the symbols along the paylines discussed with respect to FIG. 7A to FIG. 7E could alternatively be evaluated as being part of a payway.

Referring to FIG. 7A, the display screen 700 depicts an outcome of an event after the reels on the display screen 700 have stopped spinning. The display screen 700 shows a payline A formed across the reels on the display screen 700. It will be recognized that the display screen 700 can have any one or more paylines and the paylines can have any suitable configuration or pattern. The processor 112 can determine whether a combination of symbols on the payline A forms or achieves a winning payline.

If a winning pattern (e.g., payline or payway) is not determined or found, the method 600 proceeds to block 614 and the outcome event ends. However, as shown in FIG. 7A, four "9" symbols are aligned with the payline A, starting from the left-most column on the display screen. When a payout table indicates that four "9" symbols in a payline forms a winning payline, the computing system 100 can output a prize for the winning payline having the four "9" symbols.

After providing an award for the winning paylines shown in FIG. 7A, another outcome can be generated by upgrading or replacing the symbols used to form a winning payline to another symbol.

Figure 7B:
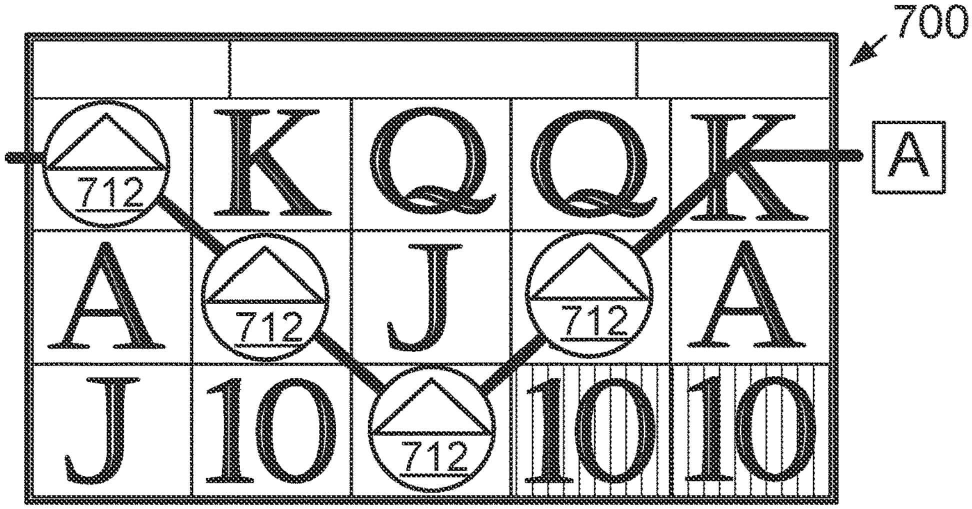

Next, FIG. 7B depicts the display screen 700 while symbols at particular symbol positions are being replaced. In FIG. 7B, the icon 712 represents a graphic and/or an animation to indicate symbols that are being replaced.

Figure 7C:
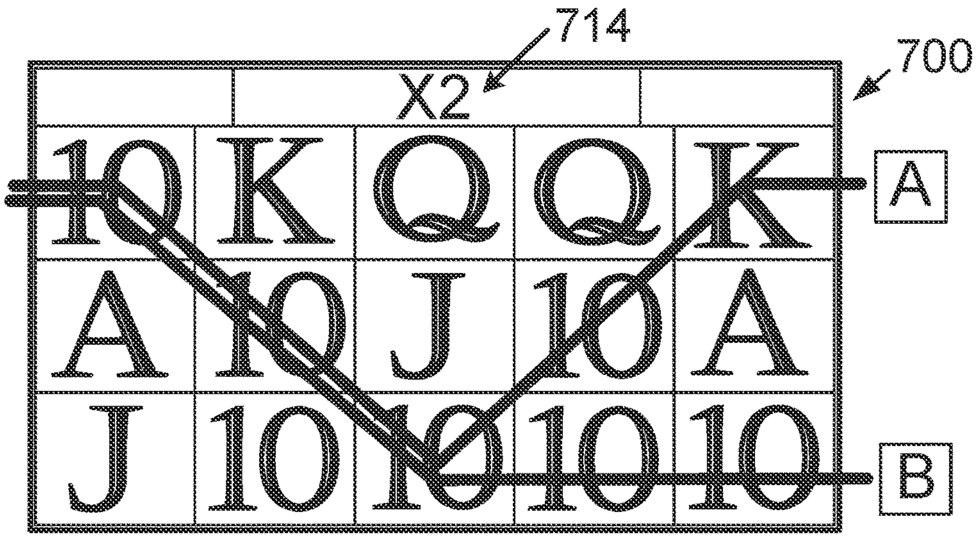

Next, FIG. 7C illustrates the display screen 700 after the symbols used to form the winning payline have been replaced or upgraded with another symbol. As shown in FIG. 7C, the "9" symbols on the payline have been replaced with "10" symbols. Once the symbols have been upgraded or replaced, the computing system 100 can evaluate the outcome to determine whether the combination of symbols aligned with the paylines form a winning payline and whether new or additional winning paylines can be formed. All new or additional winning paylines can begin at a left-most symbol of the display and can begin with the same symbol position as the payline in the previous outcome. In at least some embodiments, one or more symbols in the display can be identified for use to form a new payline in the outcome. For example, FIG. 7B shows two “10” symbols with vertical shade lines to indicate that those “10” symbols can be used for new paylines.

As shown in FIG. 7C, a new winning payline is formed on a payline B with five “10” symbols. The new winning payline starts at the same left-most symbol of the display as the payline of the previous outcome of FIG. 7A (e.g., the “J” symbol at the symbol position C1-R1). In at least some embodiments, the computing system 100 outputs an award of a particular number of credits for each winning payline.

In at least some other embodiments based on FIG. 7C, the computing system 100 outputs an award for the winning payline B, but foregoes outputting an award for the combination of symbols on the payline A since an award was already output during the outcome event based payline A shown in FIG. 7A.

In at least some embodiments, the computing system 100 outputs an award for a combination of symbols on payline A (e.g., four “10” symbols on the winning payline A) as long as another winning payline occurs in the outcome (e.g., winning payline B). For example, since there is a winning payline for the payline B, the four “10” symbols on the payline A will also be a winning payline.

In at least some embodiments, the computing system 100 outputs an award based on a multiplier. For example, the computing system 100 can determine a multiplier randomly (e.g., by a selecting a multiplier from a group of different multipliers randomly). As another example, the computing system 100 can determine a multiplier deterministically (e.g., by determining a multiplier from an ordered list of multipliers depending on how many outcomes with replaced symbols have occurred during an outcome event). FIG. 7C shows an indicator 714 representing a multiplier for one or more of the winning paylines shown in FIG. 7C. Determining an award based on a multiplier can include determining an initial award from a pay table based on the symbols located on the payline and then multiplying the initial award by the multiplier.

Figure 7D:
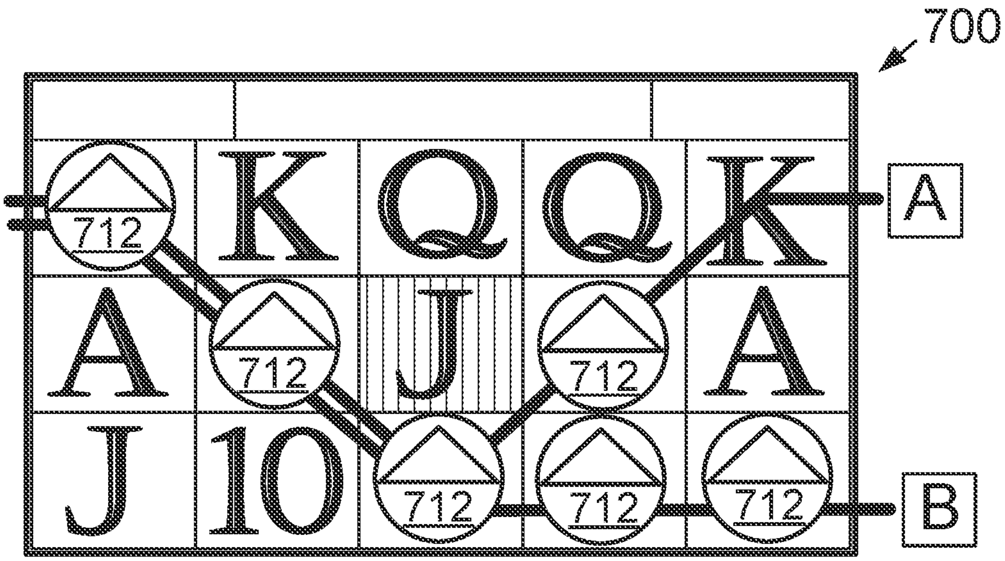
Figure 7E:
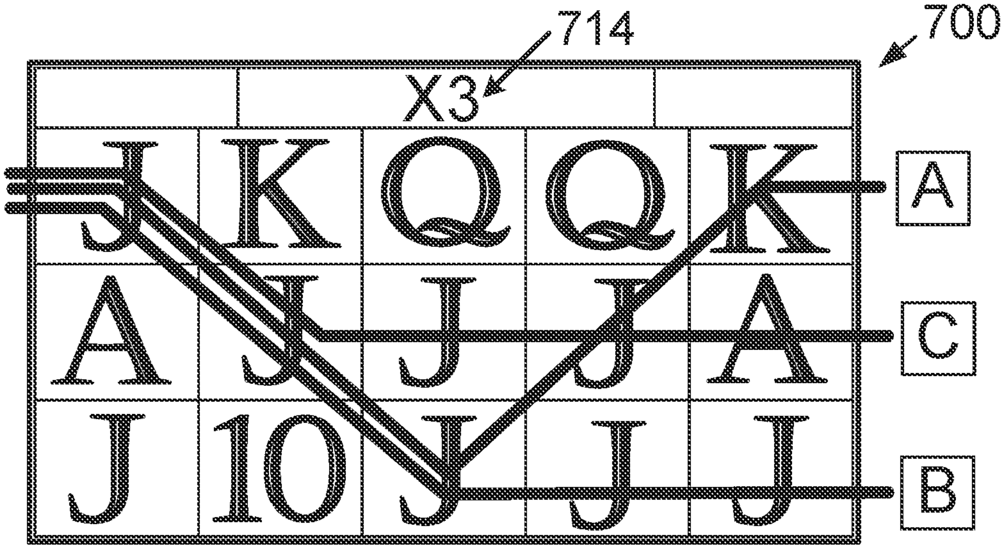

After providing an award for the winning paylines, another outcome can be generated by upgrading or replacing the symbols used to form a winning payline with another symbol. FIG. 7E illustrates the display screen 700 after the symbols used to form the winning payline have been replaced or upgraded with another symbol. As shown in FIG. 7E, each of the “10” symbols have been replaced with a “J” symbol. Once the symbols have been upgraded or replaced, the computing system 100 can evaluate the outcome to determine whether the symbols aligned with the payline form a winning payline and whether new or additional winning paylines can be formed. As described above, new or additional winning paylines can begin at a left-most symbol on the display screen and can begin with the same symbol position as the payline in the previous outcome. In at least some embodiments, one or more symbols can be identified in the display for use to form a new payline in the outcome. For example, FIG. 7D shows a highlighted “J” symbol at C3-R2 that can be used to form new or additional paylines. If no additional winning payline can be form, the outcome event ends at block 614.

As shown in FIG. 7E, an additional winning payline is formed on new payline C with four “J” symbols. In this case, the four “J” symbols on payline A and the five “J” symbols on payline B can also lead to award for the user, resulting in a combined win value from all three wins to the user. The method can then continue, with the “J” symbols of the winning payline upgraded to a “Q” symbol. The method 600 can proceed until no more new winning patterns are formed or until the highest value symbol is reached. FIG. 7E also shows the indicator 714 representing a multiplier for one or more of the winning paylines shown in FIG. 7E.

Next, block 608 includes outputting a corresponding award for each winning pattern for an outcome. For example, the computing system 100 can output a corresponding award for each winning pattern for a first outcome. The computing system 100 can also output a corresponding award for each winning pattern for a second outcome.

The processor 112 can execute program instructions to determine whether an award or payout is earned (e.g., won) as a result of a winning pattern or an outcome occurring at the computing system 100. If an award is not earned, the payout amount can be zero. If an award is earned, the payout amount can be determined by the computing system 100 using a stored payout table (not shown) as a function of the received payment and one or more winning patterns. Subsequently, the computing system 100 can output the award to be award to the user for each winning pattern.

In at least some embodiments, a corresponding award discussed above can include a single award for multiple patterns based on a particular symbol replacement. For example, if the selected patterns for the outcome event includes ten patterns and symbols upgraded from a first symbol (e.g., a “J” symbol) to a second symbol (e.g., a “Q” symbol) results in five of patterns having a winning outcome, the corresponding award can include a single award that is equal to a sum of five separate awards corresponding to the five winning outcomes. In at least some other embodiments based on the aforementioned example, the corresponding award can include five corresponding awards, one for each of the five separate awards (which can be shown as be awarded separately via an animation).

Next, block 610 includes determining whether to replace symbols in each winning pattern for an outcome. For example, the computing system 100 can determine whether to replace the first symbol in each winning pattern for the first outcome. After determining one or more winning patterns for an outcome at block 610, the processor 112 can execute program instructions to determine whether a combination of symbols used to form a winning pattern can be upgraded or replaced. If the symbols can be upgraded or replaced with another symbol, the method can proceed to block 612 to upgrade the symbols for an outcome. By upgrading symbols of a winning pattern, additional, subsequent winning patterns can be formed using symbols already on the display (but not in the symbol positions where the symbols were upgraded) and that did not form part of the preceding winning pattern. Subsequent winning patterns can then lead to additional awards or prizes for a user.

When the symbols used to form the winning pattern are not eligible to be upgraded, the method 600 proceeds to block 614 and the outcome event ends. For example, the outcome event can end when the highest or lowest symbol value in the symbol hierarchy has been reached. For example, when symbols are upgraded from the lowest value to the highest value, the symbols forming the winning pattern may not be upgraded if the symbols are at the highest level. Similarly, when symbols are upgraded from the highest value to the lowest value, the symbols forming the winning pattern may not be upgraded if the winning symbols are at the lowest level.

In at least some embodiments, a maximum number of upgrades or changes is allowed during an outcome event. As an example, the maximum number of upgrades can include a maximum number of symbol replacements, a maximum number of pattern upgrades, or a maximum number of symbol upgrades within a symbol hierarchy. The memory 114 can include a counter to track how many upgrades of a particular type of upgrade have occurred during an outcome event. The processor 112 can execute program instructions to reset the counter to some value, such as zero, prior to starting the tracking of upgrades for the outcome event.

In at least some embodiments, upgrading symbols during an outcome event continues until no further winning patterns are formed.

In at least some embodiments, ending the outcome event refers to ending the possibility of any further outcomes for the outcome event. In at least some embodiments, after an outcome event ends, the computing system 100 can continue to output an animation regarding the outcome event that just ended (e.g., an animation showing a replay of some portion of the outcome event, or an animation regarding an award earned by performing the outcome event).

Next, block 612 includes, based on the determination to replace the symbols, replacing, in each winning pattern for an outcome, each symbol with another symbol to form an additional outcome. For example, the computing system 100 can, based on the determination to replace first symbols, replace, in each winning pattern for a first outcome, the first symbol with the second symbol to form a second outcome. The processor 112 can execute program instructions to upgrade or replace one or more symbols of an outcome. In at least some embodiments, each symbol aligned with a pattern that forms or achieves a winning pattern can be upgraded or replaced with another symbol (e.g., an upgraded or replacement symbol). The upgraded or replacement symbols can be displayed within the symbol-display-portions of the display. By replacing one or more symbols used to form a winning pattern, additional winning patterns can be formed that might not have otherwise been possible prior to upgrading the symbols. As such, upgrading or replacing symbols used to form winning patterns can create additional winning patterns by introducing additional randomness into an outcome, where the degree of the randomness can be based on the positional arrangement of symbols on a pattern.

In one or more embodiments, the combination of the symbols used to form a winning pattern can be replaced with another symbol. For example, when a winning pattern is formed using a combination of “9” symbols, the processor can upgrade or replace each “9” symbol used to form the winning pattern to a “10” symbol. In at least some embodiments, the symbols used to form a winning pattern can be upgraded or changed to a symbol at a next higher level or value (e.g., the next symbol higher up in the symbol hierarchy). For example, when four of the lowest value symbols (e.g., four “9” symbols) appear on a pattern to form a winning pattern, these four symbols can then be upgraded or changed to a symbol at the next higher level or value (e.g., four “10” symbols). After replacing the symbols used to form the winning pattern, one or more of the “10” symbols can be used to determine additional winning patterns. After the additional winning patterns are determined, the “10” symbols used to form a winning pattern can be upgraded to “J” symbols. Subsequently, the “J” symbols used to form additional winning patterns can be upgraded to “Q” symbols. In at least some embodiments, the method 600 continues until the highest symbol value is reached. It should, however, be recognized that the upgrade or hierarchy change can be higher, lower, or randomly defined by, for example, some other factor such as a calculation result of a random number.

In some examples, only the lowest value symbols used to form a winning pattern can be upgraded. This feature can allow for more subsequent upgrades in an outcome event and more winning patterns to be formed. On the other hand, if the highest value symbols are used to form a winning pattern, the symbols used to form the winning pattern may not be upgraded. In at least some embodiments, the symbols used to form a winning pattern can be upgraded only when a further winning pattern can occur. In other embodiments, the symbols used to form a winning pattern may only be upgraded when the upgrade of the symbols would lead to a highest total winning pattern. In at least some embodiments, jumbo symbols used to form a winning pattern can be upgraded when the jumbo symbol forms part of an additional winning pattern. It will also be recognized an outcome can include the same symbol for each of symbol positions on the display screen, leading to a win on all patterns or in all possible payways (as appropriate).

Once the symbols on a pattern are upgraded with another symbol to form an outcome, the method 600 can proceed to block 604 as further described above. FIGS. 7A-7E depicts a display screen 700 illustrating the upgrade or replacement of the symbols used to form a winning payline with another symbol. Referring to FIG. 7B, the display screen 700 can indicate each symbol that can be changed or replaced with another symbol selected from the symbol set. As shown in FIG. 7B, an icon 712 (e.g., an icon including or arranged as a reflector or a triangular shape) can be displayed to indicate the symbol that will be replaced or upgraded. It will be recognized that any indicia can be used to indicate which symbol will be upgraded. FIG. 7C illustrates the display screen 700 after the symbols, used to form a winning payline of the outcome shown in FIG. 7A, have been replaced or upgraded with another symbol. As shown in FIG. 7C, each “9” symbol has been replaced with a “10” symbol. Once the symbols used to form a winning pattern have been upgraded or replaced to generate an outcome, the method proceeds to block 604 to output the outcome. After winning patterns are determined at block 606, the symbols used to form a winning pattern can be upgraded or replaced to generate another outcome.

In FIG. 7D, the icon 712 is displayed to indicate each symbol that will be replaced or upgraded. FIG. 7E illustrates the display screen 700 after the symbols, used to form a winning payline of the outcome shown in FIG. 7C, have been replaced or upgraded with another symbol. As shown in FIG. 7E, each “10” symbol has been replaced with a “J” symbol and a further new winning payline is formed on payline C, with four “J” symbols. Once the symbols used to form a winning payline have been upgraded or replaced to generate an outcome, the method proceeds to block 604 to output the outcome. After the winning patterns are determined at block 608, the outcome event can then continue, with each of the “J” symbols used to form a winning pattern upgraded to a “Q” symbol. The outcome event will continue until no more new winning patterns can be formed, until the maximum symbol hierarchy of an A symbol is reached, and/or a default maximum number of upgrades has occurred.

C. Second Flowchart

Next, FIG. 6B is a flow chart showing a set 620 of functions of that can be carried out using the computing system 100 of FIG. 1A or the computing system 100*a* and/or the computing system 100*b*. A method of the example embodiments can include one or more functions of the set 620 and/or a portion of one or more functions of the set 620.

Accordingly, a method based on function(s) of the set 620 can include a computer-implemented method involving a software application executed by the computing system 100*b* on behalf of the computing system 100*b* with a display screen. The software application involves graphically displaying, on vertical symbol display segments of the display screen, animations that simulate spinning a plurality of reels. A memory 114*a* of the computing system 100*a* can store, a global symbol group including a plurality of symbols. Subsets of the global symbol group and/or the plurality of symbols are displayable in a respective vertical symbol display segment of the display screen.

Furthermore, a hierarchy of symbols for the software application defines an order of at least a first symbol and a second symbol of the global symbol group arranged from a lowest priority to a highest priority. As an example, the hierarchy of symbols could be stored in the symbol hierarchy table 320 or in another part of a memory and/or program instructions.

Furthermore still, the display screen includes multiple particular patterns, each particular pattern comprises one symbol position from each reel across the plurality of reels.

Block 622 includes selecting, by a processor of the computing system executing the software application, a set of symbols from the global symbol group for displaying on the display screen in a first arrangement. The first arrangement defines respective symbol positions for each symbol of the set of symbols such that the set of symbols is displayed on the vertical symbol display segments.

Next, block 624 includes causing the display screen to display a first animation that simulates spinning and stopping the reels. Stopping the reels results in the vertical symbol display segments displaying the set of symbols according to the first arrangement.

Next, block 626 includes determining, by the processor based on the set of symbols according to the first arrangement, whether the symbols in each particular pattern form a winning pattern for a first outcome. The winning pattern for the first outcome comprises the first symbol being in two or more symbol positions of the particular pattern.

Next, block 628 includes determining, by the processor, whether to replace the first symbol in each winning pattern for the first outcome.

Next, block 630 includes based on the determination, causing the display screen to display a second animation that simulates transformation of the first symbol to the second symbol in each winning pattern for the first outcome to form a second outcome.

Next, block 632 includes determining, by the processor, whether the symbols in the symbol positions of the particular pattern form a winning pattern for the second outcome. The winning pattern for the second outcome comprises the second symbol being in two or more symbol positions of the particular pattern. The second symbol in at least one particular symbol position of the winning pattern for the second outcome is an initial symbol selected for the at least one particular symbol position in the first arrangement.

Next, block 634 includes causing the client computing system to output a corresponding award for each winning pattern for the first outcome and the second outcome.

In at least some of embodiments that includes performing one or more functions of the set 620, determining whether to replace the first symbol in each winning pattern for the first outcome includes determining that the first symbol is contained within the hierarchy of symbols and that the first symbol is not arranged with the highest priority in the hierarchy of symbols.

In at least some of embodiments that includes performing one or more functions of the set 620, causing the client computing system to output the corresponding award for each winning pattern for the first outcome and the second outcome includes outputting the corresponding award for each winning pattern for the first outcome before determining whether to replace the first symbol in each winning pattern for the first outcome, and outputting the corresponding award for each winning pattern for the second outcome after determining whether the symbols in the symbol positions of the particular pattern form the winning pattern for the second outcome.

In at least some embodiments that include performing one or more functions of the set 620, causing the display screen to display a first animation that simulates spinning and stopping the reels includes the server computing system transmitting to the client computing system a file including the first animation, and a processor of the client computing system outputting the file including the first animation to the display screen.

In at least some embodiments that include performing one or more functions of the set 620, causing the display screen to display a first animation that simulates spinning and stopping the reels includes the server computing system transmitting to the client computing system an instruction to spin and stop the reels.

In at least some embodiments of the preceding paragraph, the instruction to spin and stop the reels includes a respective symbol identifier for each symbol in the set of symbols.

In at least some other embodiments, the instruction to spin and stop the reels includes a corresponding symbol position with each respective symbol identifier. As an example, for a display screen including fifteen symbol positions like the GUI 400 shown in FIG. 4, the corresponding symbol position in the instruction could include the numerical identifiers discussed with respect to FIG. 4. Assuming the set of symbols includes the selected symbol set 500 shown in FIG. 5, an instruction could include data to indicate the first arrangement using the following symbol identifier/numerical identifier pairs: ("10" symbol, (1)), ("J" symbol, (2)), ("A" symbol, (3)), ("J" symbol, (4)), ("J" symbol, (5)), ("K" symbol, (6)), ("Q" symbol, (7)), ("Q" symbol, (8)), ("A" symbol, (9)), ("K" symbol, (10)), ("A" symbol, (11)), ("Q" symbol, (12)), ("K" symbol, (13)), ("10" symbol, (14)), and ("J" symbol, (15)).

In at least some of those embodiments, the instruction to spin and stop the reels arranges the respective symbol identifier in an order based on the first arrangement and the numerical identifier is implied by the order of the respective symbol identifiers. Again assuming that the set of symbols includes the selected symbol set 500 shown in FIG. 5, an instruction could include data to indicate the first arrangement using the following ordered list of symbol identifiers: "10" symbol, "J" symbol, "A" symbol, "J" symbol, "J" symbol, "K" symbol, "Q" symbol, "Q" symbol, "A" symbol, "K" symbol, "A" symbol, "Q" symbol, "K" symbol, "10" symbol, and "J" symbol.

In at least some embodiments, a symbol identifier in an instruction or communication sent to the client computing system can include an index value (e.g., a numerical index value) such that the client computing system can refer to an index (e.g., the global symbol group table) to determine the symbols to display in each symbol position. Transmitting an instruction as described in the two preceding paragraphs can reduce an amount of data that needs to be transmitted between the server and client computing systems because the symbols themselves do not need to be transmitted for an outcome.

IV. Additional Embodiments

Referring now to FIG. 8A to FIG. 8E, a display of a display screen 800 is shown in accordance with the example embodiments. The display screen 800 represents an outcome of a reel-based outcome event after the reels on the display screen have stopped spinning. The display screen 800 includes multiple symbol-display-portions or positions arranged in multiple rows R1 to R3 and multiple columns C1 to C5. Those columns and rows are applicable to FIG. 8B to FIG. 8E.

Figure 8A:
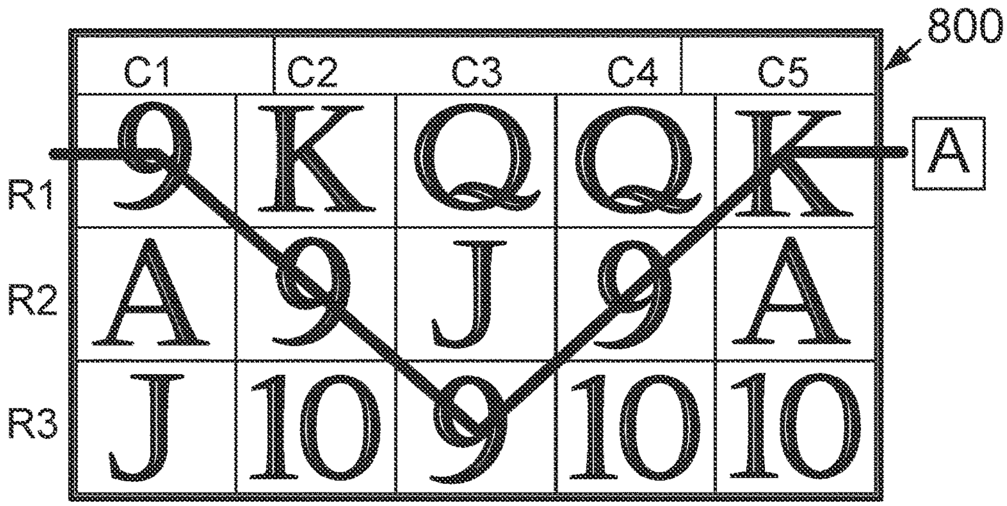
FIG. 8A, FIG. 8B, FIG. 8C, FIG. 8D, and FIG. 8E show a display screen in accordance with the example embodiments.

Each column of the multiple columns represents a reel on the display screen. As shown in FIG. 8A, the display screen 800 consists of five vertical reels, with each reel having three symbol-display-portions or positions visible to a user of the computing system. As such, the display screen 800 can represent a 3×5 symbol matrix (3 rows and 5 columns (reels)). Each symbol-display-portion of each reel can display or include symbols of the selected set of symbols.

As shown in FIG. 8A, the display screen 800 includes a payline A formed across the reels on the display screen. The computing system 100 can evaluate the payline A to determine whether the combination of the symbols on the payline A forms or achieves a winning payline. The display screen 800 can include one or more other paylines. One or more or none of those other paylines can be activated for the outcome event represented in FIG. 8A to FIG. 8E along with the payline A. The computing system 100 can evaluate each payline activated for each outcome of the outcome event.

As shown in FIG. 8A, four "9" symbols are aligned with the payline A, starting from the left-most column on the display screen. Based on a payout table in which four "9" symbols in the payline constitute a winning payline, the computing system 100 can output a prize for these four "9" symbols. After winning paylines are determined, the symbols used to form a winning payline can be upgraded or replaced to generate another outcome.

Figure 8B:
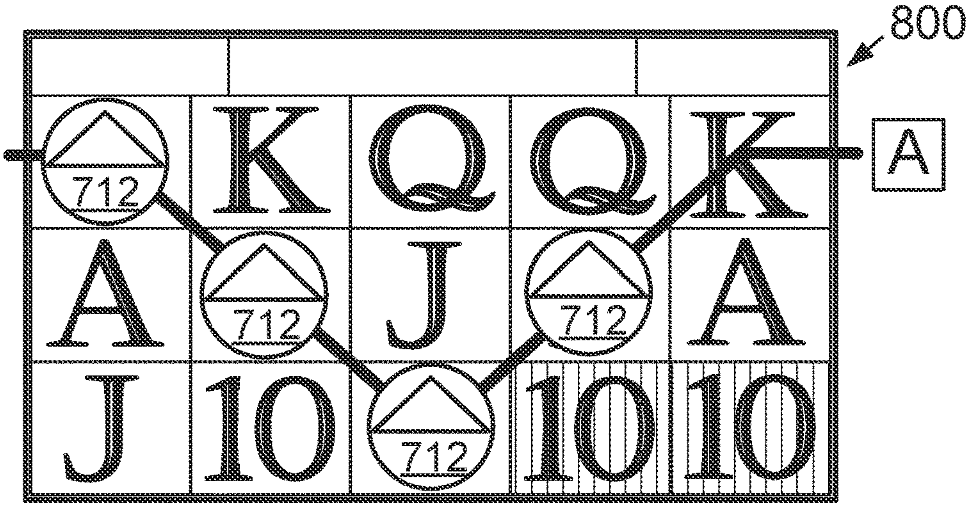
Figure 8C:
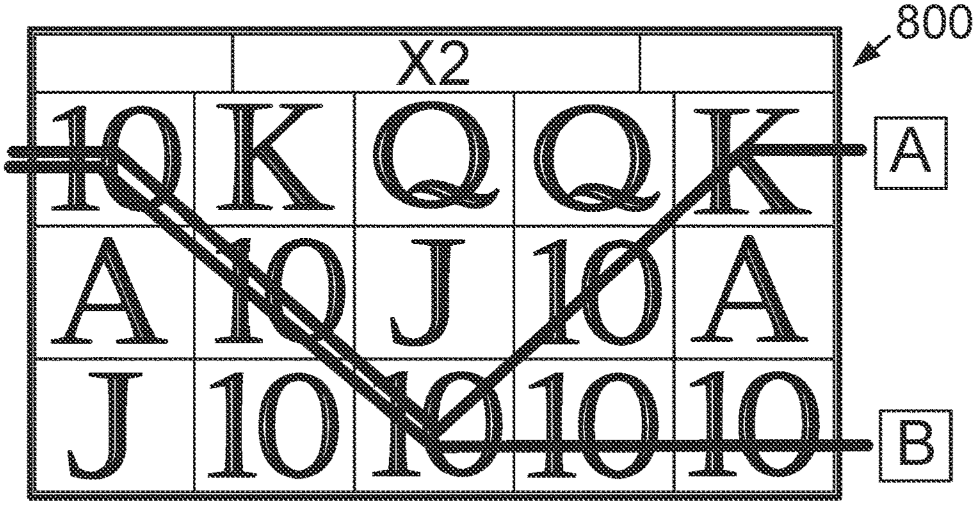

Referring to FIG. 8B, the display screen 800 can indicate each symbol that can be changed or replaced with another symbol selected from the symbol set. As shown in FIG. 8B, an icon 712 (e.g., an icon including or arranged as a reflector or a triangular shape) can be displayed to indicate the symbol that will be replaced or upgraded. FIG. 8C illustrates the display screen 800 after the symbols (used to form a winning payline of the outcome shown in FIG. 8A) have been replaced or upgraded with another symbol. As shown in FIG. 8C, each "9" symbol on the winning payline has been replaced with a "10" symbol. Once the symbols used to form a winning payline have been upgraded or replaced, the computing system 100 can evaluate the outcome to determine whether the combination of symbols aligned with the payline form a winning payline and whether new or additional winning paylines can be formed. Further, one or more symbols in the display can be identified that can be used to form a new payline in the outcome. For example, FIG. 8B shows two highlighted "10" symbols that can be used for new paylines.

Figure 8D:
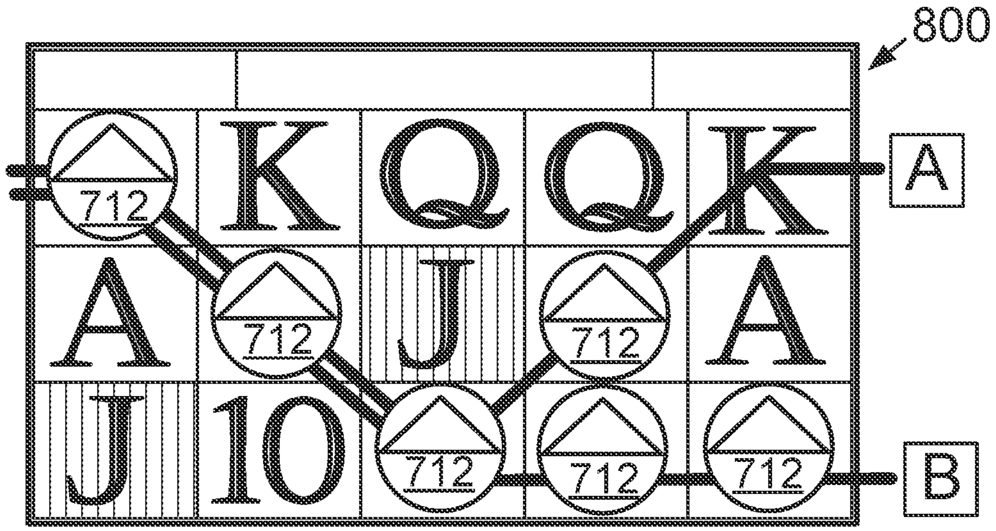

As shown in FIG. 8C, a new winning payline is formed on a new payline B with five "10" symbols. The new winning payline starts at the same left-most symbol of the display as the payline of the previous outcome of FIG. 8A (e.g., the "J" symbol at the symbol position C1-R1). For each winning payline, the computing system 100 can output a particular number of credits or another award. The outcome event can allow the four "10" symbols to form a winning payline since another winning payline occurred in the outcome (e.g., winning payline B). For example, since there is a winning payline for the payline B, the four "10" symbols on the payline A will also be a winning payline. After winning paylines are determined, the symbols used to form a winning payline can be upgraded or replaced to generate another outcome. In FIG. 8D, the icon 712 is displayed to indicate each symbol that will be replaced or upgraded.

Once the symbols have been upgraded or replaced, the computing system 100 can evaluate the outcome to determine whether the symbols aligned with the payline of the previous outcome form a winning payline and whether new or additional winning paylines can be formed. Further, one or more symbols can be identified in the display for use to form a new payline in the outcome. For example, FIG. 8D shows two highlighted "J" symbols that can be used to form new or additional paylines. As a result, new winning paylines can start at the "J" symbol at the symbol position C1-R3. Thus, the "J" symbol at the symbol position C1-R3 can also be used to form a new winning payline as described below.

Figure 8E:
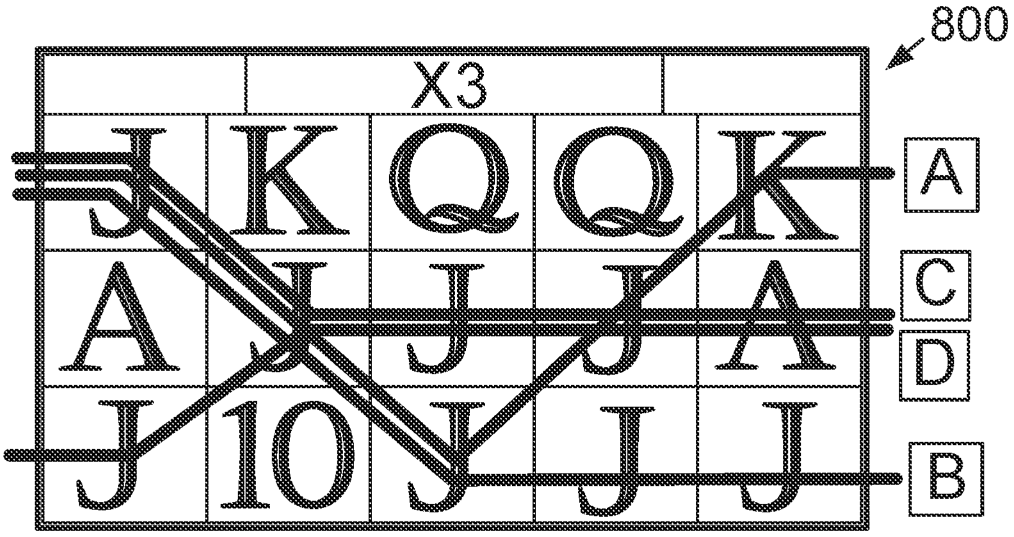

FIG. 8E illustrates the display screen 800 after the symbols (used to form a winning payline of the outcome shown in FIG. 8C) have been replaced or upgraded with another symbol. As shown in FIG. 8E, each "10" symbol has been replaced with a "J" symbol. As a result, new or additional winning paylines are formed on a payline C, with four "J" symbols (see also FIG. 7E), and on a payline D, with four "J" symbols (payline D could not be formed in FIG. 7E since the "J" symbol in the first column could not be used to form a winning payline). In this case, the four "J" symbols on the payline A and the five "J" symbols on the payline B can also lead to the computing system 100 outputting an award, resulting in a combined win value from all four winning paylines. After the winning paylines are determined, the outcome event can then continue, with each "J" symbol used to form a winning payline upgraded to a "Q" symbol. The outcome event will continue until no more new winning paylines can be formed or until the maximum symbol hierarchy of an "A" symbol is reached.

Referring now to FIG. 9A to FIG. 9D, a display of a display screen 900 is shown in accordance with the example embodiments. The display screen 900 represents an outcome of a reel-based outcome event after the reels on the display screen have stopped spinning. The display screen 900 includes multiple symbol-display-portions or positions arranged in multiple rows R1 to R3 and multiple columns C1 to C5. Those columns and rows are applicable to FIG. 9B to FIG. 9D.

Figure 9A:
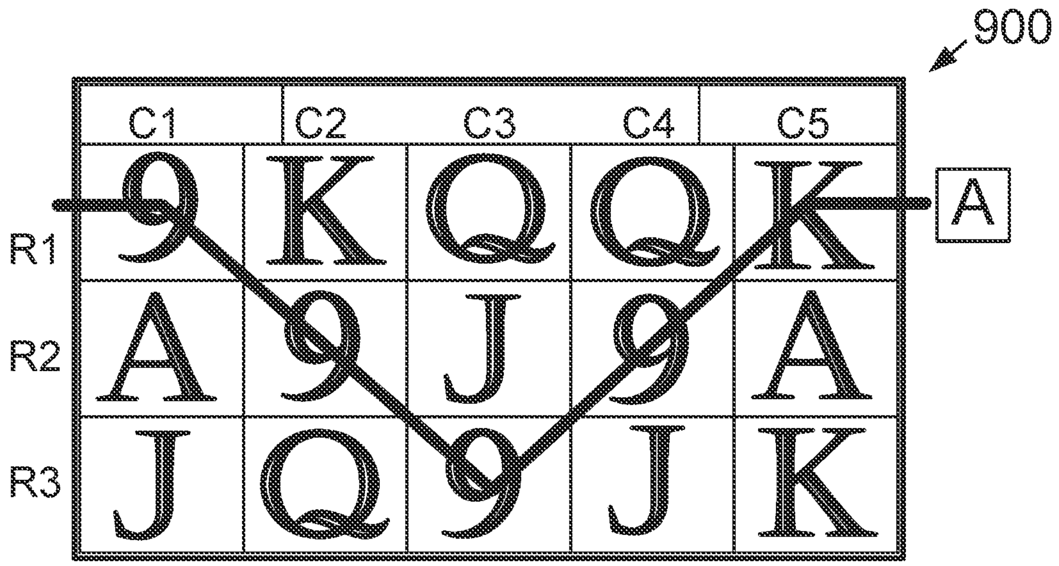
FIG. 9A, FIG. 9B, FIG. 9C, and FIG. 9D show a display screen in accordance with the example embodiments.

Each column of the multiple columns represents a reel on the display screen. As shown in FIG. 9A, the display screen 900 consists of five vertical reels, with each reel having three symbol-display-portions or positions visible to a user of the computing system. As such, the display screen 900 can represent a 3×5 symbol matrix (3 rows and 5 columns (reels)). Each symbol-display-portion of each reel can display or include a symbol of the selected set of symbols.

As shown in FIG. 9A, the display screen 900 includes a payline A formed across the reels on the display screen. The computing system 100 can evaluate the payline A to determine whether the combination of symbols on the payline A forms or achieves a winning payline. The display screen 900 can include one or more other paylines. One or more or none of those other paylines can be activated for the outcome event represented in FIG. 9A to FIG. 9D along with the payline A. The computing system 100 can evaluate each payline activated for each outcome of the outcome event.

As shown in FIG. 9A, four "9" symbols are aligned with the payline A, starting from the left-most column on the display screen. Based on a payout table in which four "9" symbols in the payline constitute a winning payline, the computing system 100 can output a prize for these four "9" symbols. After winning paylines are determined, the symbols used to form a winning payline can be upgraded or replaced to generate another outcome.

Figure 9B:
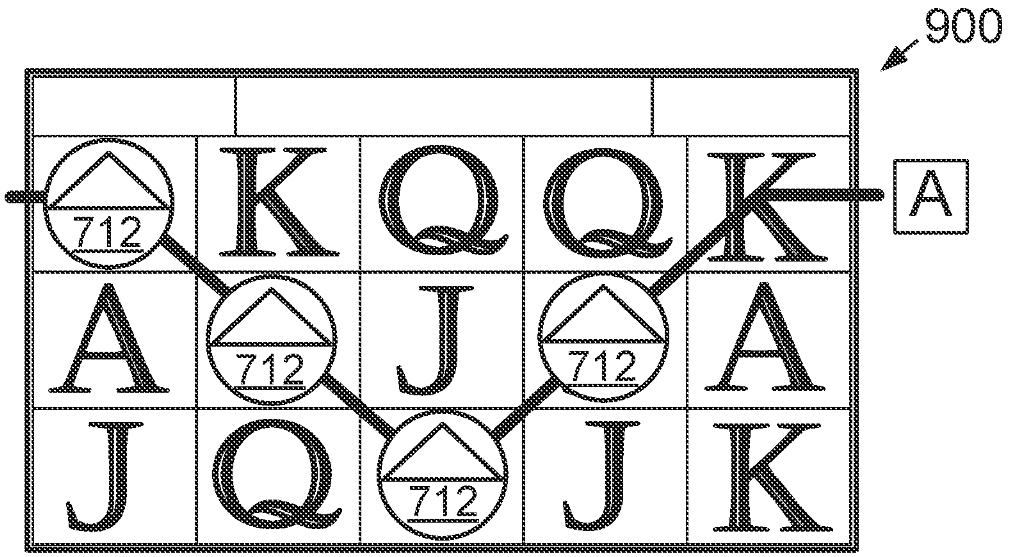
Figure 9C:
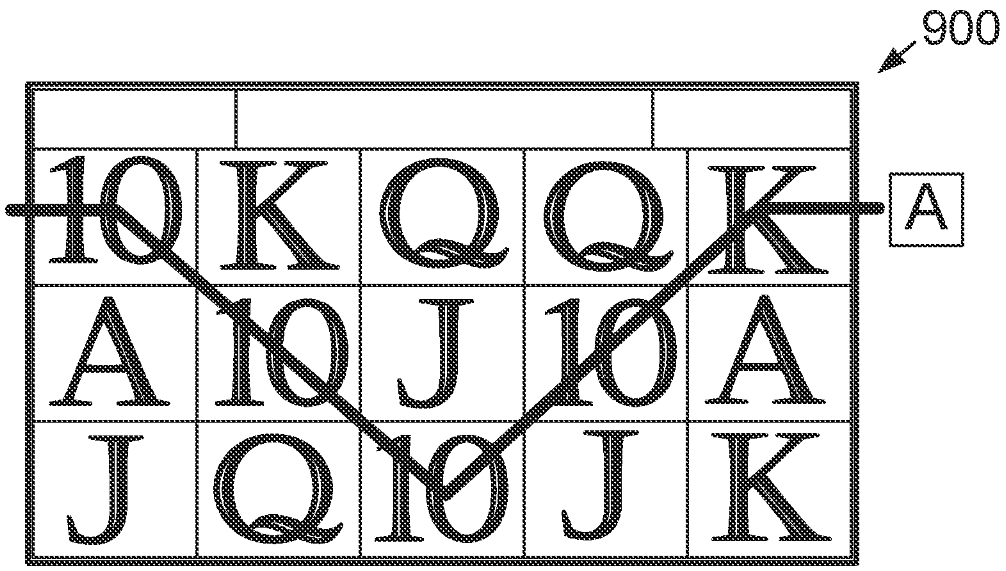

Referring to FIG. 9B, the display screen 900 can indicate each symbol that can be changed or replaced with another symbol selected from the symbol set. As shown in FIG. 9B, an icon 712 (e.g., an icon including or arranged as a reflector or a triangular shape) can be displayed to indicate the symbol that will be replaced or upgraded. FIG. 9C illustrates the display screen 900 after the symbols (used to form a winning payline of the outcome shown in FIG. 9A) have been replaced or upgraded with another symbol. As shown in FIG. 9C, each "9" symbol on the winning payline has been replaced with a "10" symbol. Once the symbols used to form a winning payline have been upgraded or replaced, the computing system 100 can evaluate the outcome to determine whether the combination of symbols aligned with the payline form a winning payline and whether new or additional winning paylines can be formed.

Figure 9D:
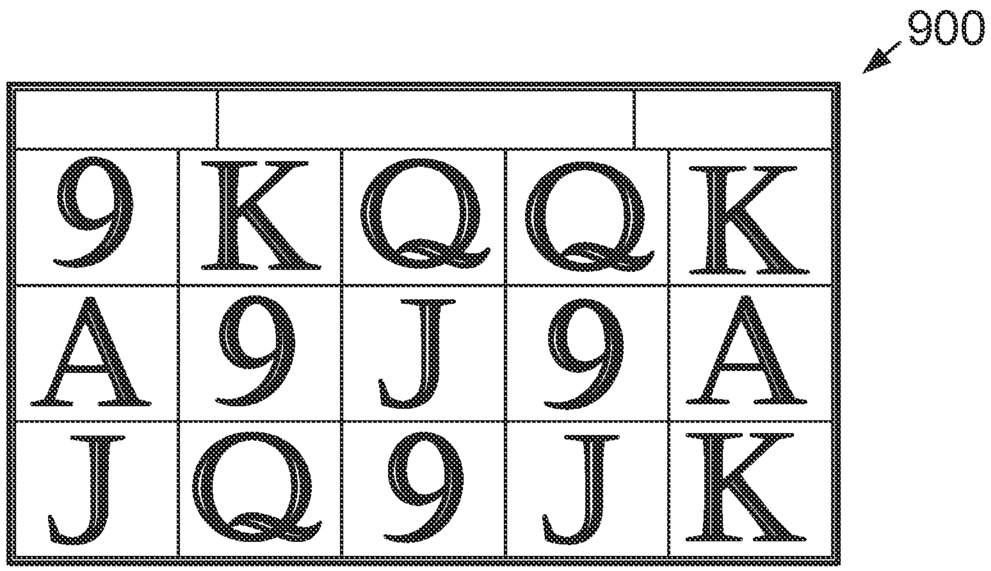

As shown in FIG. 9C, no new winning payline can be formed. As such, the outcome event ends and the computing system must receive an additional payment to restart performance of the outcome event. In at least some embodiments, since a winning payline could not be formed, the display can revert to the "9" symbols, as shown in FIG. 9D, to show the highest win for the four "9" symbols.

Figure 10A:
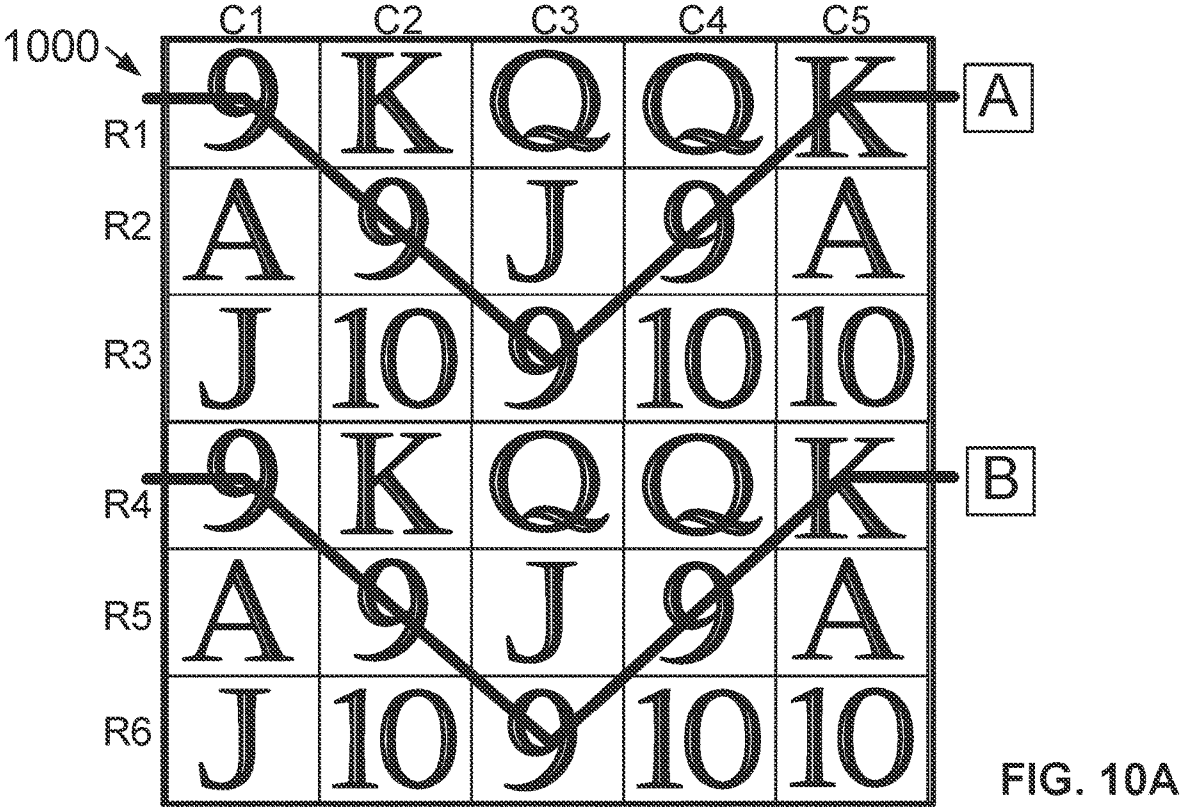
FIG. 10A, FIG. 10B, and FIG. 10C show a display screen in accordance with the example embodiments.
Figure 10B:
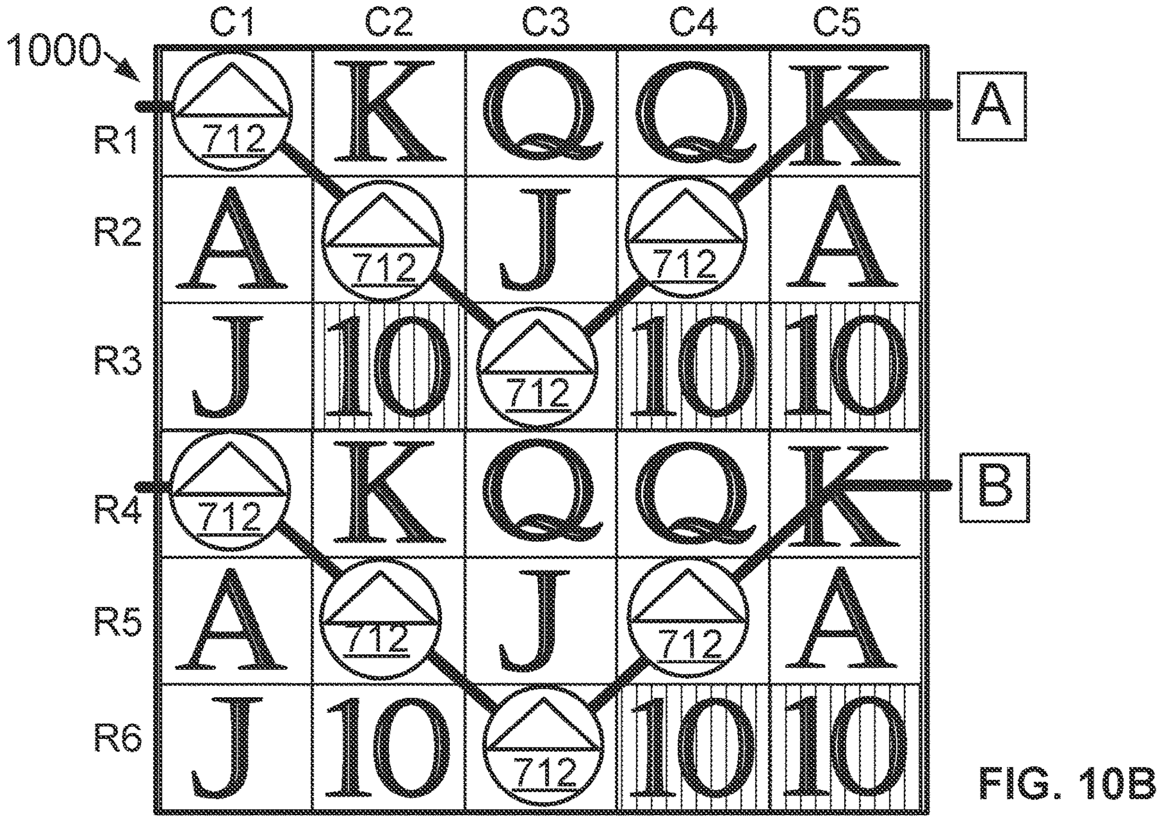
Figure 10C:
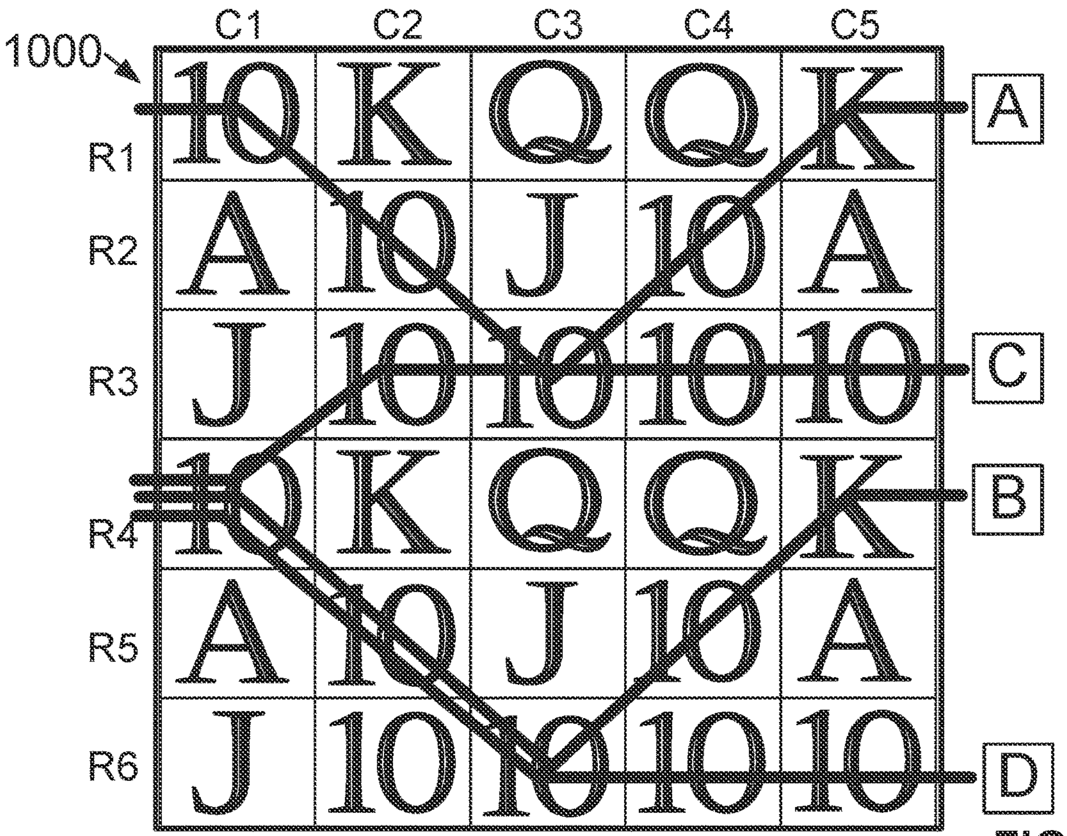

Referring now to FIG. 10A to FIG. 10C, a display of a display screen 1000 is shown in accordance with the example embodiments. The display screen 1000 represents an outcome of a reel-based outcome event after the reels on the display screen have stopped spinning. The display screen 1000 includes multiple symbol-display-portions or positions arranged in multiple rows and multiple columns. The display screen 1000 includes multiple symbol-display-portions or positions arranged in multiple rows R1 to R3 and multiple columns C1 to C5. Those columns and rows are applicable to FIG. 10B to FIG. 10C.

Each column of the multiple columns represents a reel on the display screen. The display screen 1000 can include one or more other paylines. One or more or none of those other paylines can be activated for the outcome event represented in FIG. 10A to FIG. 10C along with the payline A. The computing system 100 can evaluate each payline activated for each outcome of the outcome event.

As shown in FIG. 10A, the display screen 1000 consists of five vertical reels, with each reel having six symbol-display-portions or positions visible to a user of the computing system. As such, the display screen 1000 can represent a 6×5 symbol matrix (6 rows and 5 columns (reels)). Each symbol-display-portion of each reel can display or include a symbol of the selected set of symbols.

As shown in FIG. 10A, the display screen 1000 shows two paylines (e.g., a payline A and payline B) formed across the reels on the display screen. The computing system 100 can evaluate the paylines A and B to determine whether the combination of symbols on the paylines A and B forms or achieves one or more winning paylines. As shown in FIG. 10A, four "9" symbols are aligned with the payline A and four "9" symbols are aligned with the payline B, starting from the left-most column on the display screen. Based on a payout table in which four "9" symbols in the payline constitute a winning payline, the computing system 100 can output a prize for these four "9" symbols. In at least some embodiments, a multiplier can be applied to any second win in a payline. After winning paylines are determined, the symbols used to form a winning payline can be upgraded or replaced to generate another outcome.

Referring to FIG. 10B, the display screen 1000 can indicate each symbol that can be changed or replaced with another symbol selected from the symbol set. As shown in FIG. 10B, an icon 712 (e.g., an icon including or arranged as a reflector or a triangular shape) can be displayed to indicate the symbol that will be replaced or upgraded. FIG. 10C illustrates the display screen 1000 after the symbols (used to form a winning payline of the outcome shown in FIG. 10A) have been replaced or upgraded with another symbol. As shown in FIG. 10C, each of the "9" symbols on the winning paylines A and B have been replaced with a "10" symbol. Once the symbols used to form a winning payline have been upgraded or replaced, the computing system 100 can evaluate the outcome to determine whether the combination of symbols aligned with the payline form a winning payline and whether new or additional winning paylines can be formed. Further, the computing system can determine one or more symbols in the display that can be used to form a new payline in the outcome. For example, FIG. 10B shows three highlighted "10" symbols in the third row (R3) that can be used for new paylines and two "10" symbols highlighted in the sixth row (R6) that can be used for new paylines.

As shown in FIG. 10C, a new winning payline is formed on a new payline C with six "10" symbols. The new winning payline C starts at the same left-most symbol of the display as the payline A of the previous outcome of FIG. 10A (e.g., the "10" symbol at the symbol position C1-R4). Further, a new winning payline is formed on a new payline D with six "10" symbols. The new winning payline D starts at the same left-most symbol of the display as the payline B of the previous outcome of FIG. 10A (e.g., the "10" symbol at the symbol position C1-R4).

For each winning payline, the computing system 100 can output a particular number of credits or another award. The outcome event can allow the four "10" symbols to form a winning payline since another winning payline occurred in the outcome (e.g., winning payline B). For example, since there is a winning payline for the payline B, the four "10" symbols on the payline A will also be a winning payline. In at least some embodiment, a two-times (2×) multiplier can be applied to the award of the winning paylines. In some case, a three-times (3×) multiplier can be applied to any third winning payline. After the computing system 100 determines the winning paylines, the symbols used to form a winning payline can be upgraded or replaced to generate another outcome. After the computing system 100 determines the winning paylines, the method can then continue, with each "10" symbol used to form a winning payline upgraded to a "J" symbol. The outcome event will continue until no more new winning paylines can be formed or until the maximum symbol hierarchy of an "A" symbol is reached. It will be recognized that the features of the outcome event need not be used only in line-type outcome events, but can also be used in ways-type outcome events.

Figure 11B:
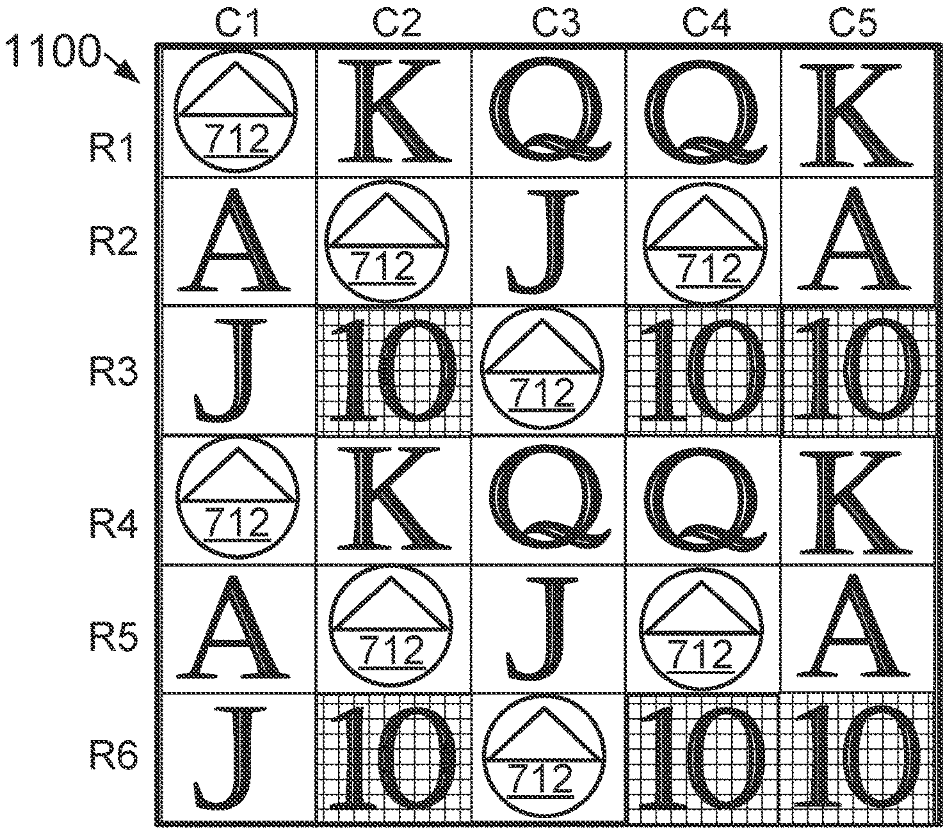
Figure 11C:
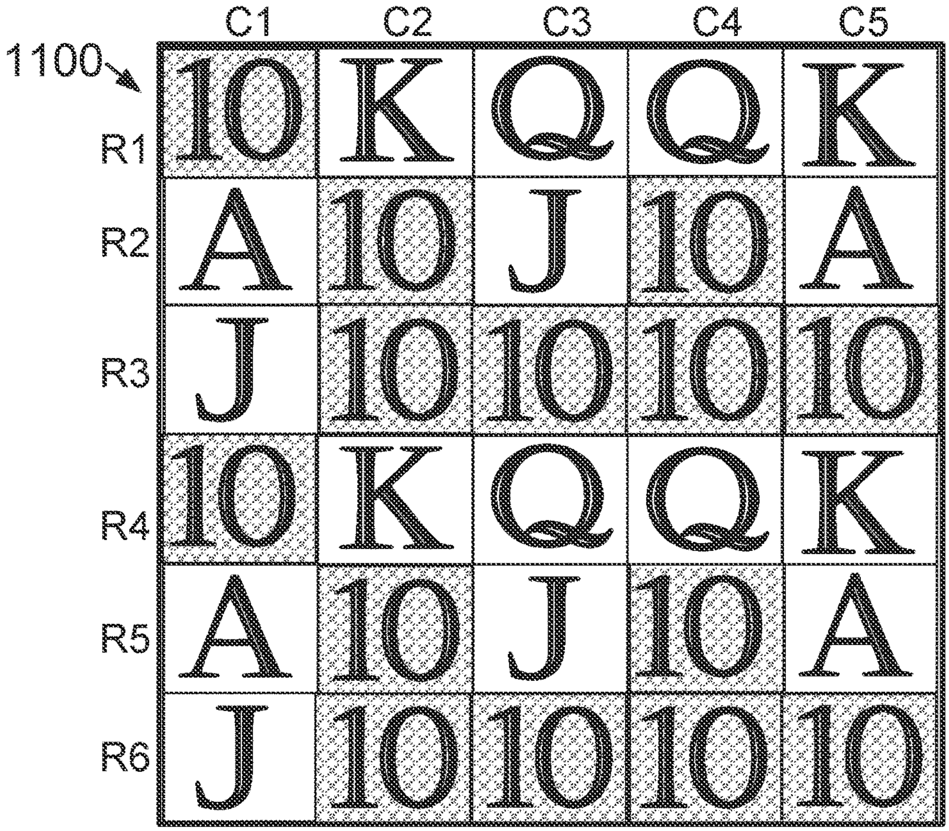

Referring now to FIG. 11A to FIG. 11C, a display of a display screen 1100 is shown in accordance with the example embodiments. The display screen 1100 represents an outcome of a reel-based outcome event after the reels on the display screen have stopped spinning. The display screen 1100 includes multiple symbol-display-portions or positions arranged in multiple rows and multiple columns. The display screen 1100 includes multiple symbol-display-portions or positions arranged in multiple rows R1 to R3 and multiple columns C1 to C5. Those columns and rows are applicable to FIG. 11B to FIG. 11C.

Each column of the multiple columns represents a reel on the display screen. As shown in FIG. 11A, the display screen 1100 consists of five vertical reels, with each reel having six symbol-display-portions or positions visible to a user of the computing system. As such, the display screen 1100 can represent a 6×5 symbol matrix (6 rows and 5 columns (reels)). Each symbol-display-portion of each reel can display or include a symbol of the selected set of symbols.

As shown in FIG. 11A, the display screen 1100 shows a ways-type outcome event. In a ways-type outcome event, there are no paylines and a win can be found when the same symbol occurs in three adjacent reels or columns. Further, no payline needs to connect a symbol in the first, leftmost reel to other symbols of the reels. The computing system 100 can evaluate the symbols on the display screen 1100 to determine whether a combination of symbols on three adjunct reels forms or achieves one or more wins. As shown in FIG. 11A, four "9" symbols are found in 3 adjacent columns, starting from the left-most column on the display screen. Based on a payout table in which four "9" symbols constitute a winning payway, the computing system 100 can output a prize for the "9" symbols. After winning payways are determined, the symbols used to form a winning payway can be upgraded or replaced to generate another outcome. In at least some embodiments, the symbols that may form or do form a winning payway are highlighted. In FIG. 11A, the "9" symbols are shown with a first type of hashed lines to represent a first type of highlighting to indicate the "9" symbols can be part of a winning payway.

Referring to FIG. 11B, the display screen 1100 can indicate the symbols that can be changed or replaced with another symbol selected from the symbol set. As shown in FIG. 11B, an icon 712 (e.g., an icon including or arranged as a reflector or a triangular shape) can be displayed to indicate the symbol that will be replaced or upgraded. FIG. 11C illustrates the display screen 1100 after the symbols (used to form a win in the outcome shown in FIG. 11A) have been replaced or upgraded with another symbol. As shown in FIG. 11C, each "9" symbol has been replaced with a "10" symbol. Once the symbols used to form a win have been upgraded or replaced, the computing system 100 can evaluate the outcome to determine whether the symbols of the outcome form a win. Further, one or more symbols in the display can be identified that can be used to form a new win in the outcome. For example, FIG. 11B shows three highlighted "10" symbols in the third row of the sixth row that can be used for new win. In FIG. 11B, the "10" symbols are shown with a second type of hashed lines to represent a second type of highlighting to indicate the "10" symbols are to be determined as part of a winning payway after the symbols covered by the icon 712 are upgraded.

As shown in FIG. 11C, new payway wins are determined. After the payway wins are determined, the symbols used to form a win can be upgraded or replaced to generate another outcome. The outcome event can then continue, with each "10" symbol used to form a payway win can be upgraded to a "J" symbol. The outcome event will continue until no more new payway wins can be formed or until the maximum symbol hierarchy of an "A" symbol is reached. In FIG. 11C, the "10" symbols are shown with the first type of hashed lines to represent the first type of highlighting to indicate the "10" symbols can be part of a winning payway.

Referring now to FIG. 12A to FIG. 12L, a display screen 1200 is shown in accordance with the example embodiments. The display screen 1200 can be referred to by other terms, such as but not limited to a graphical display screen, graphical user interface, or a GUI. The display screen 1200 displays an outcome of a reel-based outcome event after the reels on the display screen have stopped spinning. The display screen 1200 includes multiple symbol-display-portions or positions arranged in multiple rows and multiple columns. The display screen 1200 includes multiple symbol-display-portions or positions arranged in multiple rows R1 to R3 and multiple columns C1 to C5. Those columns and rows are applicable to FIG. 12B to FIG. 12L.

Each column of the multiple columns represents a reel on the display screen. The display screen 1200 can include one or more other paylines. One or more or none of those other paylines can be activated for the outcome event represented in FIG. 12A to FIG. 12L along with the payline A. The computing system 100 can evaluate each payline activated for each outcome of the outcome event.

Figure 12A:
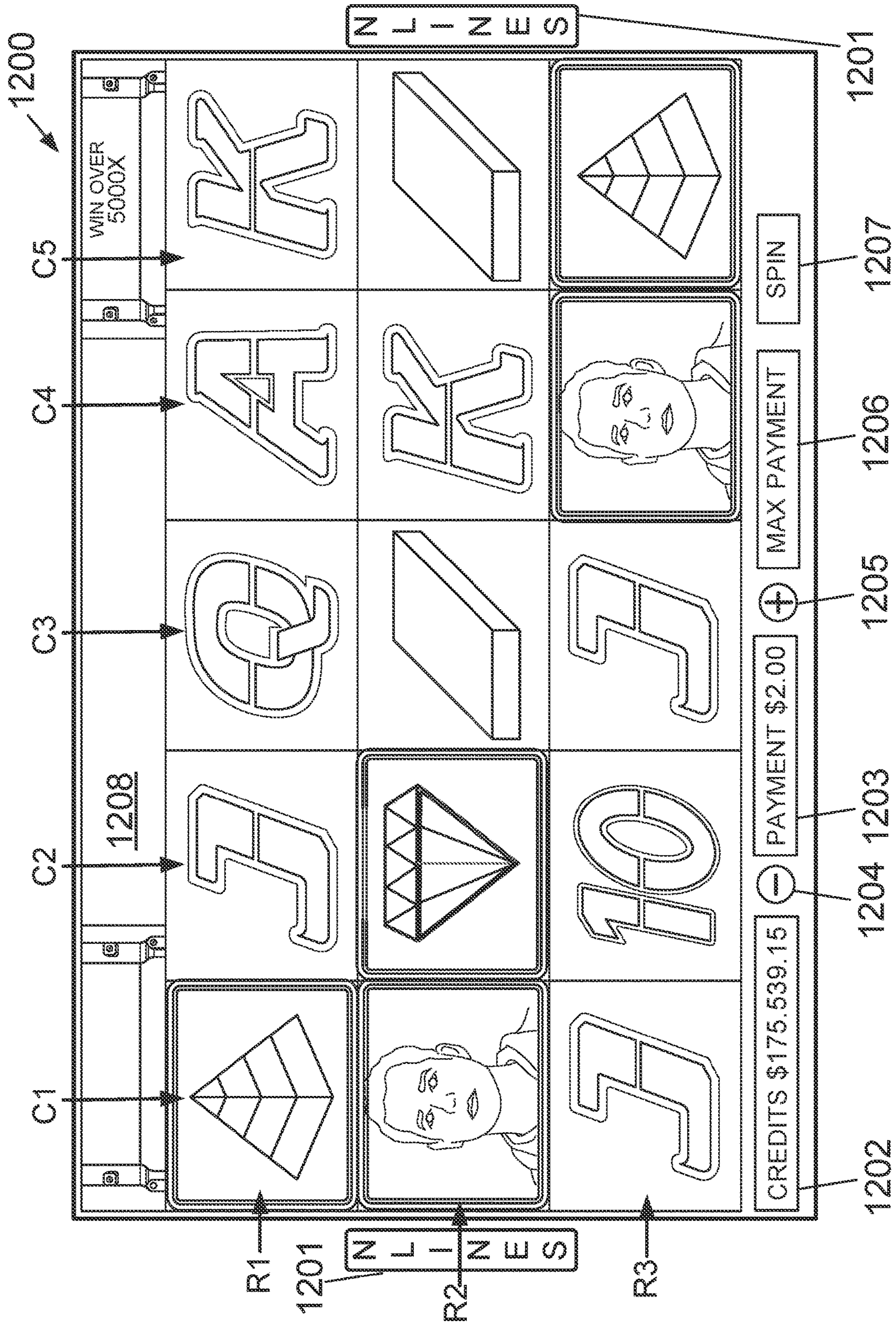
FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L show a display screen in accordance with the example embodiments.

As shown in FIG. 12A, the display screen 1200 consists of five vertical reels, with each reel having three symbol-display-portions or positions visible to a user of the computing system. As such, the display screen 1200 can represent a 3×5 symbol matrix (3 rows and 5 columns (reels)). Each symbol-display-portion of each reel can display or include a symbol of the selected set of symbols.

As shown in FIG. 12A, the display screen 1200 includes a pattern quantity icon 1201. As an example, a pattern quantity icon can include a number representing a number of patterns (e.g., a number of paylines or a number of payways) available on the display screen and/or selected for one or more outcomes). Although the following description of one or more of FIG. 12A to FIG. 12L refers to a payline, a person having ordinary skill in the art will understand that a reference to a payline could be replaced with a payway.

The display screen 1200 also includes a credit indicator 1202. The credit indicator 1202 can include a number of credits available for a user of a computing system including the display screen 1200. A processor can track the number of credits in the credits 354.

The display screen 1200 can include a payment icon 1203. The payment icon 1203 can indicate a payment selected to perform one or more outcome events. The display screen 1200 includes a USC 1204, 1205, 1206, 1207. The USC 1204 is selectable to decrease a payment amount indicated by the payment icon 1203. The USC 1205 is selectable to increase a payment amount indicated by the payment icon 1203. The USC 1206 is selectable to change the payment amount indicated by the payment icon 1203 to a particular amount, such as a maximum payment amount, a minimum payment amount, or a payment amount equal to a mean of the maximum and minimum payment amounts. The USC 1207 is selectable to cause the reels on the display screen

1200 to spin. As an example, selecting the USC 1207 with the payment icon 1203 showing a $2.00 payment as shown in FIG. 12A can cause the processor 112*b* to transmit a communication with a spin request, such as a communication 151, 153 shown in FIG. 13.

The display screen 1200 includes an award bar 1208. The processor 112 can determine a numerical award and cause the numerical award to be displayed in the award bar 1208. As noted, some embodiments include a sequence of multiple outcome events. In at least some of those embodiments, some or all of the multiple outcome events results in an outputting an award. As an example, the award for each outcome event of the sequence of multiple output events is shown as a sum of all award(s) for outcome event(s) of the sequence that have occurred. The award bar shown in FIG. 12A to FIG. 12L represents such an embodiment. In this embodiment, the credit indicator 1202 is updated after the sequence of multiple output events has ended. For example, the credit indicator 1202 can increase an amount shown in the award bar after the sequence of multiple output events has ended.

As another example, the award bar 1208 can show an amount of the most recent award provided rather than a sum of awards earned for multiple outcome events. In accordance with that example, the award bar 1208 can revert to zero after each outcome event of the sequence of multiple outcome events and after the credit indicator is updated based on the most-recent award.

FIG. 12A shows the display screen 1200 before a start of a spin, with a previous result still shown. As an example, the previous result did not result in any award as the award bar 1208 is blank. As another example, the previous result resulted in an award that has already been processed such that the credit indicator 1202 shows an amount of credits including an amount of credits awarded in response to previous result. The USC 1204, 1205, 1206 can be active before the start of a spin so as to change a payment amount shown in the payment icon 1203 before the USC 1207 is selected to initiate the spin of the reels.

Figure 12B:
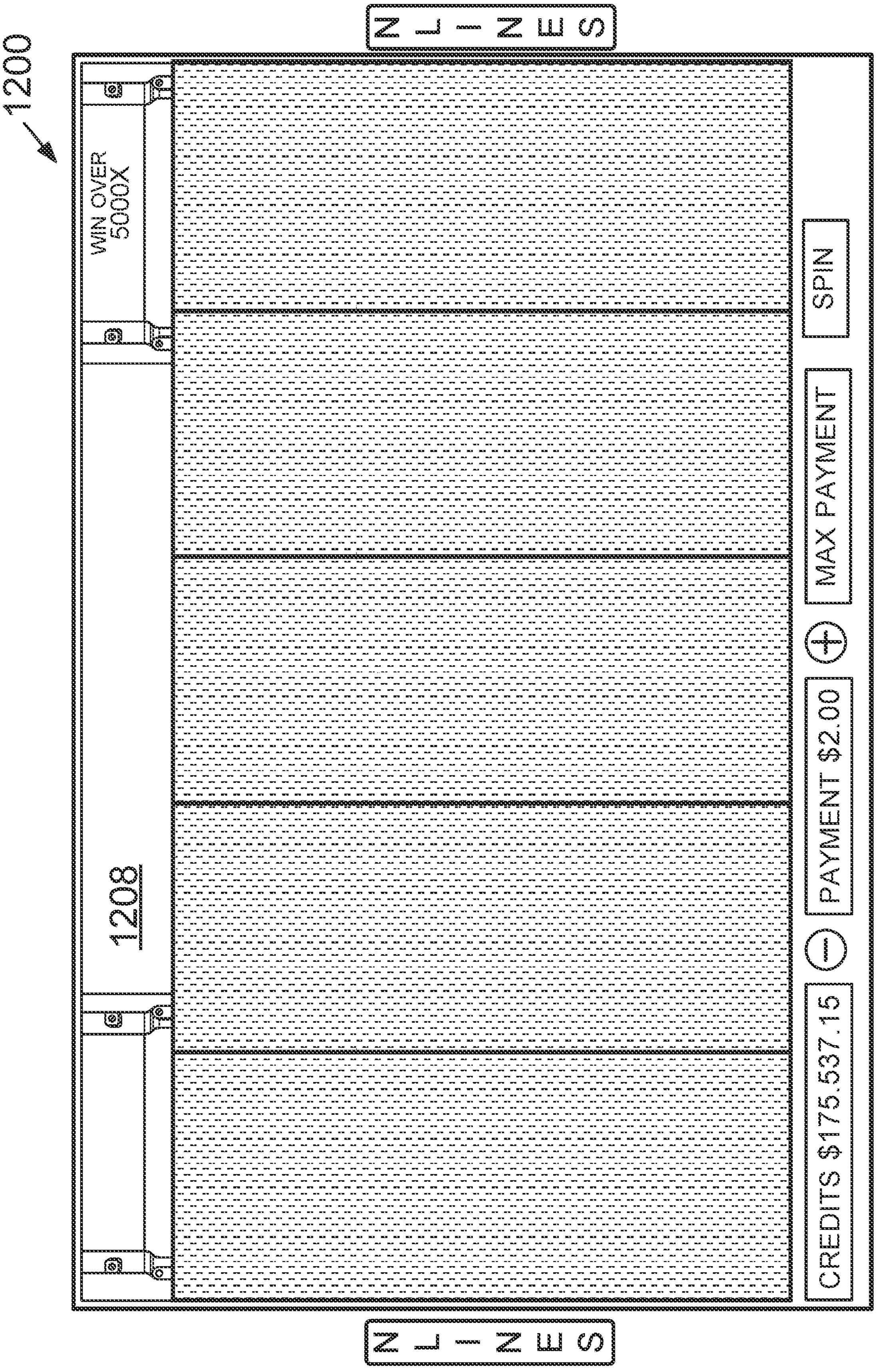

Next, FIG. 12B shows the display screen 1200 after the computing system receives another spin request. As an example, the computing system 100*a* can receive from the computing system 100*b* a communication with a spin request so that the processor 112*a* determines an outcome in response to the spin request. The processor 112*a*, 112*b* can cause the reels in columns C1 to C5 to spin. The processor 112*b* can output one or more animations from the animations 356 to the display screen 1200. As an example, a single animation can be output for all reels on the display screen. As another example, a respective animation can be output for each reel on the display screen that is to be spun.

Figure 12C:
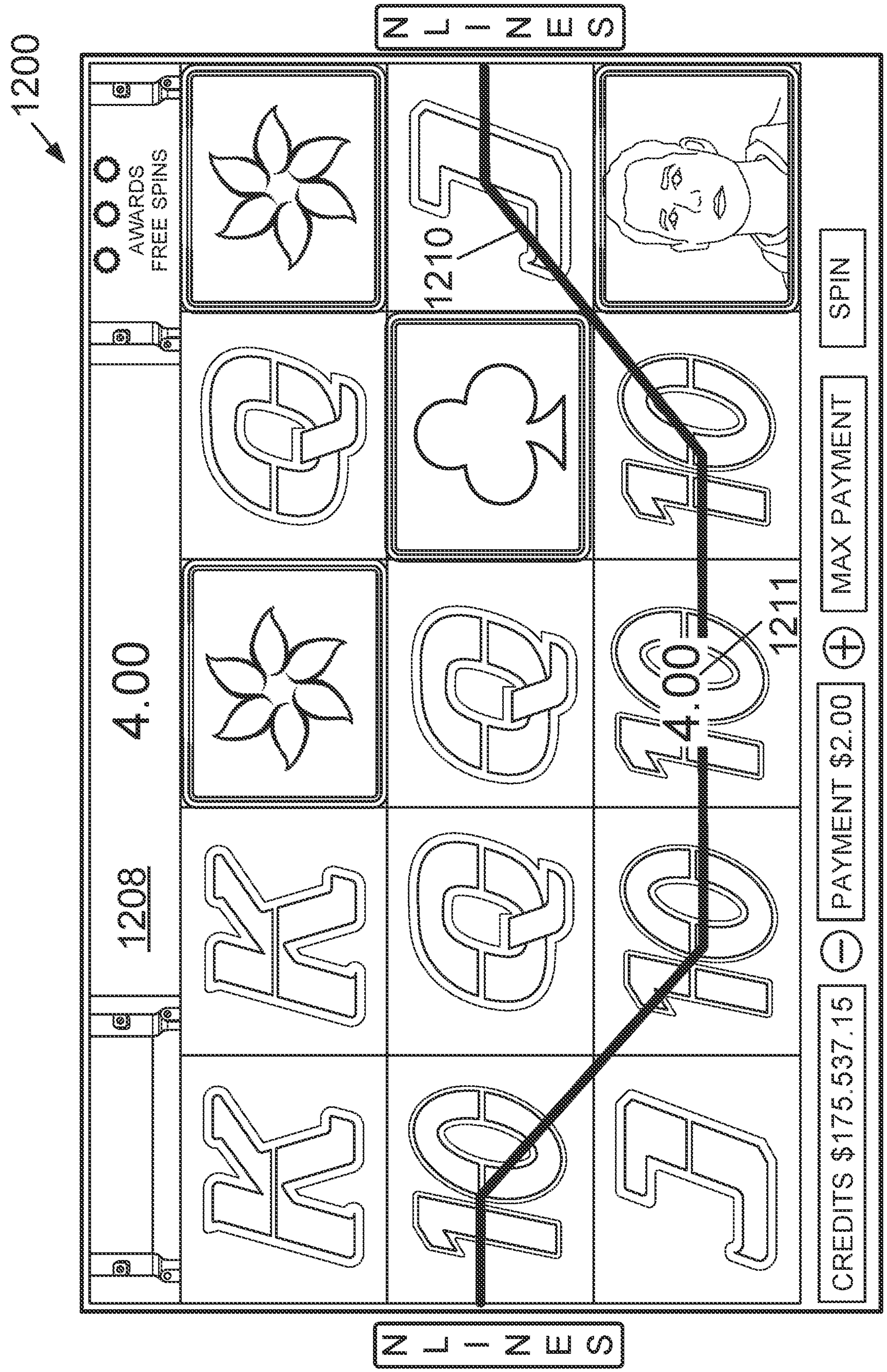

Next, FIG. 12C shows the reels on the display screen 1200 after they come to a halt, showing a winning outcome consisting of four "10" symbols along a payline 1210. That winning outcome results in an award indicated by an award indicator 1211. The award bar 1208 shows a sum of all awards provided since the reels were spun after the previous result shown in FIG. 12A.

Figure 12D:
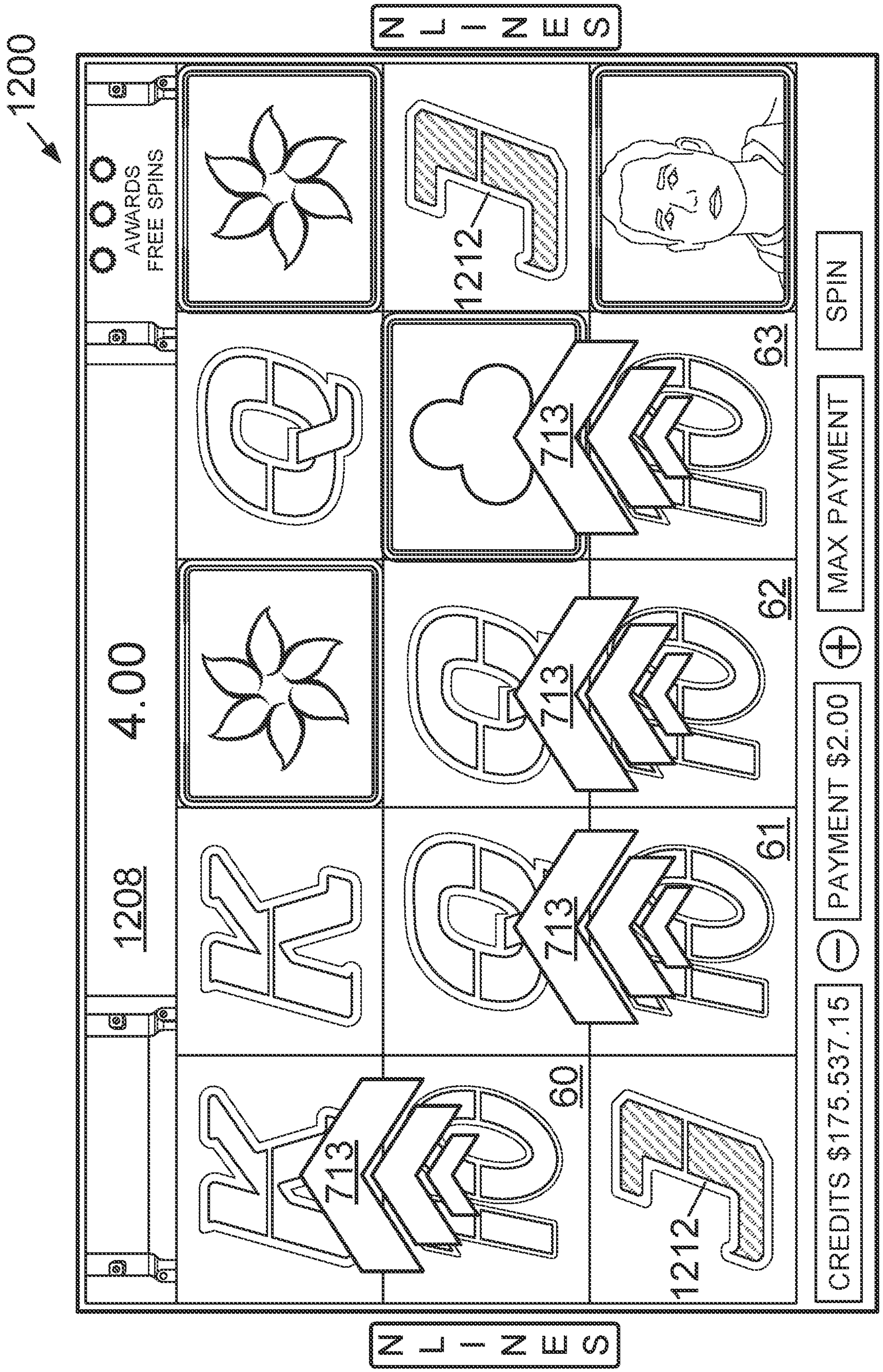

Next, FIG. 12D shows the display screen 1200 with an icon 713 corresponding to each symbol on the display screen 1200 that will be upgraded. Those symbols are contained in a symbol position 60, 61, 62, 63. In some embodiments, the icon 713 is a static icon displayed within the symbol position including a symbol that is to be upgraded. In other embodiments, the icon 713 is displayed using an animation (such as animation including an upward moving arrow icon). Further, the symbols that can combine with the upgraded symbols to form further wins are highlighted using a highlighting 1212. In one respect, a "J" symbol that is not highlighted can include a first "J" symbol in the symbols 353 and a "J" symbol that is highlighted can include a second "J" symbol in the symbols 353. The highlighting 1212 for the "J" symbol can result from displaying the second "J" symbol in the symbols 353. In another respect, the highlighting 1212 can include an animation from the animations 356.

Figure 12E:
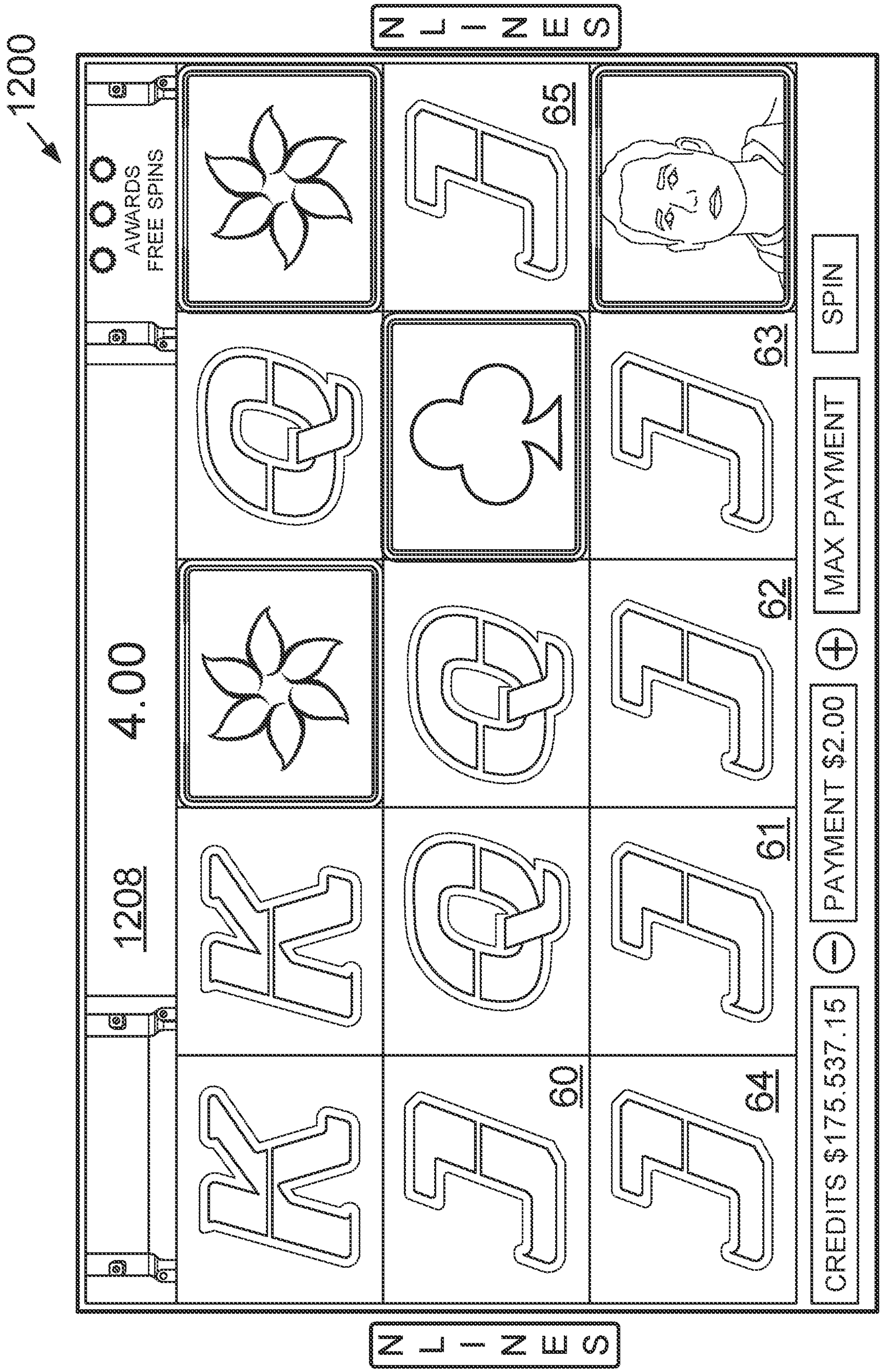

Next, FIG. 12E shows the display screen 1200 after the symbol at the symbol position 60, 61, 62, 63 has been upgraded from a "10" symbol to a "J" symbol. Other "J" symbols are shown in a symbol positions 64, 65. A processor, such as the processor 112, 112*a* determines whether any active paylines has a winning outcome after the "10" symbols have been upgraded.

Figure 12F:
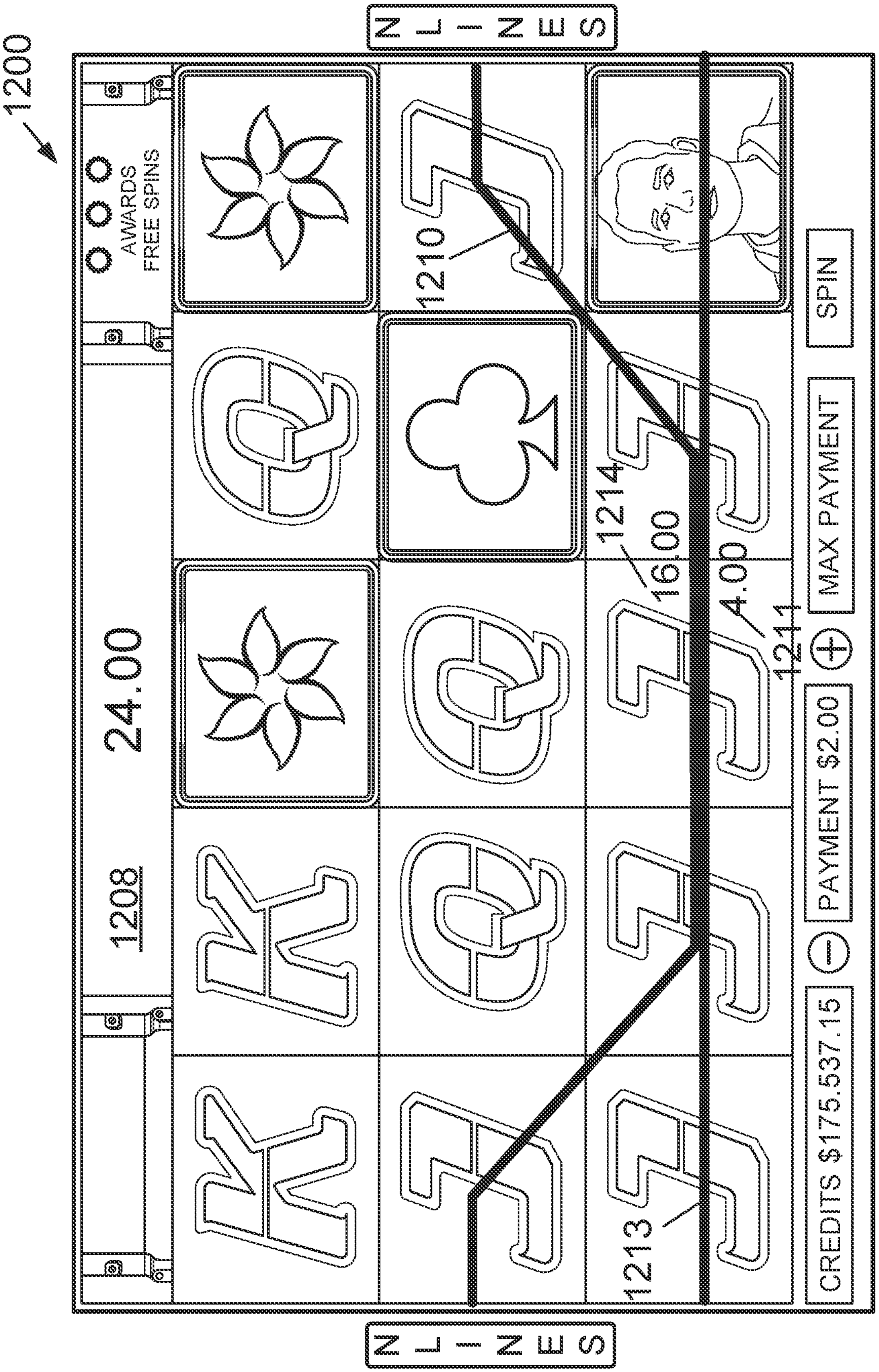

Next, FIG. 12F shows new wins for an outcome based on upgrading the "10" symbols to "J" symbols. The new wins are highlighted by showing the payline 1210 and a payline 1213. The award indicator 1211 corresponds to the win on the payline 1210 and an award indicator 1214 corresponds to the win on the payline 1213. The award bar 1208 in FIG. 12F shows a sum of all awards provided since the reels were spun after the previous result shown in FIG. 12A. FIG. 12F represents an embodiment in which a payline that showed a winning outcome for a prior outcome of the sequence of outcome events can include a winning outcome for a subsequent outcome in the sequence of outcome events.

Figure 12G:
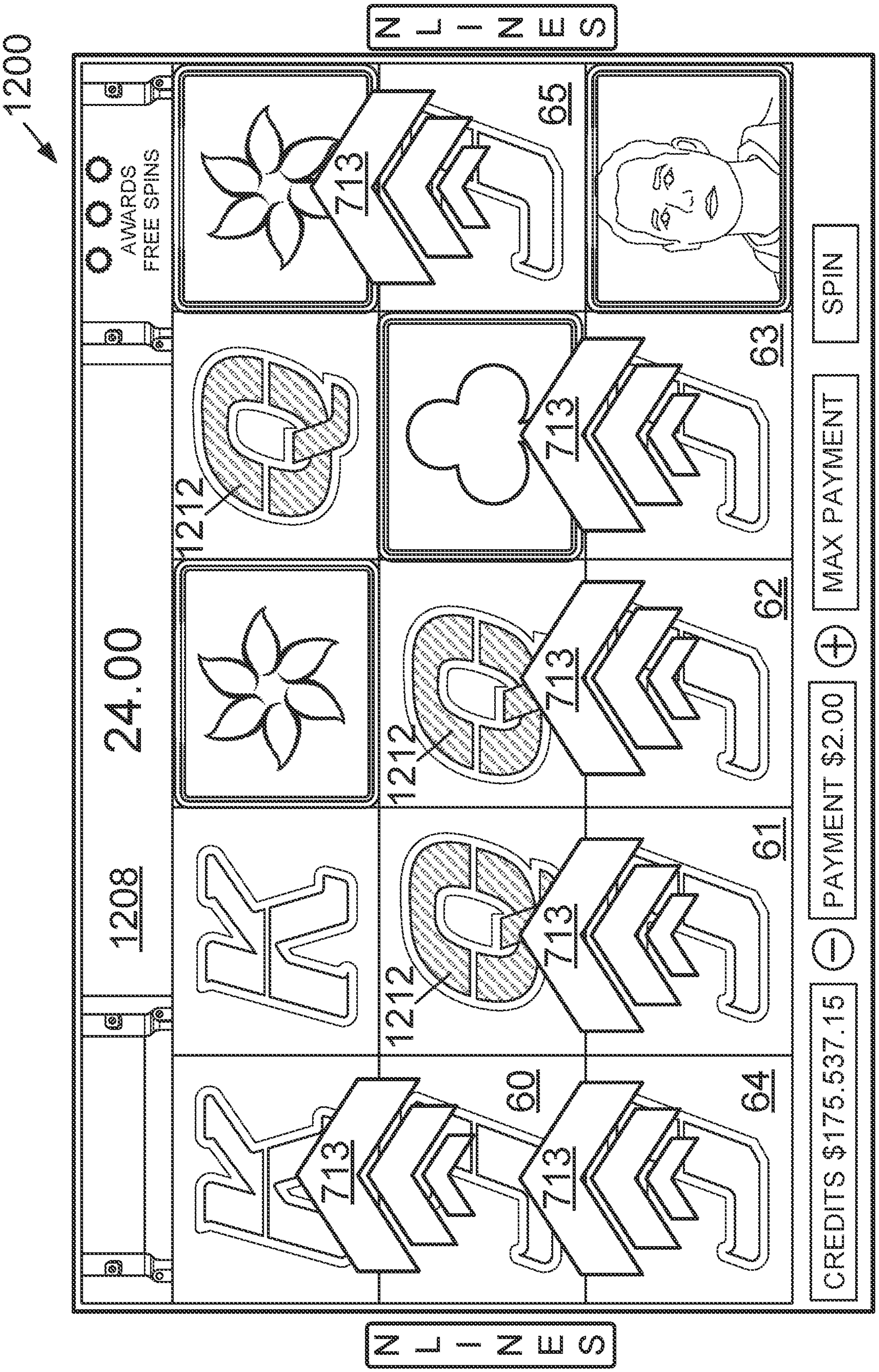

Next, FIG. 12G shows the display screen 1200 with an icon 713 corresponding to each symbol on the display screen 1200 that will be upgraded. Those symbols are contained in a symbol position 60, 61, 62, 63, 64, 65. Further, the symbols that can combine with the upgraded symbols to form further wins are highlighted using a highlighting 1212. In one respect, a "Q" symbol that is not highlighted can include a first "Q" symbol in the symbols 353 and a "Q" symbol that is highlighted can include a second "Q" symbol in the symbols 353. The highlighting 1212 for the "Q" symbol can result from displaying the second "Q" symbol in the symbols 353. In another respect, the highlighting 1212 can include an animation from the animations 356.

Figure 12H:
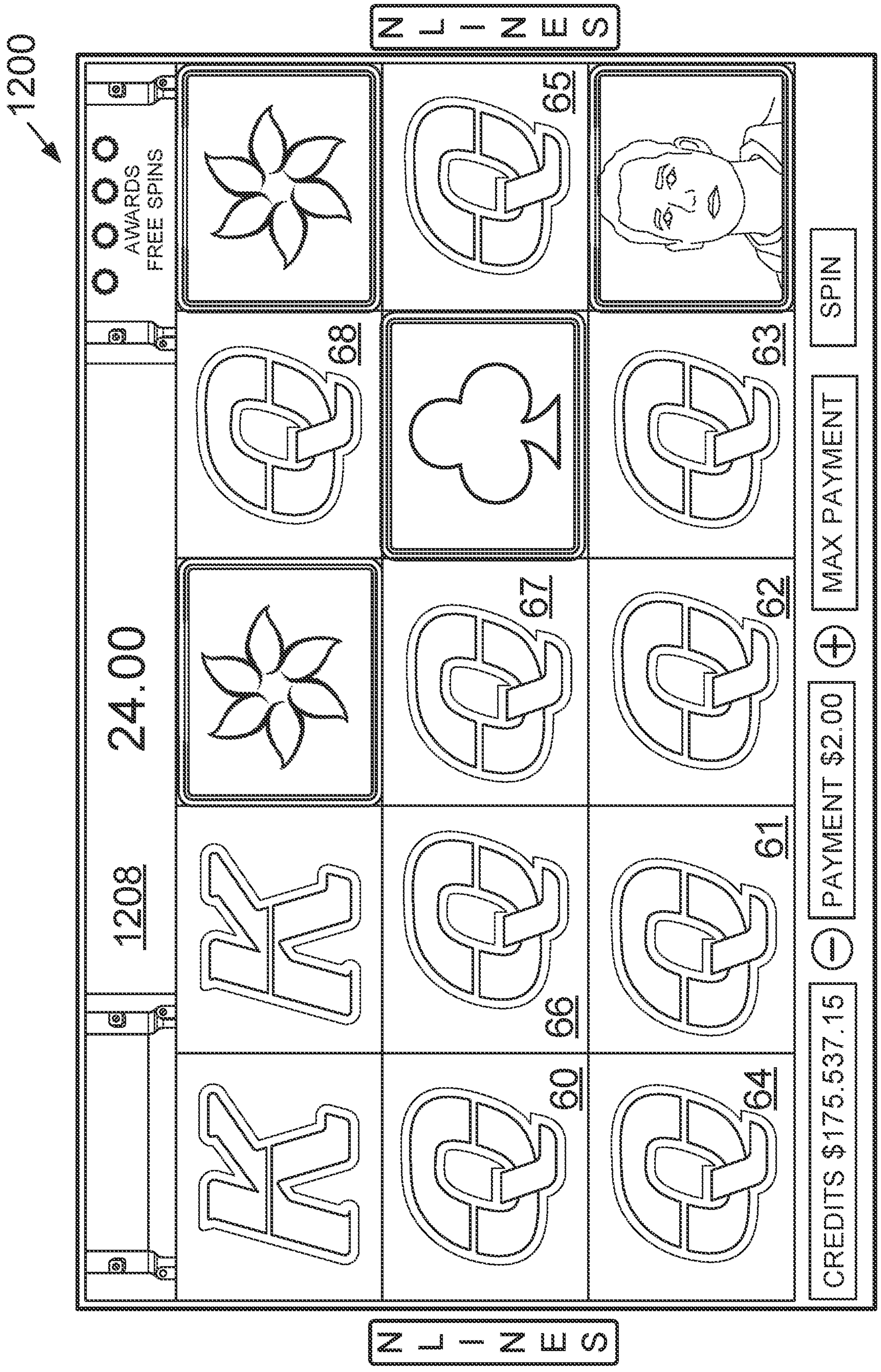

Next, FIG. 12H shows the display screen 1200 after the symbol at the symbol position 61, 62, 63, 64, 65 has been upgraded from a "J" symbol to a "Q" symbol. Other "Q" symbols are shown in a symbol positions 66, 67, 68. A processor, such as the processor 112, 112*a* determines whether any active paylines has a winning outcome after the "J" symbols have been upgraded.

Figure 12I:
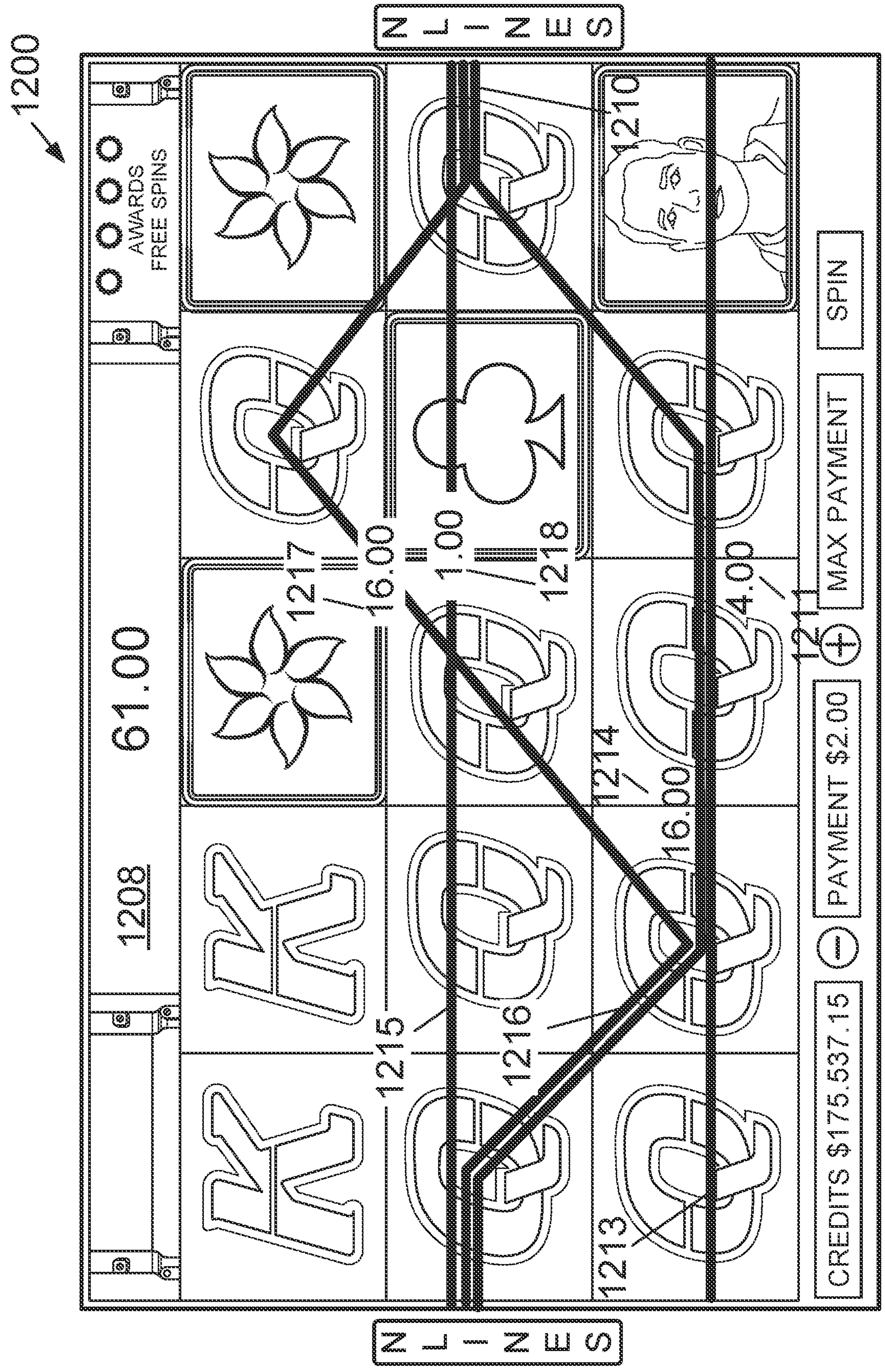

Next, FIG. 12I shows new wins for an outcome based on upgrading the "J" symbols to "Q" symbols. The new wins are highlighted by showing the payline 1210, 1213, and a payline 1215, 1216. The award indicator 1211 corresponds to the win on the payline 1210 and the award indicator 1214 corresponds to the win on the payline 1213. Additionally, the award indicator 1218 corresponds to the win on the payline 1215 and the award indicator 1217 corresponds to the win on the payline 1216. The award bar 1208 in FIG. 12I shows a sum of all awards provided since the reels were spun after the previous result shown in FIG. 12A. FIG. 12I also represents an embodiment in which a payline that showed a winning outcome for a prior outcome of the sequence of outcome events can include a winning outcome for a subsequent outcome in the sequence of outcome events.

Figure 12J:
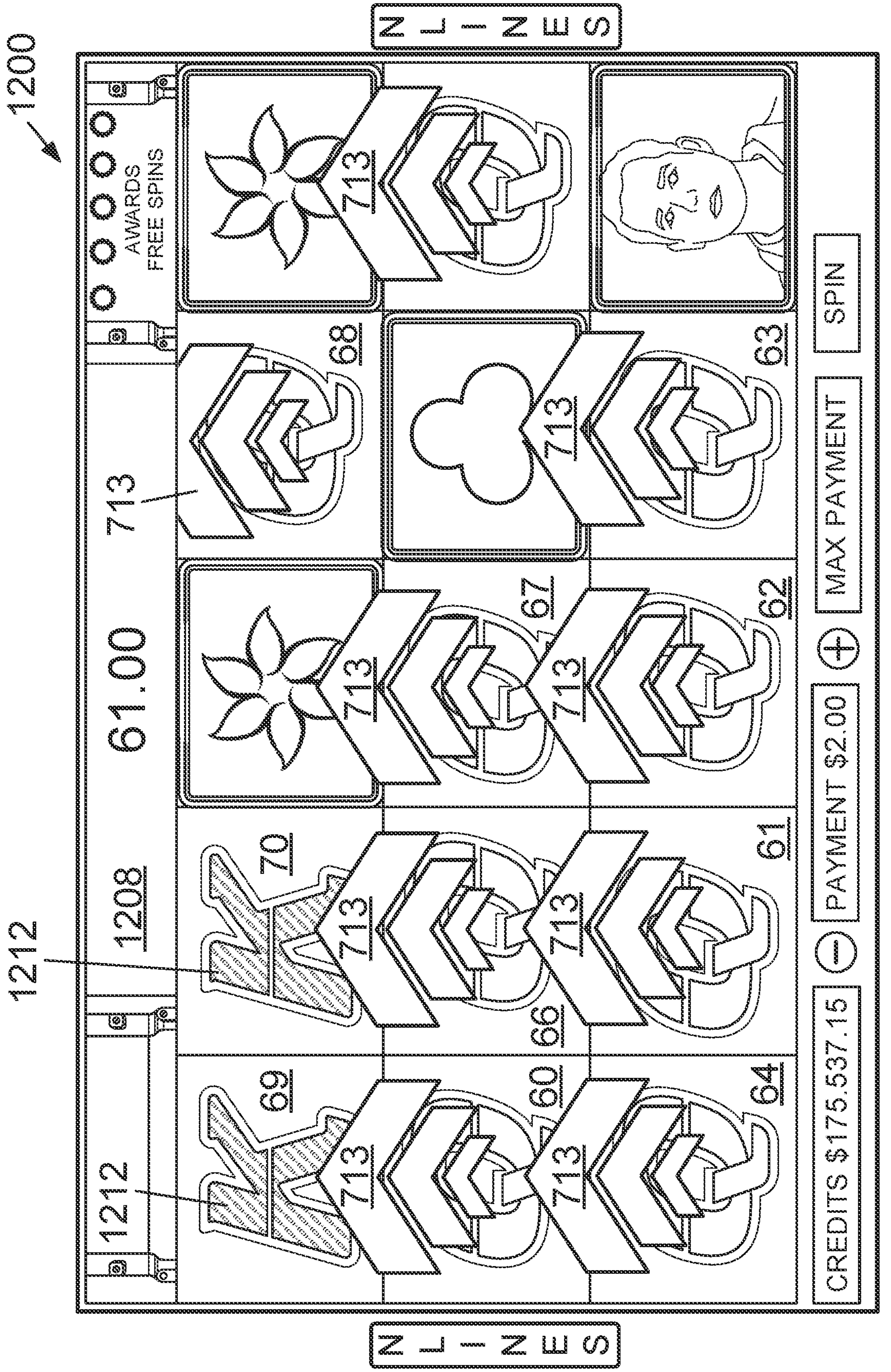

Next, FIG. 12J shows the display screen 1200 with an icon 713 corresponding to each symbol on the display screen 1200 that will be upgraded. Those symbols are contained in a symbol position 60, 61, 62, 63, 64, 65, 66, 67, 68. Further, the symbols that can combine with the upgraded symbols to form further wins are highlighted using a highlighting 1212. In one respect, a "K" symbol that is not highlighted can include a first "K" symbol in the symbols 353 and a "K" symbol that is highlighted can include a second "K" symbol in the symbols 353. The highlighting 1212 for the "K" symbol can result from displaying the second "K" symbol in the symbols 353. In another respect, the highlighting 1212 can include an animation from the animations 356.

Figure 12K:
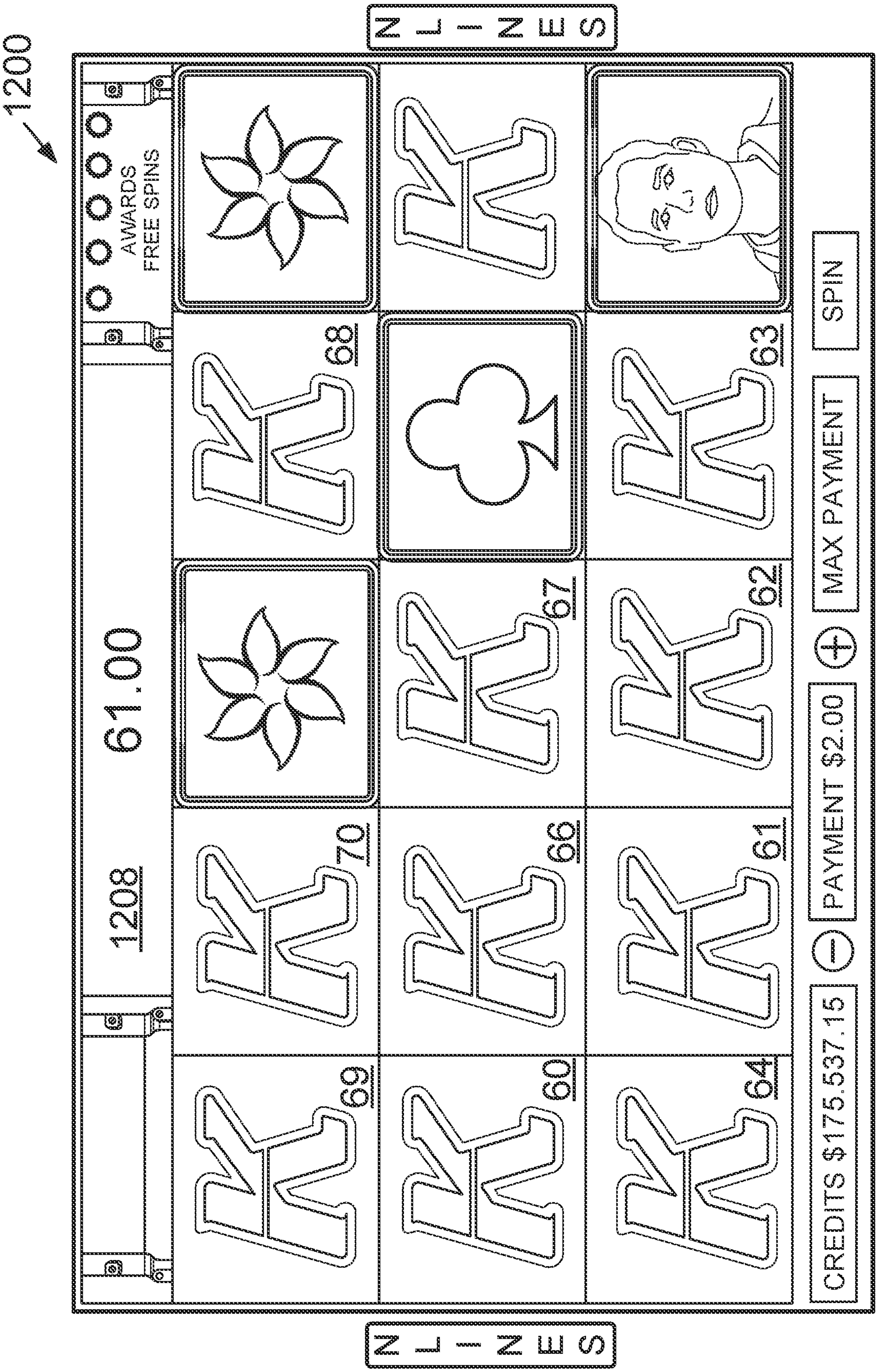

Next, FIG. 12K shows the display screen 1200 after the symbol at the symbol position 61, 62, 63, 64, 65, 66, 67, 68 has been upgraded from a "Q" symbol to a "K" symbol. Other "K" symbols are shown in a symbol positions 69, 70. A processor, such as the processor 112, 112*a* determines whether any active paylines has a winning outcome after the "Q" symbols have been upgraded.

Figure 12L:
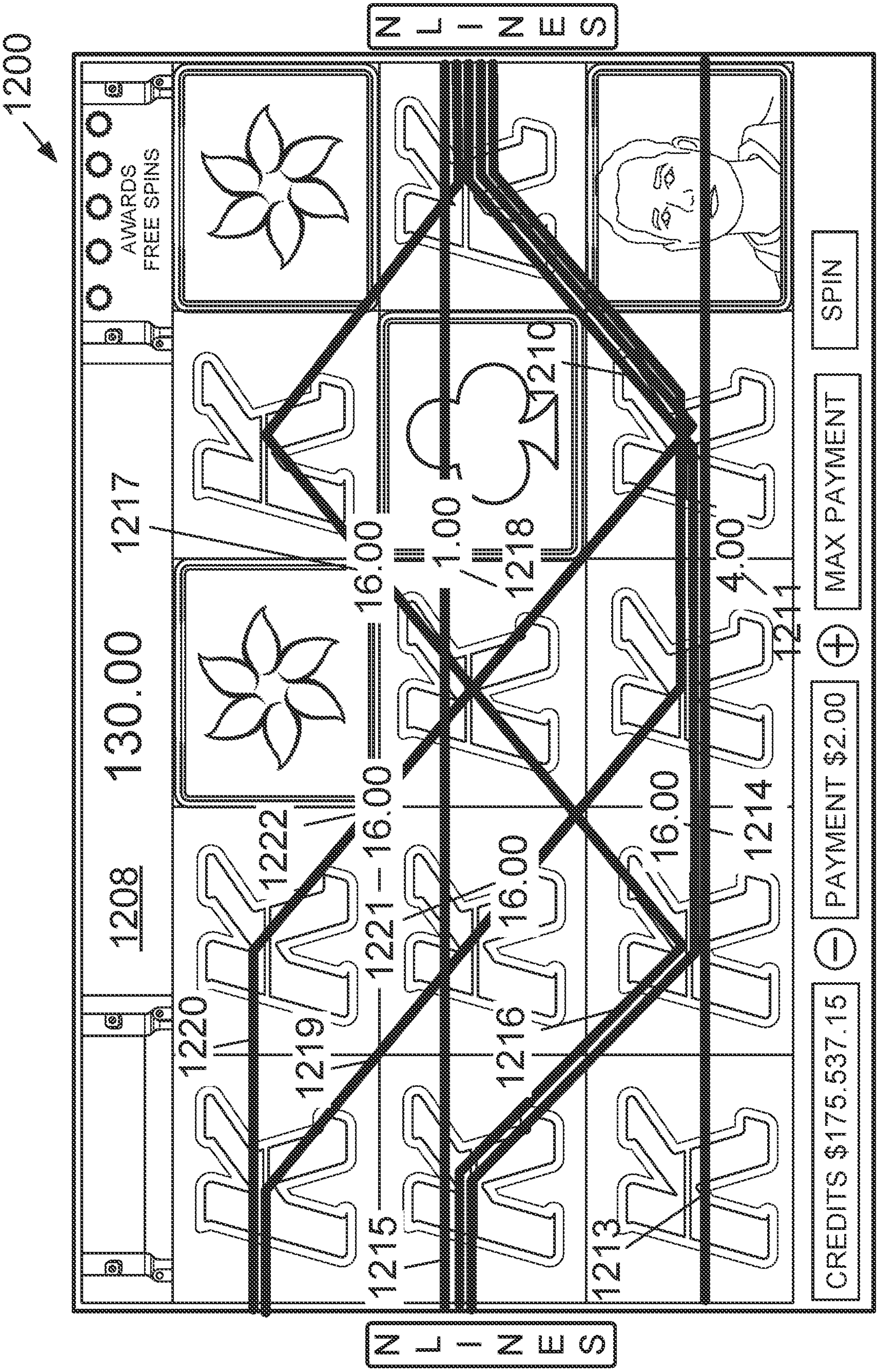

Next, FIG. 12L shows new wins for an outcome based on upgrading the "Q" symbols to "K" symbols. The new wins are highlighted by showing the payline 1210, 1213, 1215, 1216 and a payline 1219, 1220. The award indicator 1211 corresponds to the win on the payline 1210, the award indicator 1214 corresponds to the win on the payline 1213, the award indicator 1218 corresponds to the win on the payline 1215, and the award indicator 1217 corresponds to the win on the payline 1216. Additionally, the award indicator 1221 corresponds to the win on the payline 1219 and the award indicator 1222 corresponds to the win on the payline 1220. The award bar 1208 in FIG. 12L shows a sum of all awards provided since the reels were spun after the previous result shown in FIG. 12A. FIG. 12L also represents an embodiment in which a payline that showed a winning outcome for a prior outcome of the sequence of outcome events can include a winning outcome for a subsequent outcome in the sequence of outcome events.

When no more upgrades are possible, or no more wins will result from an upgrade, the sequence can terminate. If no more upgrades are possible, the cumulative award shown in the award bar 1208 can be added to the credit within the credits for a user of a computing system including the display screen 1200, such that the credit indicator 1202 shows a new quantity of credits available to the user. Entering another spin request via the user interface, such as via the USC 1207, can initiate a new spin of the reels. Appropriate win values can be output on the display prior to every upgrade event.

Notably, the functions of upgrading, transforming, replacing, reordering, adding, and/or removing symbols from a reel of a reel-based outcome event (e.g., the functions of blocks 602-614 or blocks 622-634, as just some possible examples), necessitate computer implementation. In a mechanical reel-based outcome event, the symbols appearing on each reel are fixed and cannot be changed while in use (e.g., while spinning). In contrast, the computer implementation herein allows the number of symbols per reel to be changed, as well as the symbols appearing on each reel to be replaced and/or re-ordered and/or to be changed during an outcome event based on cross-dependency with the symbols of other reels. These changes can occur while performing an outcome event, for example between spins of the reels or at the end of an outcome event, for example after a spin and based on the symbols identified for the different reels. Consequently, these features of the disclosure herein would not exist but for computer technology.

Particularly, the embodiments herein solve a technical problem of how to add movement and dynamic symbol transformation to individual symbols of a reel-based outcome event and further unpredictability in the reel-based outcome event. The functions of upgrading, transforming, replacing, reordering, adding, and/or removing symbols from a reel would be prohibitively complex and expensive to implement on a traditional machine with mechanical reels. In effect, the present approach can be seen as providing an implementation which increases the number and variety of possible outcomes in a random selection of data entries based on a reel-based outcome event.

Further, these features are an improvement to reel-based event technology. Since the symbols appearing on each reel are fixed and cannot be changed during mechanical reel-based outcome events, the functions of upgrading, replacing, reordering, adding, and/or removing symbols from a reel could not appear in such outcome events. Due to this technological limitation, users can become disinterested in these basic reel-based outcome events. Computer implementation, however, facilitates the integration of these features into reel-based outcome events, resulting in outcome event dynamics that would otherwise be unavailable. Consequently, the disclosure herein is a technological improvement to reel-based outcome events.

Furthermore, the embodiments include performing the functions of upgrading, transforming, replacing, reordering, adding, and/or removing symbols from a reel using a server computing system and client computing system using a communication network to carry communications including instructions and/or data to carry out the functions. As an example, the client computing system can include user-selectable controls that are selectable to trigger performance of an outcome event. Moreover, a processor at the client computing system can receive inputs from devices operatively coupled to the processor, such as an acceptor, and can control devices outside of the processor during performance of the outcome event, such as a display or speaker. Furthermore still, in some embodiments, a processor at the server computing system can determine an outcome for an outcome event and transmit data for displaying a representation of the outcome event on a display screen at the client computing system. In at least some embodiments, the data for displaying a representation of the outcome event can include an index value to some content already stored at the client computing system so that the server computing system does not need to transmit that content each time the client computing system is to display that content during performance of an outcome event.

V. Communication Flow

Figure 13:
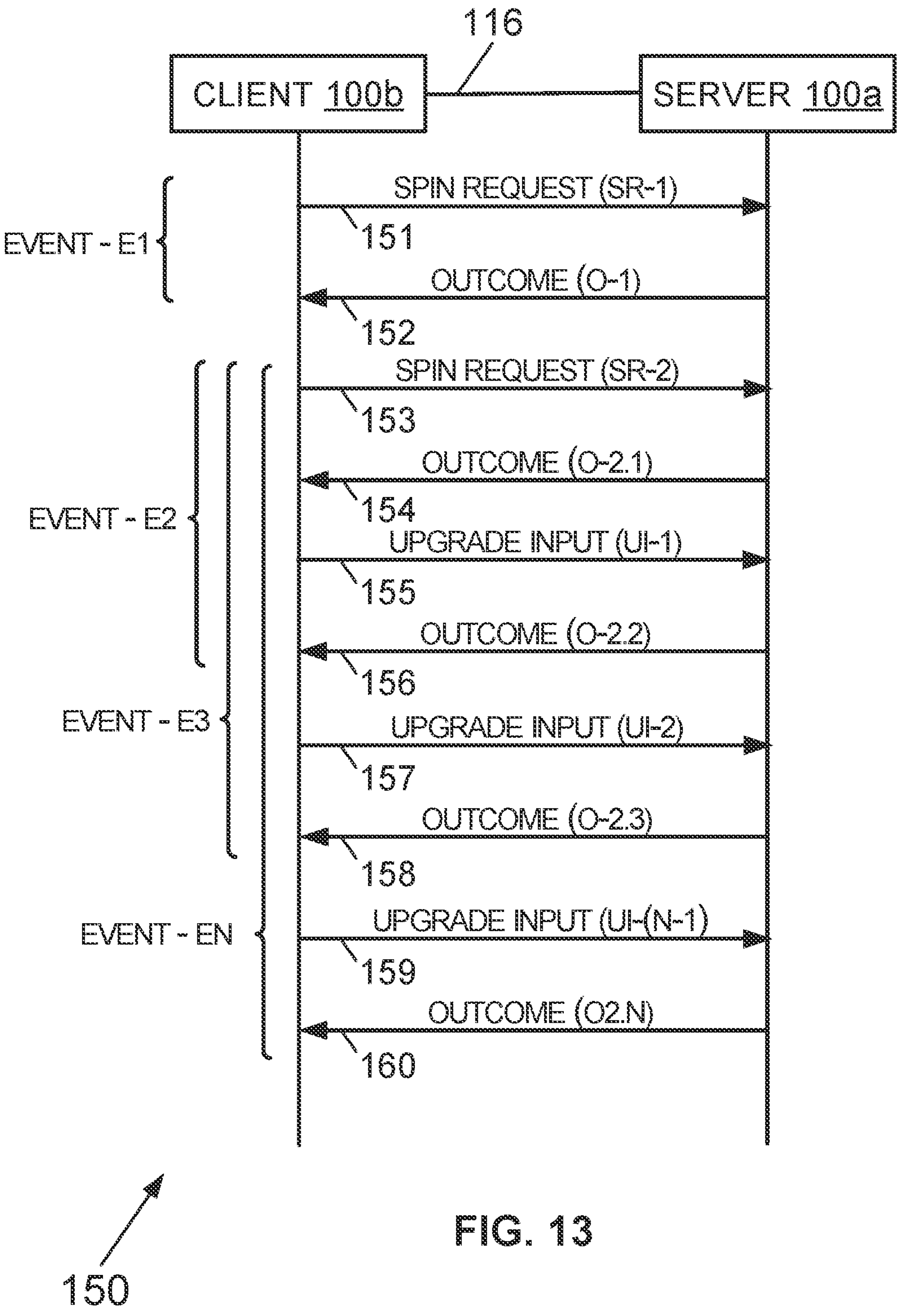
FIG. 13 shows communication flows in accordance with the example embodiments.

Next, FIG. 13 shows a communication flow 150 including multiple communications that can occur over the communication network 118. In FIG. 13, an arrow pointing to the right indicates a communication transmitted by the computing system 100*b* to the computing system 100*a*, and an arrow pointing to the left indicates a communication transmitted by the computing system 100*a* to the computing system 100*b*. In particular, the communication flow 150 includes a communication 151, 153, 155, 157, 159 transmitted by the computing system 100*b*, and a communication 152, 154, 156, 158, 160 transmitted by the computing system 100*a*.

Multiple communications within the communication flow 150 are grouped within one or more events (i.e., event E1, event E2, event E3, or event EN). The event E1 includes the communication 151, 152. The event E2 includes the communication 153, 154, 155, 156. Occurrence of the event E2 is conditioned on an outcome O2.1 being a winning outcome. The event E3 includes the communication 153, 154, 155, 156, 157, 158. Occurrence of the event E3 is conditioned on the outcome O2.1 and an outcome O2.2 being winning outcomes. The event EN includes the communication 153, 154, 155, 156, 157, 158, 159, 160. Occurrence of the event EN is conditioned on the outcome O2.1, the outcome O2.2, and an outcome O2.3 being winning outcomes. A communication Com-7, Com-8 in Table B below shows an example of data that can be included within the communication 160.

The following description regarding FIG. 13 refers to a first particular operating state, a second particular operating state, a third particular operating state, and a fourth operating state. Unless the context describes differently, in some examples, the use of ordinal numbers in these terms does not represent any position, but are used to distinguish between different operating states. One or more of the operating states corresponding to these terms could be described using a different ordinal number. For this description, the first particular operating state is an operating state in which the computing system 100*a* is performing an outcome event for the computing system 100*b*, and the second particular operating state is an operating state in which the computing system 100*a* is not performing an outcome event for the computing system 100*b*. Additionally, for this description, the third particular operating state is an operating state in which the computing system 100*b* is performing an outcome event for the computing system 100*b*, and the fourth particular operating state is an operating state in which the computing system 100*b* is not performing an outcome event for the computing system 100*b*.

Figure 14:
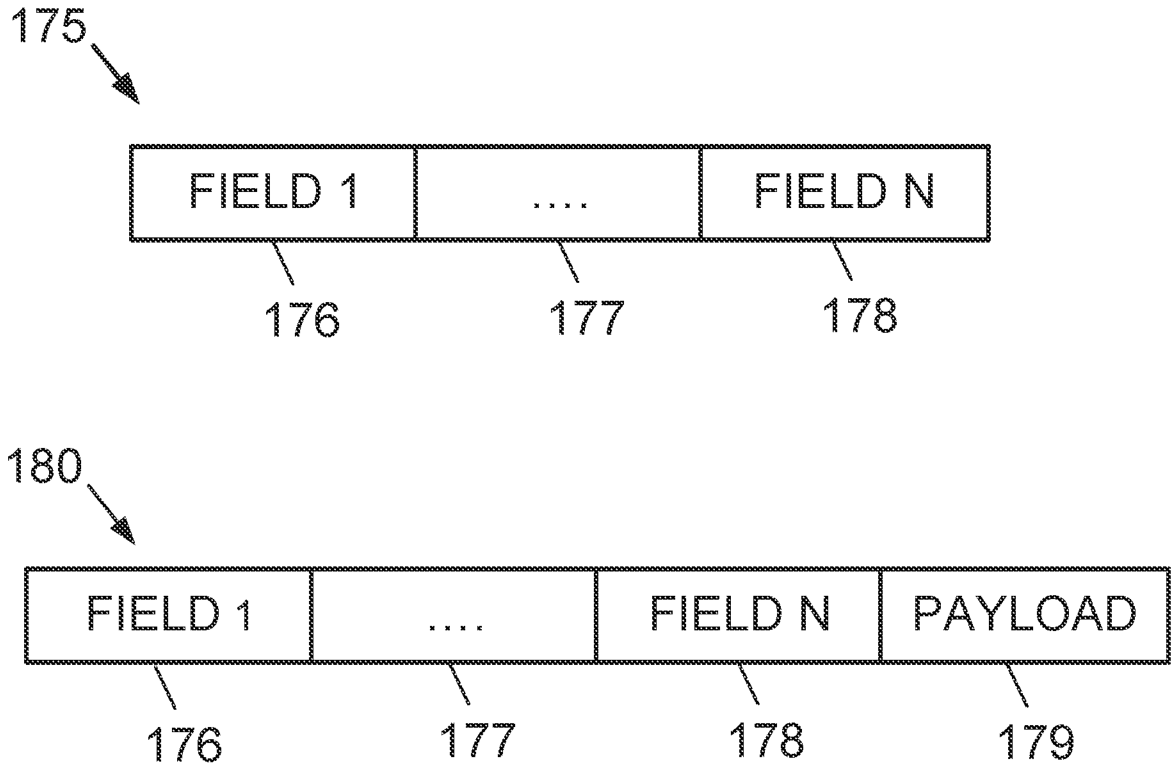
FIG. 14 shows example communications in accordance with the example embodiments.

In at least some embodiments, one or more of the communication 152, 154, 156, 158, 160 can include and/or be arranged as a computer-readable file, such as a hyper-text markup language (HTML) file, an extensible markup language (XML) file, a Java script objection notation (JSON) file, a PDF file, a comma separated variable (CSV) file, or some other type of file, or a communication shown in FIG. 14.

A. FIG. 13—Event E1

The communication 151 includes a spin request (SR-1). The communication 151 can be transmitted in response to a selection of the user-selectable control 109*b* at the computing system 100*b* when the computing system 100*b* is operating in the fourth particular operating state. While the computing system 100*b* is in that operating state, the computing system 100*a* can be performing a respective outcome event for one or more other client computing systems. The computing system 100*b* can, for example, enter the fourth particular operating state upon powering up or after concluding a prior outcome event. Other spin requests, such as a spin request (SR-2) can occur under similar circumstances. Upon receiving the communication 151, the computing system 100*a* can switch from the second operating state to the first operating state. A communication Com-3 shown in Table A below shows an example of data that can be included within the communication 151.

The communication 152 includes an outcome O-1. The communication 152 can be transmitted in response to the processor 112*a* receiving the spin request SR-1 and determining the outcome O-1 while the computing system 100*a* is in the first operating state. As an example, determining the outcome O-1 can include the processor 112*a* randomly selecting from the global symbol group table 300 a set of symbols for a set of symbol positions (e.g., selecting fifteen symbols for a 3×5 symbol matrix). An example communication Com-9 in Table B below shows an example of data that can be included within the communication 152.

For event E1, the outcome O-1 does not include a winning outcome that allows the computing system 100*b* to output an upgrade input. Upon determining the outcome O-1, in addition to transmitting the communication 152 the computing system 100*a* can begin and/or return to operating in the second particular operating state.

The processor 112*b* can output particular content to the user interface 104*b* in response to receiving the outcome O-1 and the computing system 100*b* can begin and/or return to operating in the fourth operating state. As an example, the processor 112*b* can output a GUI to the display 110*b*. The GUI can, for example, include: an animation showing a set of reels spinning and stopping such that the set of symbols selected for the outcome O-1 is displayed on the GUI. In at least some embodiments, the GUI includes information for guiding a user of the computing system 100*b* how he or she may proceed (e.g., selecting a user-selectable control to make a next spin request, selecting a user-selectable control to replay at least a portion of the outcome O-1, or selecting a user-selectable control to end the user's activities at the computing system 100*b*) after the computing system 100*b* begins and/or returns to operating in the fourth particular operating state.

As another example, in response to receiving the outcome O-1, the processor 112*b* can output one or more signals (e.g., electrical signals) to the speaker 111*b* to control the speaker 111*b* to output sound waves based on the one or more particular signals. As an example, the one or more signals can include a signal played when an outcome at the computing system 100*b* did not include a winning outcome that allows the computing system 100*b* to output an upgrade input. As another example, the one or more signals can include a signal played when the computing system 100*b* is operating in the fourth particular operating state.

B. FIG. 13—Event E2

The communication 153 includes a spin request (SR-2). The communication 153 can be transmitted in response to a selection of the user-selectable control 109*b* at the computing system 100*b* when the computing system 100*b* is in operating in the fourth operating state. Upon receiving the communication 153, the computing system 100*a* can switch from operating in the second particular operating state to operating in the first particular operating state. In at least some embodiments, for event E2, the computing system 100*b* enters the third particular operating state in response to receiving the selection of the user-selectable control 109*b* and/or transmitting the communication 153. The communication Com-3 in Table A below shows an example of data that can be included within the communication 153.

The communication 154 includes an outcome O-2.1. The communication 154 can be transmitted in response to the processor 112*a* receiving the spin request SR-2 and determining the outcome O-2.1 while the computing system 100*a* is operating in the second particular operating state. As an example, determining the outcome O-2.1 can include the processor 112*a* randomly selecting from the global symbol group table 300 a set of symbols for a set of symbol positions (e.g., selecting fifteen symbols for a 3×5 symbol matrix). An example communication Com-5, Com-6 in Table B below shows an example of data that can be included within the communication 154. In at least some embodiments, for event E2, the computing system 100*a* begins operating in the first particular operating state, and the computing system 100*b* begins operating in the third particular operating state in response to receiving the communication 154.

For event E2, the outcome O-2.1 includes a winning outcome that allows the computing system 100*b* to output an upgrade input. Under these circumstances, a GUI showing the winning outcome can include a USC (e.g., the USC 430 shown in FIG. 4) that is selectable to cause one or more symbols on the GUI to be upgraded. Prior to selection of the USC 430, the USC 432 can be selected to cause the processor 112*b* to replay the outcome O-2.1 on the user interface 104*b*.

In at least some embodiments, in response to a selection of the USC 430, the computing system 100*b* transmits the communication 155 to the computing system 100*a*. The communication 155 can include an upgrade input (UI-1). In response to receiving the communication 155, the processor 112*a* can determine an outcome O-2.2. A communication Com-4 shown in Table A below shows an example of data that can be included within the communication 155.

For event E2, the outcome O-2.2 does not include a winning outcome that allows the computing system 100*b* to output an upgrade input. Under these circumstances, a GUI showing the outcome O-2.2 can include a USC (e.g., the USC 428) that is selectable to cause a spin request to be transmitted to the computing system 100*b*. The GUI can include a USC (e.g., the USC 432) that is selectable to replay the outcome O-2.2 before a selection of the USC 428 occurs.

For event E2, the processor 112*b* can output particular content to the user interface 104 in response to receiving the outcome O-2.2 and the computing system 100*b* can return to the operating state in the fourth particular operating state. As an example, the processor 112*b* can output a GUI to the display 110*b*. The GUI can, for example, include: an animation showing a set of reels spinning and stopping such that the set of symbols selected for the outcome O-2.2 is displayed on the GUI. In at least some embodiments, the GUI includes the information for guiding a user of the computing system 100*b* how he or she may proceed (e.g., selecting a user-selectable control to make a next spin request, selecting a user-selectable control to replay at least a portion of the outcome O-2.2, or selecting a user-selectable control to end the user's activities at the computing system 100*b*).

For event E2, in response to receiving the outcome O-2.2, the processor 112*b* can output one or more signals (e.g., electrical signals) to the speaker 111*b* to control the speaker 111*b* to output sound waves based on the one or more particular signals. Examples of outputting these signals are discussed above with respect event E1 and the outcome O-1.

C. FIG. 13—Event E3

Event E3 includes transmission of the communication 153, 154, 155 as described above with respect to event E2 and transmission of the communication 156, except that for event E3, the outcome O2.2 includes a winning outcome that allows the computing system 100*b* to output an upgrade input. Under these circumstances, a GUI showing the outcome O2.2 can include a USC (e.g., the USC 430 shown in FIG. 4) that is selectable to cause one or more symbols on the GUI to be upgraded. Prior to selection of the USC 430, the USC 432 can be selected to cause the processor 112*b* to replay the outcome O-2.2 on the user interface 104*b*. A communication Com-7, Com-8 shown in Table B below shows an example of data that can be included within the communication 156.

In at least some embodiments, in response to a selection of the USC 430 while the outcome O-2.2 is displayed on the GUI, the computing system 100*b* transmits the communication 157 to the computing system 100*a*. The communication 157 can include an upgrade input (UI-2). In response to receiving the communication 157, the processor 112*a* can determine an outcome O-2.3. The communication Com-4 shown in Table A below shows an example of data that can be included within the communication 157.

For event E3, the outcome O-2.3 does not include a winning outcome that allows the computing system 100*b* to output an upgrade input. Under these circumstances, a GUI showing the outcome O-2.3 can include a USC (e.g., the USC 428) that is selectable to cause a spin request to be transmitted to the computing system 100*b*. The GUI can include a USC (e.g., the USC 432) that is selectable to replay the outcome O-2.3 before a selection of the USC 428 occurs.

For event E3, the processor 112*b* can output particular content to the user interface 104 in response to receiving the outcome O-2.3 and the computing system 100*b* can return to the operating state in the fourth particular operating state. As an example, the processor 112*b* can output a GUI to the display 110*b*. The GUI can, for example, include: an animation showing a set of reels spinning and stopping such that the set of symbols selected for the outcome O-2.3 is displayed on the GUI. In at least some embodiments, the GUI includes the information for guiding a user of the computing system 100*b* how he or she may proceed (e.g., selecting a user-selectable control to make a next spin request, selecting a user-selectable control to replay at least a portion of the outcome O-2.3, or selecting a user-selectable control to end the user's activities at the computing system 100*b*).

For event E3, in response to receiving the outcome O-2.3, the processor 112*b* can output one or more signals (e.g., electrical signals) to the speaker 111*b* to control the speaker 111*b* to output sound waves based on the one or more particular signals. Examples of outputting these signals are discussed above with respect event E1 and the outcome O-1.

D. FIG. 13—Event EN

The "N" in event EN is variable and an integer greater than 3. If N=4, then no additional outcome events occur between outcome O2.3 and an outcome O2.N. If N is greater than 4, then N-4 outcome events occur between outcome O2.3 and an outcome O2.N. The N-4 outcome events include a winning outcome that allows the computing system 100*b* to output an upgrade input.

Event EN includes transmission of the communication 153, 154, 155, 156, 157 as described above with respect to event E3 and transmission of the communication 158, except that for event EN, the outcome O2.3 includes a winning outcome that allows the computing system 100*b* to output an upgrade input. Under these circumstances, a GUI showing the outcome O2.3 can include a USC (e.g., the USC 430 shown in FIG. 4) that is selectable to cause one or more symbols on the GUI to be upgraded. Prior to selection of the USC 430, the USC 432 can be selected to cause the processor 112*b* to replay the outcome O-2.3 on the user interface 104*b*. The communication Com-7, Com-8 shown in Table B below shows an example of data that can be included within the communication 158.

In at least some embodiments, in response to a selection of the USC 430 while the outcome O-2.3 is displayed on the GUI, the computing system 100*b* transmits the communication 159 to the computing system 100*a*. The communication 159 can include an upgrade input (UI-(N-1)). In response to receiving the communication 159, the processor 112*a* can determine an outcome O-2.N. The communication Com-4 in Table A shown below shows an example of data that can be included within the communication 159.

For event EN, the outcome O-2.N does not include a winning outcome that allows the computing system 100*b* to output an upgrade input. Under these circumstances, a GUI showing the outcome O-2.N can include a USC (e.g., the USC 428) that is selectable to cause a spin request to be transmitted to the computing system 100*b*. The GUI can include a USC (e.g., the USC 432) that is selectable to replay the outcome O-2.N before a selection of the USC 428 occurs.

For event EN, the processor 112*b* can output particular content to the user interface 104 in response to receiving the outcome O-2.N and the computing system 100*b* can return to the operating state in the fourth particular operating state. As an example, the processor 112*b* can output a GUI to the display 110*b*. The GUI can, for example, include: an animation showing a set of reels spinning and stopping such that the set of symbols selected for the outcome O-2.N is displayed on the GUI. In at least some embodiments, the GUI includes the information for guiding a user of the computing system 100*b* how he or she may proceed (e.g., selecting a user-selectable control to make a next spin request, selecting a user-selectable control to replay at least a portion of the outcome O-2.N, or selecting a user-selectable control to end the user's activities at the computing system 100*b*).

For event EN, in response to receiving the outcome O-2.N, the processor 112*b* can output one or more signals (e.g., electrical signals) to the speaker 111*b* to control the speaker 111*b* to output sound waves based on the one or more particular signals. Examples of outputting these signals are discussed above with respect event E1 and the outcome O-1.

For any of the events shown in FIG. 13, in response to receiving an output with a winning outcome, the processor 112*b* can output one or more signals (e.g., electrical signals) to the speaker 111*b* to control the speaker 111*b* to output sound waves based on the one or more other particular signals. As an example, the one or more signals can include a signal played when an outcome at the computing system 100*b* includes a winning outcome that allows the computing system 100*b* to output an upgrade input. As another example, the one or more signals can include a signal played when the computing system 100*b* is operating in the third particular operating state.

VI. Example Communications

Next, FIG. 14 shows an example communication 175, 180. The communication 175, 180 can be transmitted over the communication network 118. In at least some embodiments, the computing system 100*a* is configured to transmit communications arranged like the communication 175 and communications arranged like the communication 180, and the computing system 100*b* is configured to transmit communications arranged like the communication 175. In at least some other embodiments, the computing system 100*b* is further configured to transmit communication like the communication 180. One or more of the communication 151, 152, 153, 154, 155, 156, 157, 158, 159, 160 can be arranged like the communication 175 or the communication 180.

As shown in FIG. 14, the communication 175, 180 include a first field 176, an intermediate field 177, and an Nth field 178. The Nth field could be a second field such that the intermediate field 177 is not used. Alternatively, the Nth field can be a third field or one or more fields greater than a third field. FIG. 14 also shows that the communication 180 includes a payload 179. In at least some embodiments, the payload 179 includes a file (e.g., an HTTP file, an XML file, a JSON file, or a script file). In at least some other embodiments, the payload 179 includes a payload identifier that identifies a payload file sent separate from the communication 180.

Table A and Table B show data for example communications Com-1, Com-2, Com-3, Com-4, Com-5, Com-6, Com-7 and Com-8. The left-most columns of Table A and Table B show field descriptors. The other columns in those tables show example content within the fields. The use of "Null" in Table A and Table B indicates that the corresponding field is not included in the example communication. Accordingly, the communication Com-1 is shown to include four fields. In accordance with that example and in light of FIG. 14, field N within the communication 175 can be the fourth field and the communication 175 can include two fields. A person having ordinary skill in the art will understand that any of the communications shown in Table A or Table B can include other fields, such as a checksum field or one or more other fields.

The communication Com-1, Com-2, Com-3, Com-4 in Table A is an example of a communication sent from the computing system 100*b* (i.e., the source of the communication) to the computing system 100*a* (i.e., the destination of the communication). Com-1 is for logging into the computing system 100*a* and Com-2 is for logging off of the computing system 100*a*. Com-3 includes a spin request and indicate a number of credits being provided as a payment, and set of patterns selected for an outcome event. A set of patterns can include one or more patterns. Each of the communication Com-1, Com-2, Com-3, Com-4 is shown to include a user identifier, which the computing system 100*b* can learn by reading a customer card as it passes through the acceptor 107*b*.

The communication Com-5, Com-6, Com-7, Com-8, Com-9 in Table B is an example of a communication sent from the computing system 100*s* (i.e., the source of the communication) to the computing system 100*b* (i.e., the destination of the communication). Com-5 and Com-6 is for providing an outcome to the computing system 100*b*. The computing system 100*a* can transmit Com-5 or Com-6 in response to receiving Com-3. Com-7 and Com-8 is for providing an outcome upgrade to the computing system 100*b*. The computing system 100*a* can transmit Com-7 or Com-8 in response to receiving Com-4. The computing system 100*a* can transmit Com-9 if an initial outcome of an outcome event does not include any winning pattern. The symbol data matrix M2 can indicate symbol display positions and symbols to represent that initial outcome.

Com-5 includes pattern data indicating a subset of patterns (e.g., Subset 1A) and symbol data (e.g., Matrix M1). If all of the of the patterns of Set 1 in Com-3 are winning patterns, then Subset 1A is equivalent to Set 1, otherwise, Subset 1A indicates a portion of the patterns in Set 1 that are winning patterns. The symbol data can indicate which symbols of the global symbol group table 300 are to be output within the multiple symbol display positions on the display screen.

Com-6 includes a payload PL-1. The payload PL-1 can be a file that includes information regarding subset 1A of patterns and the matrix M1 of symbols. Alternatively, the payload PL-1 can include an identifier of that file. In at least some embodiments, the payload file PL-1 includes an instruction or a file for displaying an initial outcome of an outcome event, including for example, an animation of the reels spinning and stopping such symbol display positions include the symbols as defined by the matrix M1 of symbols. Com-5 and Com-6 both includes an award field indicating one or more awards (e.g., M credits) for each winning pattern or a sum of multiple awards for the winning patterns during a first outcome of an outcome event.

Com-7 includes pattern data indicating a subset of patterns (e.g., subset 1B) and symbol data (e.g., matrix upgrade M2). Subset 1B indicates one or more patterns in the Set 1 that are winning patterns based on upgrading symbols for an outcome after the first outcome based on the matrix upgrade M2. In at least some implementations, the data in the matrix upgrade M2 can indicate which symbols and/or which symbol display positions is/are to be upgraded and which symbol is the upgrade symbol. Alternatively, the processor 112*b* can determine the upgrade symbol based on the symbol hierarchy table 320. In at least some other implementations, the data in the matrix upgrade M2 can indicate a symbol for each symbol display position on the display screen.

Com-8 includes a payload PL-2. The payload PL-2 can be a file that includes information regarding subset 1B of patterns and the matrix upgrade M2 of symbols. Alternatively, the payload PL-2 can include an identifier of that file. In at least some embodiments, the payload file PL-2 includes an instruction or a file for displaying an outcome following an initial outcome of an outcome event, including for example, an animation of one or more symbols upgrading according to the matrix upgrade M2 of symbols. A portion of such animation is represented in FIG. 7B, FIG. 7D, FIG. 8B, FIG. 8D, FIG. 9B, FIG. 10B, FIG. 11B, FIG. 12D, FIG. 12G and FIG. 12J. Com-7 and Com-8 both includes an award field indicating one or more awards (e.g., L credits) for each winning pattern or a sum of multiple awards for the winning patterns during an outcome following the first outcome of an outcome event.

TABLE A

| Field descriptor | Comm. Com-1 | Comm. Com-2 | Comm. Com-3 | Comm. Com-4 |
|---|---|---|---|---|
| Source ID | CS 100b | CS 100b | CS 100b | CS 100b |
| Destination ID | CS 100a | CS 100a | CS 100a | CS 100a |
| Message type | Log-in | Log-out | Spin request | Upgrade |
| Payment | Null | Null | N credits | Null |
| Patterns | Null | Null | Set 1 | Null |
| Symbols | Null | Null | Null | Null |
| User ID (UID) | UID-1 | UID-1 | UID-1 | UID-1 |
| Award | Null | Null | Null | Null |
| Payload | Null | Null | Null | Null |

TABLE B

| Field descriptor | Comm. Com-5 | Comm. Com-6 | Comm. Com-7 | Comm. Com-8 | Comm. Com-9 |
|---|---|---|---|---|---|
| Source ID | CS 100a | CS 100a | CS 100a | CS 100a | CS 100a |
| Destination ID | CS 100b | CS 100b | CS 100b | CS 100b | CS 100b |
| Message type | Outcome | Outcome | Upgrade outcome | Upgrade outcome | Outcome |
| Payment | Null | Null | Null | Null | Null |
| Patterns | Subset 1A | Null | Subset 1B | Null | None |
| Symbols | Matrix M1 | Null | Matrix upgrade M2 | Null | Matrix M2 |
| User ID (UID) | Null | Null | Null | Null | Null |
| Award | M credits | M credits | L credits | L credits | 0 credits |
| Payload | Null | PL-1 | Null | PL-2 | Null |

In at least some embodiments, a communication transmitted from the computing system 100*a* to the computing system 100 or vice versa includes a communication with a single field or two fields or content via a communication without any designated fields.

VII. Conclusions

While one or more disclosed functions have been described as being performed by certain computing systems (e.g., the computing system 100, the computing system 100*a*, or the computing system 100*b*), one or more of the functions can be performed by any entity, including but not limited to those described herein. As such, while this disclosure includes examples in which the computing system 100*a* performs select functions and sends data to the computing system 100*b*, such that the computing system 100*b* can perform complementing functions and receive the data, variations to those functions can be made while adhering to the general server-client dichotomy and the scope of the disclosed machines, computing systems, and methods.

For example, rather than the computing system 100*a* sending select data (e.g., a symbol set) to the computing system 100*b*, such that the computing system 100*b* can generate and display appropriate images, the computing system 100*a* can generate the images and send them to the computing system 100*b* for display. Indeed, it will be appreciated by one of ordinary skill in the art that the "break point" between the server computing system's functions and the client computing system's functions can be varied.

Furthermore, the functions described throughout this can be performed in an order different than an order of functions (if any) described herein or shown in the drawings. Additionally, embodiments in the form of a method can include one or more of the functions described herein or shown in the drawings.

Furthermore still, while examples have been described in terms of select embodiments, alterations and permutations of these embodiments will be apparent to those of ordinary skill in the art. Other changes, substitutions, and alterations are also possible without departing from the disclosed machines, computing systems, and methods in their broader aspects as set forth in the claims below.

Finally, one or more embodiments described above may relate to one or more of the following enumerated example embodiments (EEE).

EEE A1 is a computing system comprising: a memory containing multiple different symbols, the multiple different symbols including at least a first symbol and a second symbol; a processor coupled to the memory, the processor configured to: provide a graphical user interface comprising multiple symbol positions arranged in multiple rows and multiple columns, each column of the multiple columns representing a spinnable reel, wherein the graphical user interface comprises multiple particular patterns, each particular pattern comprises multiple symbol positions across the multiple columns; output, in response to an input, a first outcome that includes for each of the multiple symbol positions an initial symbol selected from the multiple different symbols; determine, for each particular pattern, whether symbols in the symbol positions of the particular pattern form a winning pattern for the first outcome, wherein the winning pattern for the first outcome comprises a first symbol being in two or more symbol positions of the particular pattern; output a corresponding award for each winning pattern for the first outcome; determine whether to replace the first symbol in each winning pattern for the first outcome; based on the determination to replace the first symbols, replace, in each winning pattern for the first outcome, the first symbol with the second symbol to form a second outcome; output the second outcome; determine, for each particular pattern, whether the symbols in the symbol positions of the particular pattern form a winning pattern for the second outcome, wherein the winning pattern for the second outcome comprises the second symbol being in two or more symbol positions of the particular pattern, and wherein the second symbol in at least one particular symbol position of the winning pattern for the second outcome is an initial symbol selected for the at least one particular symbol position; and output a corresponding award for each winning pattern for the second outcome.

EEE A2 is the computing system of EEE A1, wherein the processor is further configured to: determine whether to replace the second symbol in each winning pattern for the second outcome; and based on the determination to replace the second symbol, replace, for each winning pattern for the second outcome, the second symbol with a third symbol to form a third outcome.

EEE A3 is the computing system of any one of EEE A1 to A2, wherein at least a portion of the symbols are based on a hierarchy structure, wherein the second symbol has a higher or lower level than the first symbol.

EEE A4 is the computing system of EEE A3, wherein the third symbol has a higher or lower level than the second symbol.

EEE A5 is the computing system of EEE A1, wherein the processor is further configured to: output a third outcome; determine, for each particular pattern, whether the symbols in the symbol positions of the particular pattern form a winning pattern for the third outcome, wherein the winning pattern for the third outcome comprises a third symbol being in two or more symbol position of the particular pattern; and output a corresponding award for each winning pattern for the third outcome.

EEE A6 is the computing system of EEE A5, wherein at least a portion of the symbols are based on a hierarchy structure, wherein the second symbol has a higher or lower level than the first symbol.

EEE A7 is the computing system of EEE A6, wherein the third symbol has a higher or lower level than the second symbol.

EEE A8 is the computing system of any one of EEE A1 to A7, wherein each of the multiple particular patterns includes a pattern selected from the group consisting of: a horizontally extending pattern, a diagonally extending pattern, and combinations thereof.

EEE A9 is the computing system of any one of EEE A1 to A8, wherein the multiple columns include at least three columns.

EEE A10 is the computing system of EEE A9, wherein the multiple rows include at least three rows.

EEE A11 is the computing system of any one of EEE A1 to A8, wherein the multiple columns include at least five columns, and wherein the multiple rows include at least three rows.

EEE A12 is the computing system of any one of EEE A1 to A11, wherein each pattern comprises three symbol positions across consecutive columns of the multiple columns.

EEE A13 is the computing system of EEE A1, wherein at least a portion of the symbols are based on a hierarchy structure, wherein the second symbol has a higher or lower level than the first symbol.

EEE A14 is the computing system of any one of EEE A1 to A13, wherein the memory contains multiple different predetermined multipliers including a first multiplier, each of the different predetermined multipliers having a value determined independent of each of the multiple different winning patterns and being used with a different one of the winning patterns.

EEE A15 is the computing system of any one or EEE A1 to A14, wherein the processor is further configured to: randomly determine a first plurality of symbols; and associate each of the first plurality of symbols with one of the multiple symbol positions.

EEE A16 is the computing system of any one of EEE A1 to A15, further comprising at least one input device to enable input payment amounts.

EEE A17 is the computing system of EEE A16, wherein the input device includes an acceptor.

EEE A18 is the computing system of EEE A17, wherein the acceptor includes a paper money acceptor, a coin acceptor, a token acceptor, a validator, and/or a card reader.

EEE A19 is the computing system of EEE A16, further comprising: a display with a touch-sensitive screen, wherein the input device includes a user-selectable control on the touch-sensitive screen.

EEE A20 is the computing system of any one of EEE A1 to A22, further comprising: a display, wherein the processor is configured to provide the graphical user interface on the display.

EEE A21 is the computing system of any one or EEE A1 to A20, wherein the award associated with winning patterns for the first outcome is modified by a first predetermined modifier.

EEE A22 is the computing system of any one of EEE A1 to A21, wherein the award associated with winning patterns for the second outcome is modified by a second predetermined modifier.

EEE A23 is the computing system of any one of EEE A1 to A20, wherein the award associated with winning patterns for the first outcome is modified by a first predetermined modifier, and/or the award associated with winning patterns for the second outcome is modified by a second predetermined modifier.

EEE A24 is the computing system of any one of EEE A1 to A23, wherein each column of the multiple columns represents a respective spinnable reel.

EEE A25 is the computing system of EEE A24, wherein the processor configured to output the first outcome includes being configured to output an animation of each respective spinnable reel spinning and then stopping with the symbols in the symbol positions.

EEE A26 is the computing system of any one of EEE A1 to A25, wherein the memory contains a global symbol group including a plurality of symbols, subsets of which are displayable in a respective column of the multiple columns.

EEE A27 is the computing system of any one of EEE A1 to A26, wherein the memory contains a non-transitory computer readable memory.

EEE A28 is the computing system of any one of EEE A1 to A27, wherein each particular pattern of the multiple particular patterns is a particular payline.

EEE A29 is the computing system of EEE A28, wherein the winning pattern for the first outcome is a winning payline for the first outcome and the winning pattern for the second outcome is a winning payline for the second outcome.

EEE A30 is the computing system of any one of EEE A1 to A27, wherein each particular pattern of the multiple particular patterns is a particular payway.

EEE A31 is the computing system of EEE A30, wherein the winning pattern for the first outcome is winning payway for the first outcome and the winning pattern for the second outcome is a winning payway for the second outcome.

EEE A32 is the computing system of any one of EEE A1 to A31, wherein each winning pattern for the first outcome and each winning pattern for the second outcome starts at a left-most column of the multiple columns.

EEE A33 is the computing system of any one of EEE A1 to A31, wherein each winning pattern for the first outcome and each winning pattern for the second outcome starts at a right-most column of the multiple columns.

EEE A34 is the computing system of any one of EEE A1 to A31, wherein at least one winning pattern for the first outcome or for the second outcome starts at a left-most column of the multiple columns and at least one other winning pattern for the first outcome or for the second outcome starts at a right-most column of the multiple columns.

EEE B1 is a method comprising: providing, by a processor, a graphical user interface comprising multiple symbol positions arranged in multiple rows and multiple columns, each column of the multiple columns representing a spinnable reel, wherein the graphical user interface comprises multiple particular patterns, each particular pattern comprises multiple symbol positions across the multiple columns; outputting, in response to an input, a first outcome that includes for each of the multiple symbol positions an initial symbol selected from multiple different symbols; determining, for each particular pattern, whether the symbols in the symbol positions of the particular pattern form a winning pattern for the first outcome, wherein the winning pattern for the first outcome comprises a first symbol being in two or more symbol positions of the particular pattern; causing, for each winning pattern for the first outcome, a corresponding award to be awarded; determining whether to replace the first symbol in each winning pattern for the first outcome; based on the determination to replace the first symbols, replacing, in each winning pattern for the first outcome, the first symbol with a second symbol to form a second outcome; outputting the second outcome; determining, for each particular pattern, whether the symbols in the symbol positions of the particular pattern form a winning pattern for the second outcome, wherein the winning pattern for the second outcome comprises the second symbol being in two or more symbol positions of the particular pattern, and wherein the second symbol in at least one particular symbol position of the winning pattern for the second outcome is an initial symbol selected for the at least one particular symbol position; and causing, for each winning pattern for the second outcome, a corresponding award to be awarded.

EEE B2 is the method of EEE B1, further comprising: determining whether to replace the second symbol in each winning pattern for the second outcome; and based on the determination to replace the second symbols, replacing, for each winning pattern for the second outcome, the second symbol with a third symbol to form a third outcome.

EEE B3 is the method of any one of EEE B1 to B2, wherein at least a portion of the symbols are based on a hierarchy structure, wherein the second symbol has a higher or lower level than the first symbol.

EEE B4 is the method of EEE B3, wherein the third symbol has a higher or lower level than the second symbol.

EEE B5 is the method of EEE B1, further comprising: outputting a third outcome; determining, for each particular pattern, whether the symbols in the symbol positions of the particular pattern form a winning pattern for the third outcome, wherein the winning pattern for the third outcome comprises a third symbol being in two or more symbol position of the particular pattern; and causing, for each winning pattern for the third outcome, a corresponding payout to be awarded.

EEE B6 is the method of EEE B5, wherein at least a portion of the symbols are based on a hierarchy structure, wherein the second symbol has a higher or lower level than the first symbol.

EEE B7 is the method of EEE B6, wherein the third symbol has a higher or lower level than the second symbol.

EEE B8 is the method of any one of EEE B1 to B7, wherein each of the multiple particular patterns includes a pattern selected from the group consisting of: a horizontally extending pattern, a diagonally extending pattern, and combinations thereof.

EEE B9 is the method of any one of EEE B1 to B8, wherein the multiple columns include at least three columns.

EEE B10 is the method of EEE B9, wherein the multiple rows include at least three rows.

EEE B11 is the method of any one of EEE B1 to B8, wherein the multiple columns include at least five columns, and wherein the multiple rows include at least three rows.

EEE B12 is the method of any one of EEE B1 to B11, wherein each pattern comprises three symbol positions across consecutive columns of the multiple columns.

EEE B13 is the method of EEE B1, wherein at least a portion of the symbols are based on a hierarchy structure, wherein the second symbol has a higher or lower level than the first symbol.

EEE B14 is the method of any one of EEE B1 to B13, wherein the memory contains multiple different predetermined multipliers including a first multiplier, each of the different predetermined multipliers having a value determined independent of each of the multiple different winning patterns and being used with a different one of the winning patterns.

EEE B15 is the method of any one or EEE B1 to B14, wherein the processor is further configured to: randomly determine a first plurality of symbols; and associate each of the first plurality of symbols with one of the multiple symbol positions.

EEE B16 is the method of any one of EEE B1 to B15, further comprising at least one input device to enable input payment amounts.

EEE B17 is the method of EEE B16, wherein the input device includes an acceptor.

EEE B18 is the method of EEE B17, wherein the acceptor includes a paper money acceptor, a coin acceptor, a token acceptor, a validator, and/or a card reader.

EEE B19 is the method of EEE B16, further comprising: a display with a touch-sensitive screen, wherein the input device includes a user-selectable control on the touch-sensitive screen.

EEE B20 is the method of any one of EEE B1 to B22, further comprising: a display, wherein the processor is configured to provide the graphical user interface on the display.

EEE B21 is the method of any one or EEE B1 to B20, wherein the award associated with winning patterns for the first outcome is modified by a first predetermined modifier.

EEE B22 is the method of any one of EEE B1 to B21, wherein the award associated with winning patterns for the second outcome is modified by a second predetermined modifier.

EEE B23 is the method of any one of EEE B1 to B20, wherein the award associated with winning patterns for the first outcome is modified by a first predetermined modifier, and/or the award associated with winning patterns for the second outcome is modified by a second predetermined modifier.

EEE B24 is the method of any one of EEE B1 to B23, wherein each column of the multiple columns represents a respective spinnable reel.

EEE B25 is the method of EEE B24, wherein the processor configured to output the first outcome includes being configured to output an animation of each respective spinnable reel spinning and then stopping with the symbols in the symbol positions.

EEE B26 is the method of any one of EEE B1 to B25, wherein the memory contains a global symbol group including a plurality of symbols, subsets of which are displayable in a respective column of the multiple columns.

EEE B27 is the method of any one of EEE B1 to B26, wherein the memory contains a non-transitory computer readable memory.

EEE B28 is the method of any one of EEE B1 to B27, wherein each particular pattern of the multiple particular patterns is a particular payline.

EEE B29 is the method of EEE B28, wherein the winning pattern for the first outcome is a winning payline for the first outcome and the winning pattern for the second outcome is a winning payline for the second outcome.

EEE B30 is the method of any one of EEE B1 to B27, wherein each particular pattern of the multiple particular patterns is a particular payway.

EEE B31 is the method of EEE B30, wherein the winning pattern for the first outcome is winning payway for the first outcome and the winning pattern for the second outcome is a winning payway for the second outcome.

EEE B32 is the computing system of any one of EEE B1 to B31, wherein each winning pattern for the first outcome and each winning pattern for the second outcome starts at a left-most column of the multiple columns.

EEE B33 is the computing system of any one of EEE B1 to B31, wherein each winning pattern for the first outcome and each winning pattern for the second outcome starts at a right-most column of the multiple columns.

EEE B34 is the computing system of any one of EEE B1 to B31, wherein at least one winning pattern for the first outcome or for the second outcome starts at a left-most column of the multiple columns and at least one other winning pattern for the first outcome or for the second outcome starts at a right-most column of the multiple columns.

EEE B35 is a computing system comprising: a processor, and a non-transitory memory storing executable instructions, wherein execution of the executable instructions by the processor causes the computing system to perform the method of any one of EEE B1 to B34.

EEE B36 is a non-transitory computer readable memory having stored therein instructions executable by a processor to cause a computing system to perform the method of any one of EEE B1 to B34.

EEE C1 is a computer-implemented method involving a software application executed by a server computing system on behalf of a client computing system with a display screen, wherein: the software application involves graphically displaying, on vertical symbol display segments of the display screen, animations that simulate spinning a plurality of reels, a memory of the server computing system stores, a global symbol group including a plurality of symbols, subsets of which are displayable in a respective vertical symbol display segment of the display screen, a hierarchy of symbols for the software application defines an order of at least a first symbol and a second symbol of the global symbol group arranged from a lowest priority to a highest priority, the display screen includes multiple particular patterns, each particular pattern comprises one symbol position from each reel across the plurality of reels, and the computer-implemented method comprises: selecting, by a processor of the server computing system executing the software application, a set of symbols from the global symbol group for displaying on the display screen in a first arrangement, wherein the first arrangement defines respective symbol positions for each symbol of the set of symbols such that the set of symbols is displayed on the vertical symbol display segments; causing the display screen to display a first animation that simulates spinning and stopping the reels, wherein stopping the reels results in the vertical symbol display segments displaying the set of symbols according to the first arrangement; determining, by the processor based on the set of symbols according to the first arrangement, whether the symbols in each particular pattern form a winning pattern for a first outcome, wherein the winning pattern for the first outcome comprises the first symbol being in two or more symbol positions of the particular pattern; determining, by the processor, whether to replace the first symbol in each winning pattern for the first outcome; based on the determination, causing the display screen to display a second animation that simulates transformation of the first symbol to the second symbol in each winning pattern for the first outcome to form a second outcome; determining, by the processor, whether the symbols in the symbol positions of the particular pattern form a winning pattern for the second outcome, wherein: the winning pattern for the second outcome comprises the second symbol being in two or more symbol positions of the particular pattern, and the second symbol in at least one particular symbol position of the winning pattern for the second outcome is an initial symbol selected for the at least one particular symbol position in the first arrangement; and causing the client computing system to output a corresponding award for each winning pattern for the first outcome and the second outcome.

EEE C2 is the method of EEE C1, wherein determining whether to replace the first symbol in each winning pattern for the first outcome includes determining that the first symbol is contained within the hierarchy of symbols and that the first symbol is not arranged with the highest priority in the hierarchy of symbols.

EEE C3 is the method of any one of EEE C1 to C2, wherein the memory includes a selected symbol set table, the selected symbol set table includes a record for each symbol position within the vertical symbol display segments, and selecting the set of symbols from the global symbol group for displaying on the display screen in the first arrangement includes iterating through each record in the selected symbol set table and inserting a symbol identifier in the record based on a random selection of the symbol identifier from the global symbol group.

EEE C4 is the method of any one of EEE C1 to C3, wherein the plurality of reels includes three or more reels.

EEE C5 is the method of any one of EEE C1 to C4, wherein each respective vertical symbol display segment includes three or more symbol positions for displaying a symbol.

EEE C6 is the method of any one of EEE C1 to C5, wherein the plurality of reels includes three reels and each respective vertical symbol display segment includes three symbol positions for displaying a symbol.

EEE C7 is the method of any one of EEE C1 to C5, wherein the plurality of reels includes five reels and each respective vertical symbol display segment includes three symbol positions for displaying a symbol.

EEE C7 is the method of any one of EEE C1 to C5, wherein the plurality of reels includes five reels and each respective vertical symbol display segment includes six symbol positions for displaying a symbol.

EEE C8 is the method of any one of EEE C1 to C7, wherein the global symbol group includes symbols representing symbols found on a standard deck of playing cards.

EEE C9 is the method of EEE C8, wherein: the hierarchy of symbols includes an ace symbol, a king symbol, a queen symbol, and a jack symbol, and the order of at least the first symbol and the second symbol of the global symbol group arranged from the lowest priority to the highest priority is: (i) the ace symbol, the king symbol, the queen symbol and the jack symbol, or (ii) the jack symbol, the queen symbol, the king symbol, and the ace symbol.

EEE C10 is the method of EEE C9, wherein the hierarchy of symbols further includes a ten symbol, and the order of at least the first symbol and the second symbol of the global symbol group arranged from the lowest priority to the highest priority is: (i) the ace symbol, the king symbol, the queen symbol, the jack symbol, and the ten symbol, or (ii) the ten symbol, the jack symbol, the queen symbol, the king symbol, and the ace symbol.

EEE C11 is the method of EEE C10, wherein the hierarchy of symbols further includes a nine symbol, and the order of at least the first symbol and the second symbol of the global symbol group arranged from the lowest priority to the highest priority is at least: (i) the ace symbol, the king symbol, the queen symbol, the jack symbol, the ten symbol, and the nine symbol, or (ii) the nine symbol, the ten symbol, the jack symbol, the queen symbol, the king symbol, and the ace symbol.

EEE C12 is the method any one of EEE C1 to C11, wherein the client computing system includes: a mobile phone, a smartphone, or a tablet device.

EEE C13 is the method of any one of EEE C1 to C12, wherein the server computing system and the client computing system are operatively coupled to each other via a computer network.

EEE C14 is the method of EEE C13, wherein the computer network includes a local area network and/or a wide area network.

EEE C15 is the method of any one of EEE C13 to C14, wherein the computer network includes a wired network and/or a wireless network.

EEE C16 is the method of any one of EEE C1 to C15, wherein causing the display screen to display the first animation to display the first animation that simulates spinning the stopping the reels includes the server computing system transmitting to the client computing system a communication including the first animation and an instruction to output the first animation on the display screen.

EEE C17 is the method of any one of EEE C1 to C15, wherein causing the display screen to display the first animation to display the first animation that simulates spinning the stopping the reels includes the server computing system transmitting to the client computing system a communication including an index value corresponding to the first animation stored at the client computing system and an instruction to output the first animation on the display screen.

EEE C18 is the method of any one of EEE C1 to C17, wherein causing the display screen to display the second animation that simulates transformation of the first symbol to the second symbol in each winning pattern for the first outcome to form a second outcome includes the server computing system transmitting to the client computing system a communication including the second animation and an instruction to output the second animation on the display screen.

EEE C19 is the method of any one of EEE C1 to C17, wherein causing the display screen to display the second animation that simulates transformation of the first symbol to the second symbol in each winning pattern for the first outcome to form a second outcome includes the server computing system transmitting to the client computing system a communication including an index value corresponding to the first animation stored at the client computing system and an instruction to output the first animation on the display screen.

EEE C20 is the method of any one of EEE C1 to C19, further comprising: provide an instruction to the client computing system to output an audio signal to a speaker operatively coupled to a processor at the client computing system based on an operating state of the server computing system, an operating state of the client computing system, displaying the first animation, displaying the second animation, and/or a winning pattern being shown on the display screen.

EEE C21 is the method of EEE C20, wherein the instruction includes an audio file or an index value corresponding to an audio file stored at the client computing system.

EEE C22 is the method of any one of EEE C1 to C21, further comprising: validating at the processor a payment received at an acceptor of the client computing system.

EEE C23 is the method of any one of EEE C1 to C22, further comprising: determining, by the processor, whether to replace the second symbol in each winning pattern for the second outcome; based on the determination, causing the display screen to display a third animation that simulates transformation of the second symbol to a third symbol in each winning pattern for the second outcome to form a third outcome; determining, by the processor, whether the symbols in the symbol positions of the particular pattern form a winning pattern for the third outcome, wherein: the winning pattern for the third outcome comprises the third symbol being in two or more symbol positions of the particular pattern, and the third symbol in at least one particular symbol position of the winning pattern for the third outcome is an initial symbol selected for the at least one particular symbol position in the first arrangement; and causing the client computing system to output a corresponding award for each winning pattern for the third outcome.

EEE C24 is the method of any one of EEE C1 to C23, wherein each particular pattern of the multiple particular patterns is a particular payline.

EEE C25 is the method of EEE C24, wherein the winning pattern for the first outcome is a winning payline for the first outcome and the winning pattern for the second outcome is a winning payline for the second outcome.

EEE C26 is the method of any one of EEE C1 to C23, wherein each particular pattern of the multiple particular patterns is a particular payway.

EEE C27 is the method of EEE C26, wherein the plurality of reels includes five reels, the vertical display segments include three symbol positions, and the multiple particular patterns include up to two hundred and forty-three payways, and the first outcome and the second outcome are ways-type outcomes.

EEE C28 is the method of EEE C26, wherein the winning pattern for the first outcome is winning payway for the first outcome and the winning pattern for the second outcome is a winning payway for the second outcome.

EEE C29 is the computing system of any one of EEE C1 to C28, wherein the winning pattern for the first outcome and the winning pattern for the second outcome start at a reel in a left-most vertical symbol display segment of the display screen.

EEE C30 is the computing system of any one of EEE C1 to C28, wherein the winning pattern for the first outcome and the winning pattern for the second outcome start at a reel in a right-most vertical symbol display segment of the display screen.

EEE C31 is the computing system of any one of EEE C1 to C28, wherein the winning pattern for the first outcome starts at a reel in one of a left-most or right-most vertical symbol display segments of the display screen, and the winning pattern for the second outcome starts at a reel in another of the left-most or right-most vertical symbol display segments of the display screen.

EEE C32 is a server computing system comprising: a processor, and a non-transitory memory storing executable instructions, wherein execution of the executable instructions by the processor causes the computing system to perform the method of any one of EEE C1 to C31.

EEE C33 is a non-transitory computer readable memory having stored therein instructions executable by a processor to cause a computing system to perform the method of any one of EEE C1 to C31.

The invention claimed is:

1. A computer-implemented method involving a software application executed by a server computing system on behalf of a client computing system with a display screen, wherein:
   - the server computing system and the client computing system are configured to communicate with each other using a communication network,
   - a memory of the client computing system stores a global symbol group including a plurality of symbols, subsets of which are displayable in a respective vertical symbol display segment of the display screen,
   - a hierarchy of symbols for the software application defines an order of multiple symbols of the global symbol group arranged from a lowest priority to a highest priority,
   - the multiple symbols include at least first and second symbols of the global symbol group,
   - the display screen is configured to graphically display, on multiple vertical symbol display segments, animations that simulate a spinning of a plurality of reels,
   - the display screen includes multiple particular patterns, each particular pattern comprises one symbol position from each reel across the plurality of reels, and
   - the computer-implemented method comprises:
   - receiving, by a processor at the server computing system, a first communication, wherein the first communication includes: a spin request and first data indicating a first set of particular patterns selected to be active for a first outcome;
   - selecting, by the processor after receiving the first communication, a set of symbols within the global symbol group for displaying on the display screen in a first arrangement, wherein the first arrangement defines respective symbol positions for each symbol of the set of symbols to indicate how to display the set of symbols within the vertical symbol display segments, wherein first symbol data indicates the set of symbols and the first arrangement;
   - determining, by the processor based on the set of symbols according to the first arrangement, whether the symbols in each particular pattern of the first set of particular patterns form a winning pattern for the first outcome, wherein each winning pattern for the first outcome comprises the first symbol being in two or more symbol positions of a respective particular pattern of the first set of particular patterns, and first pattern data indicates a second set of particular patterns, each of which is a winning pattern for the first outcome;
   - transmitting, by the processor, a second communication to cause the display screen to display a first animation that simulates spinning and stopping the reels, wherein:
     - the second communication includes the first symbol data and the first pattern data, and
     - stopping the reels results in the vertical symbol display segments displaying the set of symbols according to the first arrangement and an indication of each winning pattern for the first outcome;
   - receiving, by the processor, a third communication after transmitting the second communication, wherein the third communication includes an upgrade request;
   - determining, by the processor, the first symbol within each winning pattern for the first outcome is contained within the hierarchy of symbols and does not have the highest priority in the hierarchy of symbols;
   - determining, by the processor based on the hierarchy of symbols, the second symbol is an upgrade symbol with an increased value relative to the first symbol;
   - determining, by the processor, second symbol data that indicates which symbol positions within at least the second set of particular patterns contain the first symbol and are to be transformed to contain the second symbol instead of the first symbol;
   - determining, by the processor based on the first and second symbol data, whether the symbols in the symbol positions in each particular pattern of at least the second set of particular patterns form a winning pattern for a second outcome, wherein:
     - each winning pattern for the second outcome comprises the second symbol being in two or more symbol positions of a respective particular pattern of at least the second set of particular patterns, and
     - the second symbol in at least one particular symbol position of each winning pattern for the second outcome is an initial symbol selected for the at least one particular symbol position in the first arrangement, and second pattern data indicates a third set of particular patterns, each of which is a winning pattern for the second outcome; and transmitting, by the processor, a fourth communication to cause the display screen to display a second animation and an indication of each winning pattern for the second outcome, wherein:

the fourth communication includes the second symbol data and the second pattern data, and the second animation simulates transformation of the first symbol in each winning pattern for the first outcome to the second symbol from the global symbol group stored at the client computing system thereby displaying the second outcome;

causing the client computing system to output a corresponding award for each winning pattern for the first outcome and the second outcome, wherein each winning pattern for the second outcome that includes the same symbol positions as a winning pattern for the first outcome corresponds to an award with an increased value relative to an award corresponding to the winning pattern for the first outcome due to transformation of the first symbol to the second symbol.

2. The method of claim 1, wherein determining whether to replace the first symbol in each winning pattern for the first outcome includes determining that the first symbol is contained within the hierarchy of symbols and that the first symbol is not arranged with the highest priority in the hierarchy of symbols.

3. The method of claim 1, wherein each particular pattern of the multiple particular patterns is a particular payline.

4. The method of claim 1, wherein each particular pattern of the multiple particular patterns is a particular payway.

5. The method of claim 1, wherein:

transmitting the second communication also causes the display screen to display an award indicator for each particular pattern of the second set of particular patterns, and the second communication includes first award data indicating a respective award for each winning pattern for the first outcome or a sum of multiple awards for multiple winning patterns for the first outcome.

6. The method of claim 1, wherein:

a source identifier contained within the first and third communications corresponds to the client computing system, a destination identifier contained within the first and third communications corresponds to the server computing system, a source identifier contained within the second and fourth communications corresponds to the server computing system, and a destination identifier contained within the second and fourth communications corresponds to the client computing system.

7. The method of claim 1, wherein:

each symbol position across the plurality of reels is associated with a respective symbol position identifier, the second symbol data in the fourth communication is arranged to indicate a symbol identifier and symbol position identifier pairing for each symbol to be displayed for the second outcome, and the symbol position identifier within the symbol identifier and symbol position identifier pairing is implied by an order of multiple symbol identifiers within the second symbol data.

8. The method of claim 7, wherein:

each symbol identifier within the second symbol data includes an individual index value corresponding to an index value within the global symbol group, and each index value within the global symbol group identifies a unique symbol within the global symbol group.

9. The method of claim 1, wherein the first animation and the second animation are stored in the memory of the client computing system as a respective animation file with a file name extension selected from the group consisting of: GIF, PNG, JPEG, and SVG.

10. The method of claim 9, wherein:

the second communication includes an index value corresponding to a first particular animation file for displaying the first animation, and the fourth communication includes an index value corresponding to a second particular animation file for displaying the second animation.

11. The method of claim 1, wherein each symbol of the plurality of symbols is a respective bitmap file stored in the memory of the client computing system.

12. The method of claim 1, wherein displaying the set of symbols according to the first arrangement includes superimposing the set of symbols on the plurality of reels.

13. The method of claim 1, wherein:

a random number generator is used determine numbers to select each symbol of the first set of symbols according to the first arrangement.

14. The method of claim 1, wherein:

the second symbol data further indicates which symbol positions within one or more non-winning patterns of the first set of particular patterns selected to be active for the first outcome contain the first symbol and are to be transformed to contain the second symbol instead of the first symbol, the method further includes determining, by the processor based on the first and second symbol data, whether the symbols in the symbol positions in each non-winning pattern of the first set of particular patterns form a winning pattern for the second outcome, and each winning pattern for the second outcome comprises the second symbol being in two or more symbol positions of the respective particular pattern of at least the second set of particular patterns or of a non-winning pattern of the first set of particular patterns.

* * * * *